US007419094B2

(12) United States Patent (10) Patent No.: US 7,419,094 B2
Grear et al. (45) Date of Patent: Sep. 2, 2008

(54) SYSTEM FOR MAINTAINING TRANSACTION DATA

(75) Inventors: Michael B. Grear, Omaha, NE (US); Thomas M. Miller, Omaha, NE (US)

(73) Assignee: First Data Corporation, Greenwood Village, CO (US)

( * ) Notice: Subject to any disclaimer, the term of this patent is extended or adjusted under 35 U.S.C. 154(b) by 325 days.

(21) Appl. No.: 10/972,149

(22) Filed: Oct. 22, 2004

(65) Prior Publication Data

US 2005/0187865 A1 Aug. 25, 2005

Related U.S. Application Data

(60) Provisional application No. 60/567,891, filed on May 3, 2004, provisional application No. 60/547,651, filed on Feb. 24, 2004.

(51) Int. Cl.
*G06K 5/00* (2006.01)
(52) U.S. Cl. ........................................ 235/380; 235/375
(58) Field of Classification Search ................. 235/380, 235/375
See application file for complete search history.

(56) References Cited

U.S. PATENT DOCUMENTS

| 5,334,823 | A | | 8/1994 | Noblett, Jr. et al. |
|---|---|---|---|---|
| 5,343,529 | A | * | 8/1994 | Goldfine et al. ............... 705/75 |
| 5,357,563 | A | | 10/1994 | Hamilton et al. |
| 5,386,458 | A | | 1/1995 | Nair et al. |
| 5,404,000 | A | | 4/1995 | Nair et al. |
| 5,428,210 | A | | 6/1995 | Nair et al. |
| 5,432,326 | A | | 7/1995 | Noblett, Jr. et al. |
| 5,479,530 | A | | 12/1995 | Nair et al. |
| 5,625,776 | A | | 4/1997 | Johnson |
| 5,649,117 | A | | 7/1997 | Landry |
| 5,671,279 | A | | 9/1997 | Elgamal |
| 5,812,668 | A | | 9/1998 | Weber |
| 5,850,446 | A | | 12/1998 | Berger et al. |
| 5,889,863 | A | | 3/1999 | Weber |
| 5,943,424 | A | | 8/1999 | Berger et al. |
| 5,950,179 | A | | 9/1999 | Buchanan et al. |
| 5,978,780 | A | | 11/1999 | Watson |

(Continued)

FOREIGN PATENT DOCUMENTS

EP 1225522 A1 7/2002

OTHER PUBLICATIONS

USPTO; Non-final Office Action mailed Oct. 1, 2007; for U.S. Appl. No. 10/972,109.
Anon. "Aquarius Technology Corporation Announces Strategic Partnership with Onyx Software," PR Newswire, Mar. 26, 1999.
Khoo et al., "Investigation on a Prototype Customer-Oriented Information System for Product Concept Development, An" (Abstract Only), Computers in Industry, vol. 49, No. 2, pp. 157-174, Oct. 2002.

(Continued)

*Primary Examiner*—Lisa M Caputo
(74) *Attorney, Agent, or Firm*—Townsend and Townsend and Crew LLP

(57) ABSTRACT

According to one embodiment of the invention, an architecture for a data processing system can be implemented that processes data for a service provider itself or a client of a service provider as in the case of a third party processor. The elements of the architecture can be managed separately. For example, the architecture can be organized around eight subject areas, such as account, party, communication point, presentation instrument, rules, balances, transactions, and product. Relationships between each of the subject areas as well as between sub-types of each subject area can be established to provide flexibility in the management of the data.

24 Claims, 40 Drawing Sheets

U.S. PATENT DOCUMENTS

| | | | |
|---|---|---|---|
| 5,983,208 | A | 11/1999 | Haller et al. |
| 5,987,132 | A | 11/1999 | Rowney |
| 5,995,976 | A | 11/1999 | Walker et al. |
| 5,999,596 | A | 12/1999 | Walker et al. |
| 6,002,767 | A | 12/1999 | Kramer |
| 6,026,379 | A | 2/2000 | Haller et al. |
| 6,052,674 | A | 4/2000 | Zervides et al. |
| 6,058,375 | A | 5/2000 | Park |
| 6,061,665 | A | 5/2000 | Bahreman |
| 6,072,870 | A | 6/2000 | Nguyen et al. |
| 6,119,105 | A | 9/2000 | Williams |
| 6,128,599 | A | 10/2000 | Walker et al. |
| 6,178,409 | B1 | 1/2001 | Weber et al. |
| 6,253,027 | B1 | 6/2001 | Weber et al. |
| 6,283,366 | B1 | 9/2001 | Hills et al. |
| 6,304,915 | B1 | 10/2001 | Nguyen et al. |
| 6,308,887 | B1 | 10/2001 | Korman et al. |
| 6,324,524 | B1 | 11/2001 | Lent et al. |
| 6,327,348 | B1 | 12/2001 | Walker et al. |
| 6,330,544 | B1 | 12/2001 | Walker et al. |
| 6,373,950 | B1 | 4/2002 | Rowney |
| 6,449,616 | B1 | 9/2002 | Walker et al. |
| 6,468,155 | B1 | 10/2002 | Zucker et al. |
| 6,473,500 | B1 | 10/2002 | Risafi et al. |
| 6,473,794 | B1 | 10/2002 | Guheen et al. |
| 6,477,571 | B1 * | 11/2002 | Ross .......................... 709/224 |
| 6,519,571 | B1 | 2/2003 | Guheen et al. |
| 6,536,037 | B1 | 3/2003 | Guheen et al. |
| 6,578,014 | B1 | 6/2003 | Murcko, Jr. |
| 6,606,744 | B1 | 8/2003 | Mikurak |
| 6,609,113 | B1 | 8/2003 | O'Leary et al. |
| 6,615,166 | B1 | 9/2003 | Guheen et al. |
| 6,633,788 | B1 | 10/2003 | Riley et al. |
| 6,671,818 | B1 | 12/2003 | Mikurak |
| 6,685,088 | B1 | 2/2004 | Royer et al. |
| 6,704,714 | B1 | 3/2004 | O'Leary et al. |
| 6,708,176 | B2 | 3/2004 | Strunk et al. |
| 6,721,713 | B1 | 4/2004 | Guheen et al. |
| 6,760,711 | B1 | 7/2004 | Gillett et al. |
| 7,031,939 | B1 | 4/2006 | Gallagher et al. |
| 7,072,847 | B2 | 7/2006 | Ulenas et al. |
| 7,134,096 | B2 | 11/2006 | Brathwaite et al. |
| 7,272,617 | B1 | 9/2007 | Bayer et al. |
| 2002/0120561 | A1 | 8/2002 | Chin et al. |
| 2002/0154114 | A1 | 10/2002 | Christensen et al. |
| 2003/0018549 | A1 | 1/2003 | Fei et al. |
| 2003/0069836 | A1 | 4/2003 | Penney et al. |
| 2003/0225772 | A1 | 12/2003 | Sykes |
| 2004/0010462 | A1 | 1/2004 | Moon et al. |
| 2004/0039679 | A1 | 2/2004 | Norton et al. |
| 2004/0143496 | A1 | 7/2004 | Saenz |
| 2004/0158522 | A1 | 8/2004 | Brown et al. |
| 2005/0182720 | A1 | 8/2005 | Willard et al. |
| 2005/0289024 | A1 | 12/2005 | Hahn-Carlson et al. |
| 2007/0094302 | A1 | 4/2007 | Williamson et al. |

OTHER PUBLICATIONS

Roebuck, K., "Platform Approach to Wealth Management Technology, The," Wal Street & Technology, vol. 21, No. 2, SS12, Feb. 2003.

USPTO; Non-Final Office Action mailed Mar. 19, 2008; for U.S. Appl. No. 10/972,152.

USPTO; Non-Final Office Action mailed Mar. 24, 2008; for U.S. Appl. No. 10/971,832.

USPTO; Advisory Action mailed Mar. 27, 2008; for U.S. Appl. No. 10/971,831.

USPTO; Final Office Aciton mailed Oct. 25, 2007; for U.S. Appl. No. 10/971,831.

USPTO; Non-final Office Action mailed Jan. 10, 2008; for U.S. Appl. No. 10/971,951.

USPTO; Non-final Office Action mailed Nov. 5, 2007; for U.S. Appl. No. 11/064,289.

USPTO; Non-Final Office Action mailed Apr. 7, 2008; for U.S. Appl. No. 10/972,151.

USPTO; Final Office Action mailed Apr. 22, 2008; for U.S. Appl. No. 10/972,109.

* cited by examiner

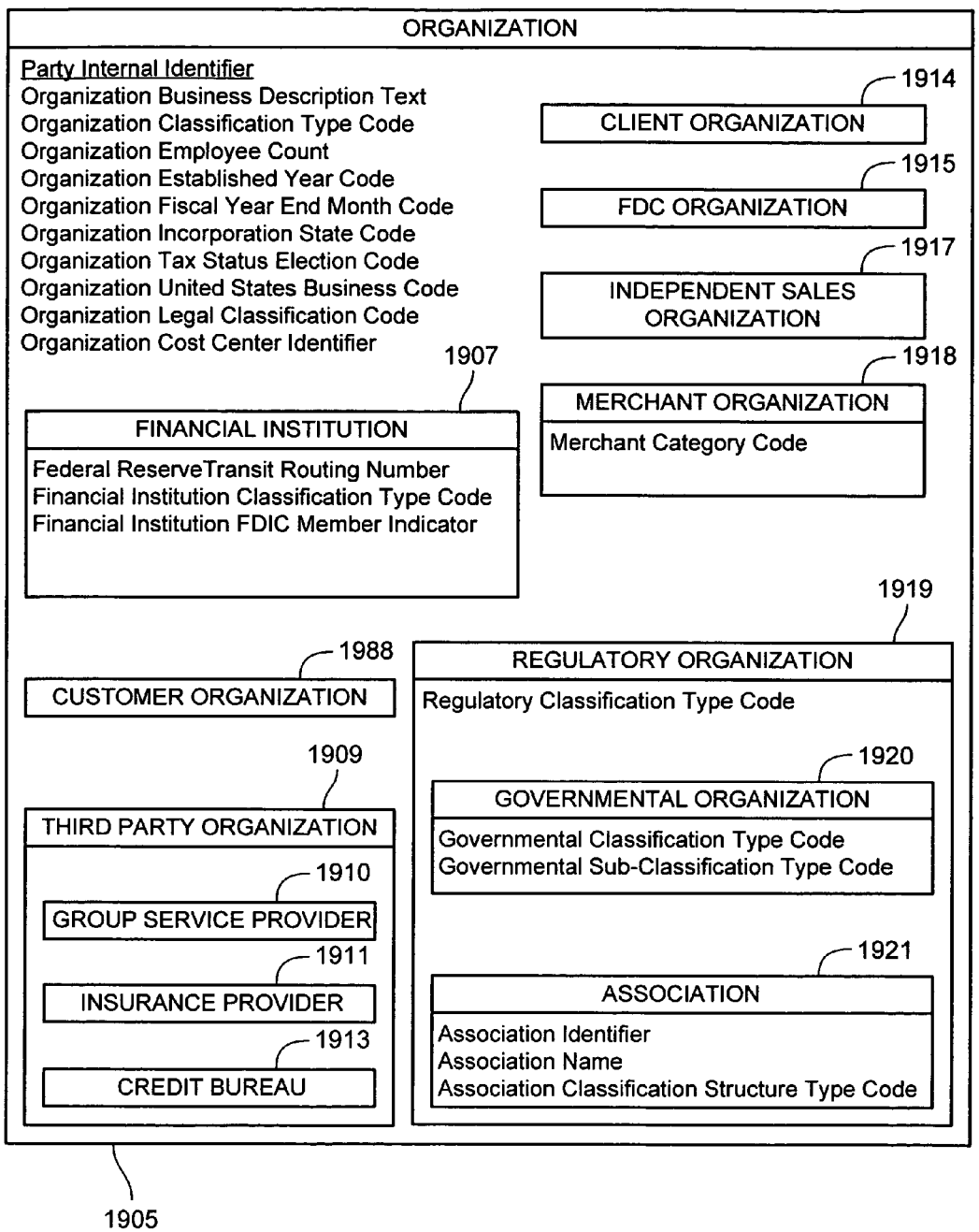
FIG. 19C1

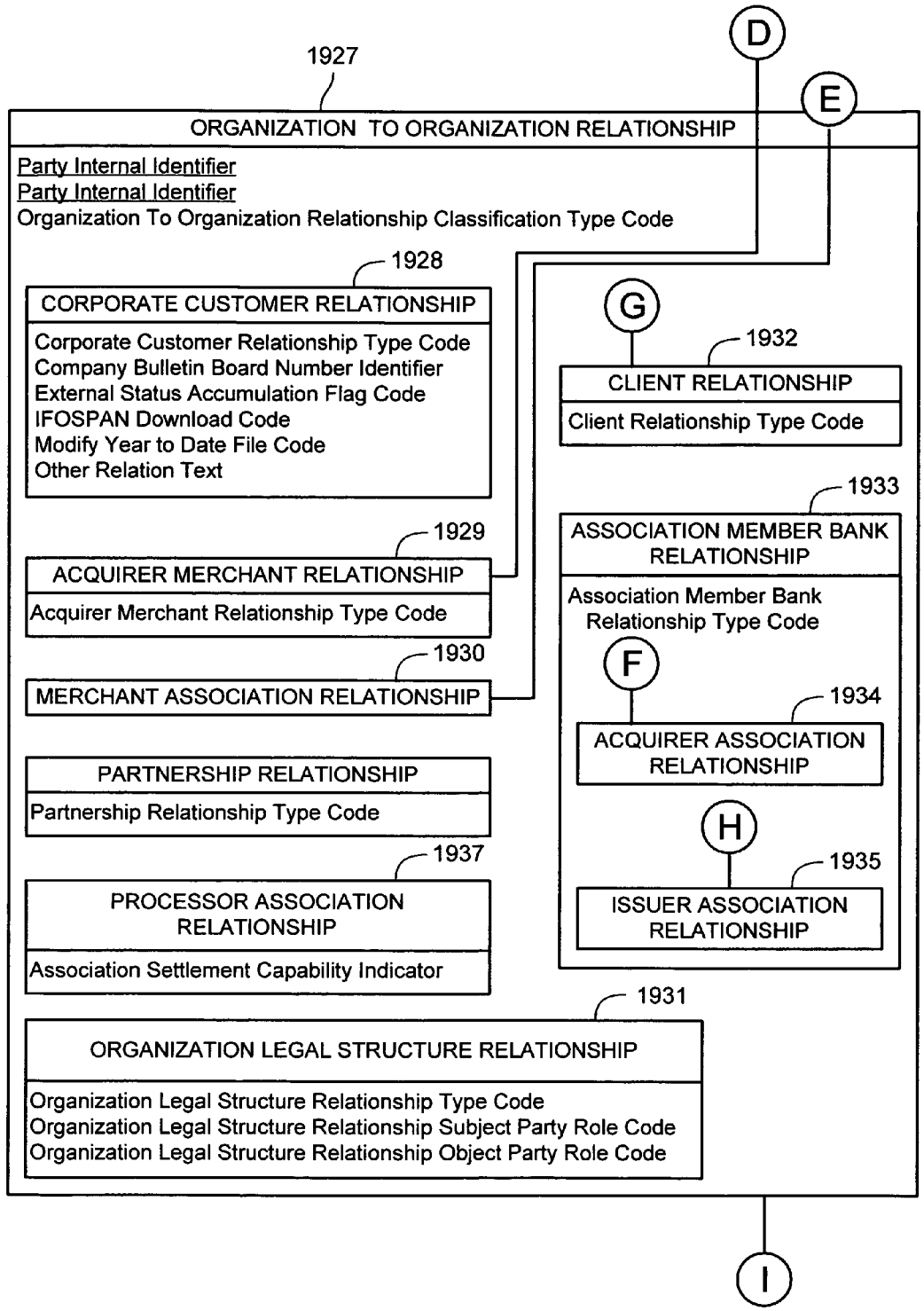
FIG. 19D1

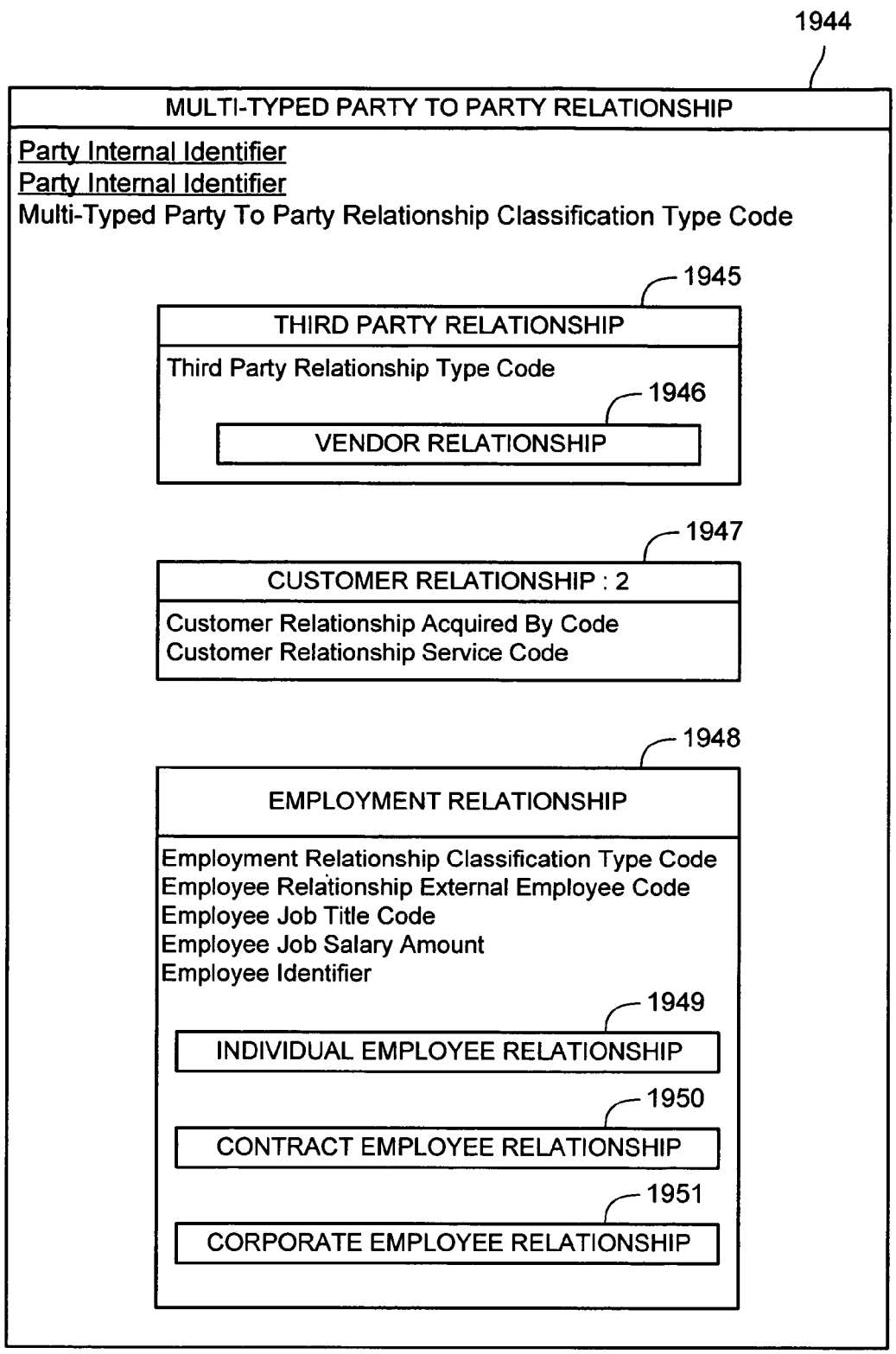
FIG. 19D2

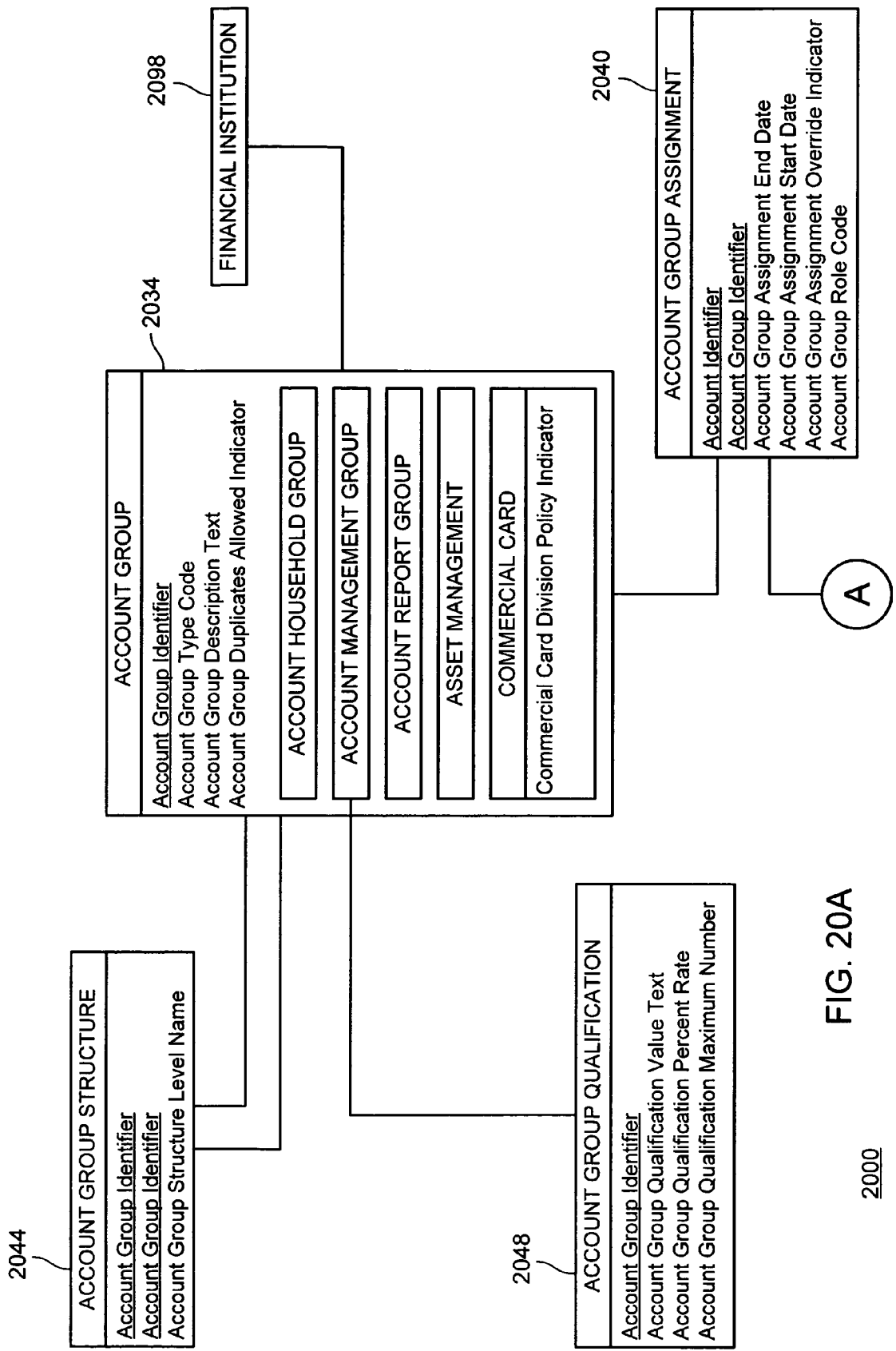

SYSTEM FOR MAINTAINING TRANSACTION DATA

CROSS-REFERENCES TO RELATED APPLICATIONS

This application claims the benefit under 35 USC §119(e) of U.S. Patent Application No. 60/547,651, filed on Feb. 24, 2004 entitled "System and Method for Transaction Processing" as well as the benefit under 35 USC §119(e) of U.S. Patent Application No. 60/567,891, filed May 3, 2004, entitled "System and Method for Transaction Processing" and hereby incorporates by reference the content of both applications in their entirety and for all purposes.

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK.

NOT APPLICABLE

Embodiments of the invention relate generally to systems for processing data for service industries. For example, one embodiment of the invention relates to a system for processing utility usage transactions and generating bills. Yet another embodiment relates to processing credit card transactions for the credit card (retail, debit, consumer) industry. Still other embodiments of the invention relate to processing transactions generated on accounts for healthcare payments, home mortgage, consumer loans, telephone usage, for example.

BACKGROUND

Credit card transaction management and administration is an example of a processing system that has traditionally relied on storing a great deal of information with a single identifier used as a reference. For example, a credit card account typically includes information about the customer, the account, the billing address, the formal transaction information, and the credit card and physical credit card characteristics. All of this is handled from the perspective of a single account, so that the credit card company can track transactions for a particular customer. Thus, this results in a very static data processing system that is inflexible which makes it difficult to effect changes as the business it services evolves. Furthermore, the handling of this information is typically specific to a particular line of business within an industry such as a revolving credit product for the financial services industry. It is not readily aligned with a totally different service model, such as one's utility billing system, insurance claim payment processing system, phone billing system, or cable billing system.

Thus, a third party which handles the processing of transactions for a variety of different industries or services must create independent systems for handling each service's transactions. There currently appears to be no unique system which is capable of flexibly handling different types of services, such as credit card processing, healthcare claim payment, and utility bill processing, in the same processing system. Again, the static and inflexible nature of the current processing systems prevent this.

In addition, because the account information, party information, and presentation instrument information for a credit card system, for example, is referenced by a single identifier, it is quite difficult, if not impossible, under present systems, to manage the individual areas of account information, party information, or presentation instrument as independent data. Once again, the inflexible nature of a single reference to the data prevents this from happening.

As another example of the inflexibility of current systems, it is not easy to modify existing systems to add multiple parties and the requisite roles they play to an account and utilize multiple cards for that account. Again, this is difficult due to the fact that once an account is created under the static formatting of a particular account—such as the formatting of a Mastercard Gold Card with a single customer—it is extremely difficult to modify that record to reflect change—such as a second party, playing a previously unsupported role, on the account—without restructuring the processing system (underlying data structures and program code).

Another example of the inflexibility of credit card systems is that customers are typically prevented from playing dual roles in an account, such as the role of guarantor and authorized user. Instead, the credit card account is typically configured to identify one party as the authorized user and a different party as the guarantor. Once again, this prevents the flexibility that might be desired in certain circumstances.

Yet another example of the rigidity of current systems is that, for products offered by a bank, for example, which offers different credit card lines as well as brokerage accounts and mortgages, each of those individual accounts is typically processed separately, under separate systems. It is not possible to easily combine those systems at a later point in time under a master account which could be tailored to the services desired by a particular customer.

As yet another example, the static nature of current systems makes it difficult, if not impossible, to modify the mailing contact points for an individual during different times of the year. For example, a credit card statement is typically mailed to a home residence of the customer who is financially responsible for the account. Current systems do not provide the flexibility to allow a customer to designate varying locations during the year to which statements should be sent. This is due to the fact that only a single address is currently associated with a credit card account, for example, without the flexibility to designate different contact points throughout the year. To include such information would require a complete reworking of the credit card processing system because the credit card processing system operates by referring to all account information using a single reference identifier.

Thus, as can be seen from the above examples, current processing systems for service industries are typically configured in a static and inflexible way so as to effectively prevent the efficient management of information for an account. Other examples addressed by present embodiments of the invention will be apparent from the following specification.

Thus, there is a need for a data processing system which can handle the processing of data for service industries in a more flexible manner. For example, there is a need for a data processing system and requisite data architecture that can easily adapt to changing business requirements and is not tightly coupled with a specific aspect of any one service or any one industry.

SUMMARY

According to one embodiment of the invention, a method of associating transaction entries for use by a data processor wherein the method comprises providing a transaction database for storing transaction information; generating a first transaction internal identifier; assigning the first transaction internal identifier to data for a first transaction as a first transaction data entry; storing the first transaction data entry in the transaction database; generating a second transaction internal identifier; assigning the second transaction internal identifier to data for a second transaction as a second transaction data entry; storing the second transaction data entry in the transaction database; providing a transaction relationship type code for describing the relationship between two transaction entries; associating the transaction relationship type code with the first transaction internal identifier and with the second transaction internal identifier so as to describe the relationship between the first transaction data entry and the second transaction data entry.

BRIEF DESCRIPTION OF THE DRAWINGS

FIGS. 19A, 19B, 19C, 19C1, 19D, 19D1, and 19D2 illustrate a block diagram of another exemplary configuration for the party subject area, according to one embodiment of the invention.

FIGS. 20A, 20B, and 20C illustrate a block diagram of an exemplary configuration for the account subject area, according to one embodiment of the invention.

DETAILED DESCRIPTION

Figure 1A:
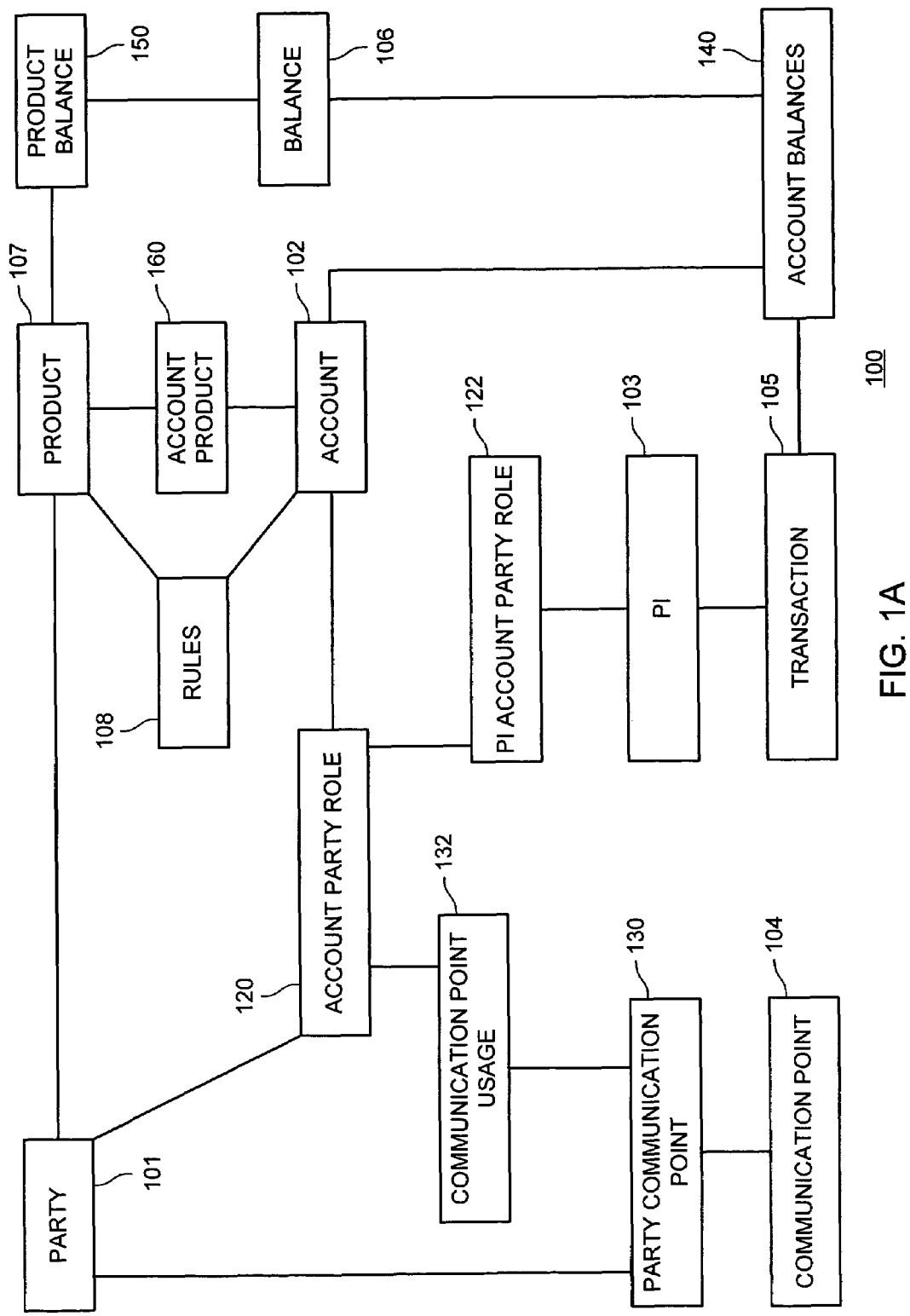
FIG. 1A is a block diagram illustrating the architecture of a data processing system for managing service industry data according to one embodiment of the invention.

Referring now to FIG. 1A, a data architecture for implementing an embodiment of the invention is shown. Namely, in FIG. 1A, a data architecture is shown that is divided into eight different subject areas, relationships between the subject areas, and the resulting associations between them. For example, FIG. 1A illustrates in system 100 the following subject areas: party 101, account 102, presentation instrument 103, communication point 104, transaction 105, balance 106, product 107 and rules 108. Furthermore, between subject areas, different associations are shown. For example, between party 101 and communication point 104, party-communication point associations 130 is shown. Similarly, between party 101 and account 102, an account-party role association is shown. Furthermore, between presentation instrument 103 and account-party role associations 120, a presentation instrument-account-party role 122 relationship is shown. Similarly, communication point usage 132 is shown positioned between the party-communication point associations 130 and the account-party-role associations 120. FIG. 1A also shows between product 107 and balance 106, the product-balance associations 150. Furthermore, it shows between account 102 and product 107, an account-product associations 160. Finally, between account 102 and balance 106, FIG. 1A shows an account-balance associations 140.

Figure 1B:
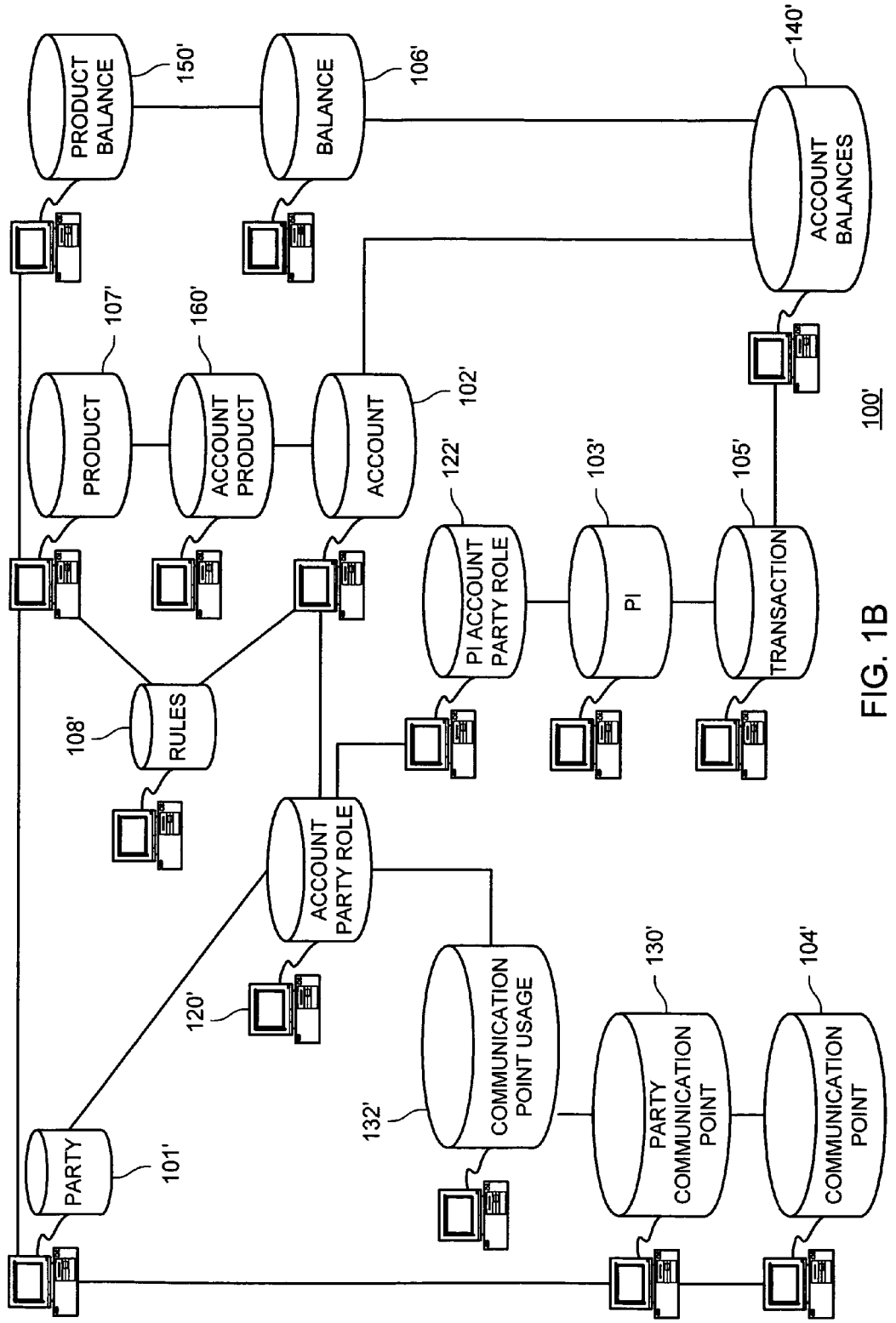
FIG. 1B illustrates a data processing system for implementing the architecture shown in FIG. 1A.

FIG. 1B illustrates a processing system for implementing the data architecture shown in FIG. 1A. Furthermore, each of the subject areas, relationships, and associations shown in FIG. 1A are illustrated by a computer and database in FIG. 1B. A computer and database can be used to store independently the information for each subject area: party 101', account 102', presentation instrument 103', communication point 104', transaction 105', balance 106', product 107', and rules 108'. In addition, a database and computer can be utilized to store the information for each relationship established between the different subject areas. For example, the database can be used to store internal identifiers from the party database and account database in database 120' for storing information in regard to an account-party role. Similarly, a database can be utilized to store information for the party-communication point relationship as database 130'. Other databases are shown in FIG. 1B in conformance with FIG. 1A, such as communication point usage database 132', PI-account-party-role database 122', account-balance database 140', account-product database 160', and product-balance database 150'. Each database is designated in conformance with the architecture shown in FIG. 1A.

Figure 13:
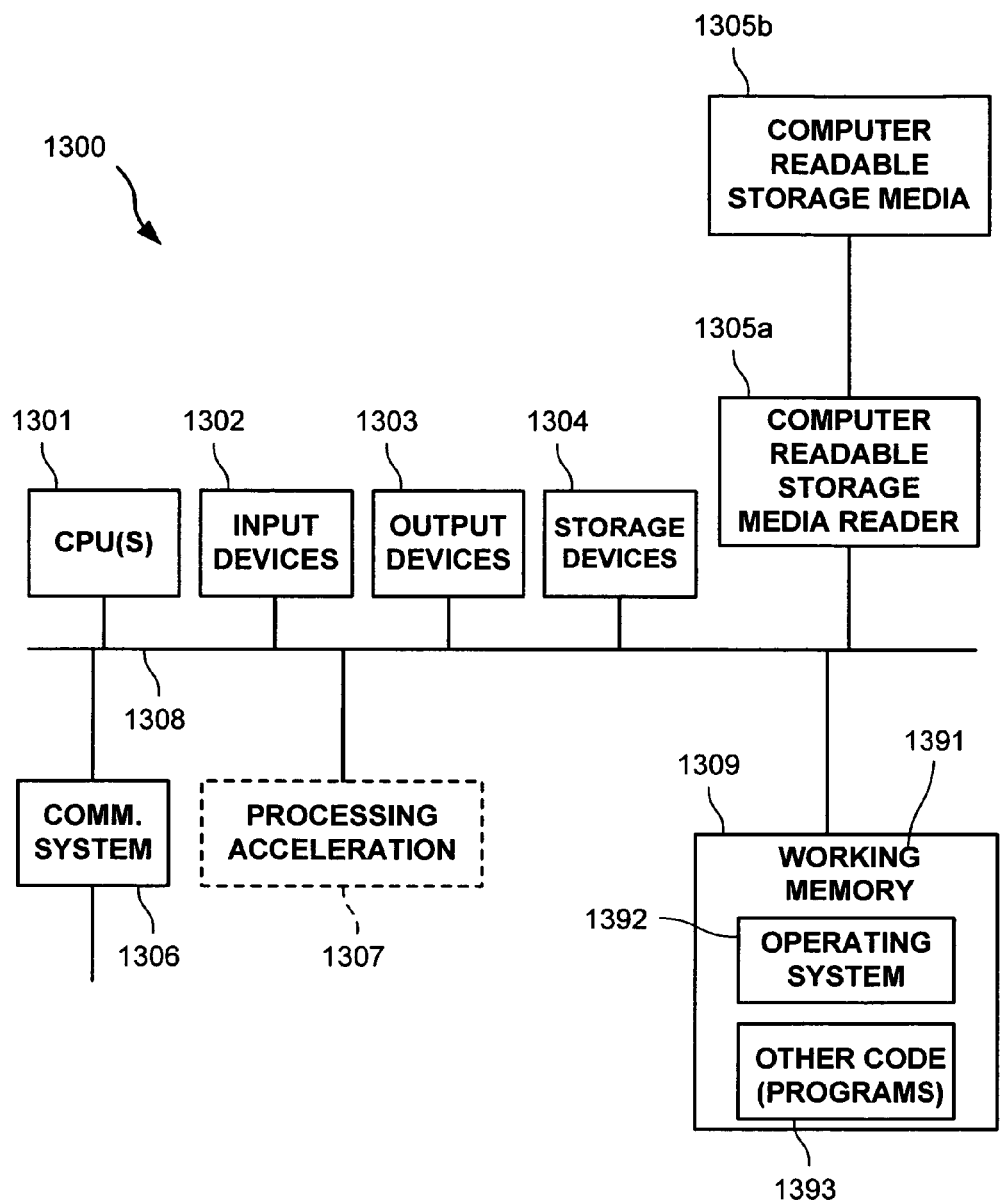
FIG. 13 illustrates a block diagram of a computing system for implementing any of the computer processing systems in the embodiments of the invention described herein.

Each of the computers and databases shown in FIG. 1B can be implemented by the exemplary computer system illustrated in FIG. 13. FIG. 13 broadly illustrates how individual system elements can be implemented. System 1300 is shown comprised of hardware elements that are electrically coupled via bus 1308, including a processor 1301, input device 1302, output device 1303, storage device 1304, computer-readable storage media reader 1305*a*, communications system 1306 processing acceleration (e.g., DSP or special-purpose processors) 1307 and memory 1309. Computer-readable storage media reader 1305*a* is further coupled to computer-readable storage media 1305*b*, the combination comprehensively representing remote, local, fixed and/or removable storage devices plus storage media, memory, etc. for temporarily and/or more permanently containing computer-readable information, which can include storage device 1304, memory 1309 and/or any other such accessible system 1300 resource. System 1300 also comprises software elements (shown as being currently located within working memory 1391) including an operating system 1392 and other code 1393, such as programs, applets, data and the like.

System 1300 has extensive flexibility and configurability. Thus, for example, a single architecture might be utilized to implement one or more servers that can be further configured in accordance with currently desirable protocols, protocol variations, extensions, etc. However, it will be apparent to those skilled in the art that embodiments may well be utilized in accordance with more specific application requirements. For example, one or more system elements might be implemented as sub-elements within a system 1300 component (e.g. within communications system 1306). Customized hardware might also be utilized and/or particular elements might be implemented in hardware, software (including so-called "portable software," such as applets) or both. Further, while connection to other computing devices such as network input/output devices (not shown) may be employed, it is to be understood that wired, wireless, modem and/or other connection or connections to other computing devices might also be utilized. Distributed processing, multiple site viewing, information forwarding, collaboration, remote information retrieval and merging, and related capabilities are each contemplated. Operating system utilization will also vary depending on the particular host devices and/or process types (e.g. computer, appliance, portable device, etc.) Not all system 1300 components will necessarily be required in all cases.

The data architecture shown in FIG. 1 A provides a great deal of flexibility for managing data or providing data processing for a service industry. Prior data architectures in the credit card industry, for example, relied upon the referencing of all the information for a customer's account through the use of a single identifier. Similarly, in the utility billing system, all the information for a particular user is referenced as a single set of combined data. The architecture illustrated in FIG. 1A does not reference all of the information for a service by a single identifier for a static record. Rather, it separates information into distinct subject areas. Thus, one is capable of providing a great deal of flexibility to data processing. For example, one can modify the data for a particular party without disrupting processing of that party's account. Essentially, no restructuring of other subject areas is required because an individual subject area can be modified without impacting the other subject areas. Therefore, this type of system provides a great deal of flexibility and functionality that existing systems cannot accomplish.

Referring to FIG. 1A, the various subject areas can be seen. Furthermore, the relationships and resulting associations established between many of the different subject areas can be seen as well. These relationships and associations permit the processing of stored data for desired functionality.

Account

Referring to block 102 of FIG. 1A, the account subject area can be seen. The account subject area is a collection of data about the mechanism used to record, measure, and track financial and non-financial information related to a contractual agreement. Accounts can be characterized by specific components, terms or conditions of data of the service or product that prompted the account's creation. An account can further be characterized by financial and demographic data. Thus, according to one embodiment of the invention, the account facilitates the management, tracking, and reporting of transaction activities. The specific characteristics of an account may vary based on the type of product, product components, party, or terms and conditions established in the contractual agreement.

An account is associated to one or more parties who can use one or more presentation instruments to generate transactions. Furthermore, according to one embodiment of the invention, an account, a party, and a presentation instrument can operate as independent subject areas and can be related in an association to form a unique occurrence of the relationship.

The account subject area provides for the separation of account data from party data and presentation instrument data. Thus, the identity of a party who fulfills a specific business role for a particular account is not stored as part of the account database. Rather, it is kept in the party database and related to the account database where the assigned business role is maintained. Similarly, the data describing the presentation instrument, such as a credit card or smart card, is not stored as part of the account's data. Rather, this information can be related with the account's data by an association database.

An account can participate in one or more relationships with other accounts, for example, as a member of a business group or family group of accounts. Furthermore, multiple presentation instruments can generate transactions for a single account, a group of accounts, or a single member of a group. Thus, a single account could be related with a smart card, a magnetic stripe card, a biometric identifier, etc., each of which could be utilized to initiate a transaction associated with the account.

For example, an individual account associated with several parties can be related with one presentation instrument to generate transactions. Alternatively, a family account with each family member having individual or subordinate accounts can be implemented with the account subject area. Furthermore, a corporate account with one or more dependent accounts could be implemented through the account database. Thus, it is clear that by segregating data for an account, flexibility is provided under the data architecture shown in FIG. 1A.

Party

Referring to FIG. 1A, the party 101 subject area can be seen. The party subject area is a collection of data about individuals, organizations, or organization units that the service provider needs to have information about in order to carry out business operations either directly or indirectly. Parties can be related to other parties as well as to accounts, presentation instruments, balances, products, communication points, and transactions. They can participate in agreements, groups, and organizations. They can act as owners, stewards, contact points, and catalysts of business functions and rules.

For example, customer John Joseph Doe may be known to one client of the data processor as J. Doe, and to another client of the data processor as J. Joseph Doe, Sr. Each client (e.g., Bank One and XCEL Energy) may add a different address for John Doe even though both have the same social security number for him and both know that his birth date was Jun. 10, 1942. The names used by one client of the data processor are not combined with those used by the other clients of the data processor because each is relevant only within the context of the business that provided the information. The party subject area however can store identifying information for the party, such as name and social security number that can be related to many different accounts.

The account to which a party is associated is not stored as part of the party's database. Similarly, the communication point at which a party can be contacted is also not stored as part of the party's database. Rather, the account and/or communication point are related to the party by associative databases.

The party database can provide flexibility to maintain multiple names, statuses, and alternative identifiers for an individual, organization, or organizational unit. It also allows a service organization to manage multiple roles in relationships for an individual, organization, or organizational unit. It further allows one to build and maintain structural relationships between individuals, organizations, and/or organizational units such as peer-to-peer relationships or hierarchical relationships.

Examples of the relationships between parties are customers of a service provider (credit card companies, utility companies, healthcare providers), clients of a data processing system such as receiving banks, vendors, merchants, contacts, business partners, and employees.

Presentation Instrument

Referring again to FIG. 1A, a block 102 entitled "presentation instrument" is shown. The presentation instrument subject area is a collection of data about physical or virtual devices used as a transaction catalyst to generate transactions, either monetary or non-monetary. The presentation instrument data is stored independently from party and account data in order to facilitate its management. Characteristics of presentation instrument data can be modified without affecting the account or the account status. Presentation instruments are not restricted to being physical devices, such as paper invoices, plastic credit cards, plastic magnetic stripe cards, or smart cards. Rather, they can also be virtual devices, such as a stated account number or an electronic identifier. Any catalyst for initiating a transaction against an account is considered a presentation instrument.

The presentation instrument data can be independently managed. Thus, the presentation instrument data may be related to one or more party/product/account relationships. For example, a party could require reissuance of a "presentation instrument", such as a credit card, without affecting other credit cards on the same account. Similarly, a virtual presentation instrument could be created for an account to allow the party to enable e-commerce activity without affecting any associated physical presentation instruments.

Communication Point

Another subject area shown in FIG. 1A is communication point 104. The communication point subject area identifies the destination points used for the delivery of communications, e.g., the virtual or physical points where communication(s) can be received. A communication point can be a geographic address; an electronic address, such as an email address; a telecommunication number, such as a telephone or fax number; or any other type of destination point to which a communication can be addressed. Typically, an association will be established between a party and a communication point to describe the relationship of the party to a particular communication point; e.g., one geographic address might be related to a party as the party's home address, another to a party as the party's work address, etc. These associations can be stored in a different database and/or can be used to specify what types of communications can be delivered to them. However, the communication point database stores information about the communication point itself to which relationships are established and various types of communications are sent.

One of the benefits of storing information in a communication point database is that the information can readily be changed when the issuing body changes the content for the communication point. Furthermore, many different communication points can be utilized for a single party by relating the party to those communication points and/or a single communication point can be related to many parties. This provides great flexibility for sending communications to a party depending upon the type of relationship that party has with a communication point and the time at which that relationship is used. Another example of the inherent flexibility is that as business requirements change and new types of communication points are discovered they can be added to the processing system with very little effort.

For example, a communication point could be used to send a specific party the annual statement for a credit card company. The party may only live at its home address for part of the year and live at a different address for another part of the year, as is often the case for retirees. Thus, multiple communication points could be included in a communication point database and an association could be established with the party database to specify the relationship, timing, and usage of the communication point data. These associations can be stored in different databases such as party-communication point database 130 and communication point usage database 132. Thus, the annual statement could be directed to one or more geographic or e-mail addresses during a first part of the year and yet a single geographic address during another part of the year.

One of the benefits of storing information in a communication point database is that the communication point information can change without the relationship to a party changing. Thus, for example, if a district revises the zip code configuration for a city, the zip code for a location can change but the relationship as the primary mailing address will not change. Thus, only the communication point database needs to be updated with the revised zip code information. This can be important in some industries such as the credit card rating industry in which one's credit rating is determined in part by how many times one has moved. The arbitrary redistricting of zip codes, for example, would cause one's address to change, by definition, under the old data processing methods even though the geographic location did not change. Thus, the credit rating rules used to evaluate applicants would consider the change in zip code to be a change in address, causing the credit rating for an individual to worsen—even though the person never moved. However, the system shown in FIG. 1A allows the characterization of the geographic address, i.e., the revised zip code information, to be entered without indicating that the relationship to that geographic location has changed. Thus, under the system shown in FIG. 1 A, a post office that revises the zip codes for an individual would not affect the credit rating for that individual. This is yet another example of the flexibility and efficiency of the separation of data brought about by the data processing architecture shown in FIG. 1A.

As another example of the functionality that can be achieved with separated communication point data and unique party-communication point associations, one can envision all the different types of communications that can be sent for a credit card account. Thus, a monthly statement could be directed to a home address for six months of the year and a vacation address for the remaining six months of the year. Furthermore, an overcredit warning could be sent to an email address if one approaches the limit on a credit card. Furthermore, a late payment notice could be faxed to one's home address or a second late notice could be implemented by a telephone call to the individual's home phone. Each of the above communication destinations (i.e. home address, e-mail address, fax, telephone) could easily be altered and stored in the communication point database. However, associations between the party and any "address" in the communication point database can be maintained separately in a database. Thus, in comparison with traditional credit card systems in which a statement, for example, is always sent to the same address, this embodiment of the invention provides greater flexibility for communicating with a party.

Transaction

Referring again to FIG. 1A, the transaction subject area 105 is shown. The transaction subject area stores data relating to transactions conducted for a service. The transaction subject area stores a collection of data about business actions or events that impact implied financial worth or cause movement of funds from one account to another and/or impact non-financial properties (e.g., names, addresses, requests for new plastics). Thus, the transaction database can store information relating to previous purchases for a credit card account, for example. Similarly, it can store utility bill payments or billing statements for a utility service. Essentially, it stores all the data that memorializes transactions that occur for an account. In the case of the credit card industry, many of the service groups such as Mastercard and Visa have a predefined format for storing transaction information. The transaction subject area can understand these external formats, can document them as they are presented, and can broker them into internal format that can be posted to the appropriate balances on an associated account.

Balance

The balance subject area 106 in FIG. 1A is utilized to store balance information for products and accounts. Essentially, a balance is a total maintained by balance type and period for an account or account party role that serves as a mechanism for accumulating financial (debit/credit) activity. Examples of an account balance are the balance due on a utility bill or a credit card bill. This balance information can include the date of the balance, the amount of the balance, etc. The balance database keeps a balance history for each account as desired.

The balance database provides a great deal of flexibility in the types of balances that can be kept for an account. For example, a promotional balance can be used for a new product, such as a new credit card line. A late fee balance can be kept separate for a credit card as well. Similarly, an overlimit balance can be kept for an account. In addition, a big ticket promotional balance can be utilized for an account. Such promotional balances might include how much one pays toward a specific product such as a refrigerator. Thus, if a special promotional program is in existence for refrigerators, for example, the balance database can store how much money has been applied towards purchases which trigger the grant of the reward towards the refrigerator.

Thus, the balance database provides for all different kinds of balance information to be kept that can be utilized for an account or specified for a particular product line. It provides great flexibility in that the balance information can be varied and different balances can be selected for a product line.

Product

The product subject area 107 is a collection of data about a named item or service intended for sale by one party to another party for the purpose of generating revenue. Thus, parties who participate in product campaigns typically take on different roles such as those who offer products to market, those who service a product, and those who use the services provided by the product. As an example of those who offer a product to market, an issuing bank which issues credit cards to customers is one example. Similarly, a money transfer agent such as Western Union, which offers money transfer services to parties, is another example. Similarly, companies that operate as third parties for issuing and acquiring banks, such as First Data Resources and First Data Merchant Services, fall into this category as well. As an example of those who service a product, First Data Resources or any other third party processor is an example of one who performs this service. Finally, as an example of those who use the services provided by the product, a consumer using a credit card is an example of that category.

Products can be defined by party-selected component data. This replaces program-implemented features and functionality. Thus, an issuing bank party can select the components that it wishes to include as part of a new product to be offered to the purchasing public, each of which would be a separate party. This allows the issuing bank, for example, to select the interest rate, credit line, payment options, etc.

Another example of a product is a utility service. Thus, the rate for gas and electricity can be defined separately. In addition, the late fees can also be defined as separate components. The party offering such a product in this example would be the utility company while the homeowners would be the consumers.

Typically, a product will define the hierarchical nature of components, such as rollup balance, and summary statements. It can also define account balances, such as promotional balances and fees. Furthermore, it can define the treatment of those balances. In addition, it can define how the balances are affected by transactions, such as sales, payments, reversals, etc.

Products can vary by different lines of business, such as credit, retail, e-commerce, cellular, etc. A product will typically organize component data in such a way that a business person can use them, a client can understand them, and an application can process them. This allows an unlimited number of components to define a party's product. Furthermore, it allows a faster time to market for new products or to make changes to existing products. Furthermore, it provides a centralized and easily accessible database for product definitions.

Examples of products are a merchant service; a funds transfer service; a Visa™ Platinum with reward feature; a Mastercard™ Gold Card account; a retail card; an investment cash management service; a cellular transaction/billing account; and an electric utility billing service.

Rules

The final subject area illustrated in the architecture shown in FIG. 1A is the rules 108 subject area. The rules subject area is a set of data used to provide a decision and action infrastructure. A client of the service provider or the service provider itself can give a rule a definition of an action enabler within which it manages its business. Detection of business events can trigger party-defined business logic managed within the rules subject area. The rules subject area manages processing controls comprised of business logic and parameters that are translated into executable code.

Thus, the rules database 108 can be utilized throughout the processing system depicted in FIG. 1B and FIG. 13 and to support the associations between other subject areas. For example, in the communication point usage database 132, rules can be invoked to determine when a particular party should be contacted at a communication point triggered by a business event. The rules database can be invoked to trigger a decision and resulting action depending on the formatting of the rule.

One example of use of the rules database would be as follows:

If customer's state is "CA" and the transaction is an ATM cash advance, perform CASH FEE 1
    Action Set: calculate 4% of the transaction amount
    Add $1.00 to the previous result
    Assess the amounts
Otherwise, if the transaction is an ATM cash advance, perform CASH FEE 2
    Action Set: calculate 4% of the transaction amount
    Assess the amount.

Subject Area Associations

The various subject areas have been described above as independent databases for storing information related to a service business. Relationships exist between the different subject areas and different components within the subject areas. These relationships result in associations that can be configured as databases for storing relational information between the subject area databases. While independent databases are typically used to describe the sets of data for different subject areas, it is also envisioned that separate databases could be used to store information for more than one subject area and the associations between them.

Block 130 in FIG. 1A shows a party communication point associative database. The party communication point associative database includes a grouping of data related to the party 101 database and communication point 104 database so that entries from each of those databases can be linked or coupled with one another. This allows information from the party and communication point databases to be associated so that the data stored separately can be put to use. One way to accomplish this is by associating an internal identifier for an entry from the party database 101 with an internal identifier for an entry from the communication point database 104 as an entry in the party-communication point database. Yet another internal identifier can be coupled with these two ID's, used to indicate the type of association that has been created, to form a unique entry. However, this is not necessarily required as the grouped internal identifiers can be identified and then their associated information can be obtained from the appropriate subject area database. In other words the association between the two identifiers is that the first internal identifier represents the subject and the second internal identifier represents the object of the relationship. Thus, the internal identifier for the communication point could be the subject and the identifier for the party could be the object so as to indicate that: "This specific communication is the home address for this specific party."

Thus, the architecture shown in FIG. 1A illustrates that a service business can be broken into different individualized subject areas. These subject areas can be kept separate from the other subject areas to allow the management of the information stored for each subject area separate and distinct from the management of the other storage area data. This permits a great deal of flexibility in the manipulation of data for a particular subject area.

Figure 2A:
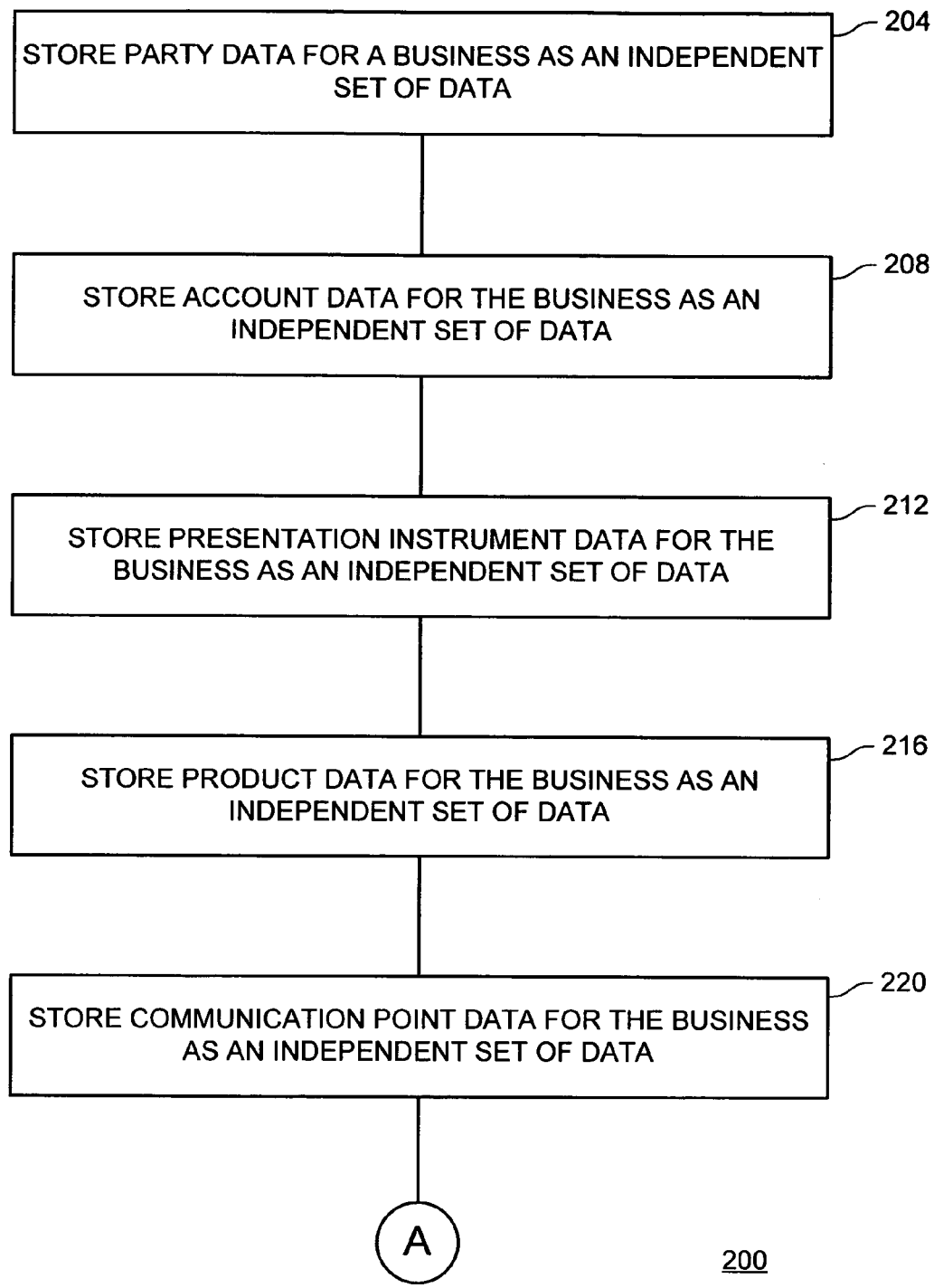
FIGS. 2A and 2B illustrate a flowchart for implementing a method of processing data for a service business according to one embodiment of the invention.
Figure 2B:
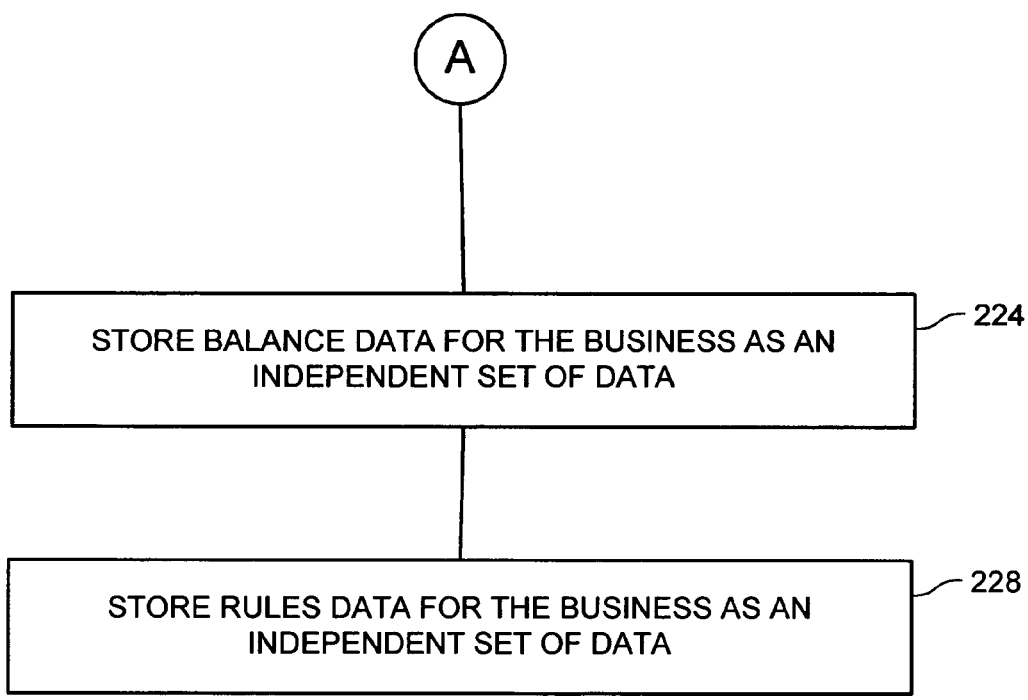

FIG. 2A illustrates the principle of dividing the architecture into separate subject areas. Namely, in flowchart 200 of FIGS. 2A and 2B, party data can be stored for a business as an independent set of data in block 204. Furthermore, in block 208, account data can be stored for the business as an independent set of data. Similarly, presentation instrument data for the business can be stored as an independent set of data in block 212 and one can store product data for the business as an independent set of data in block 216. Communication point data can be stored as an independent set of data in block 220, while balance data for the business can be stored as an independent set of data in block 224. Furthermore, rules data for the business can be stored as an independent set of data in block 228.

Figure 3A:
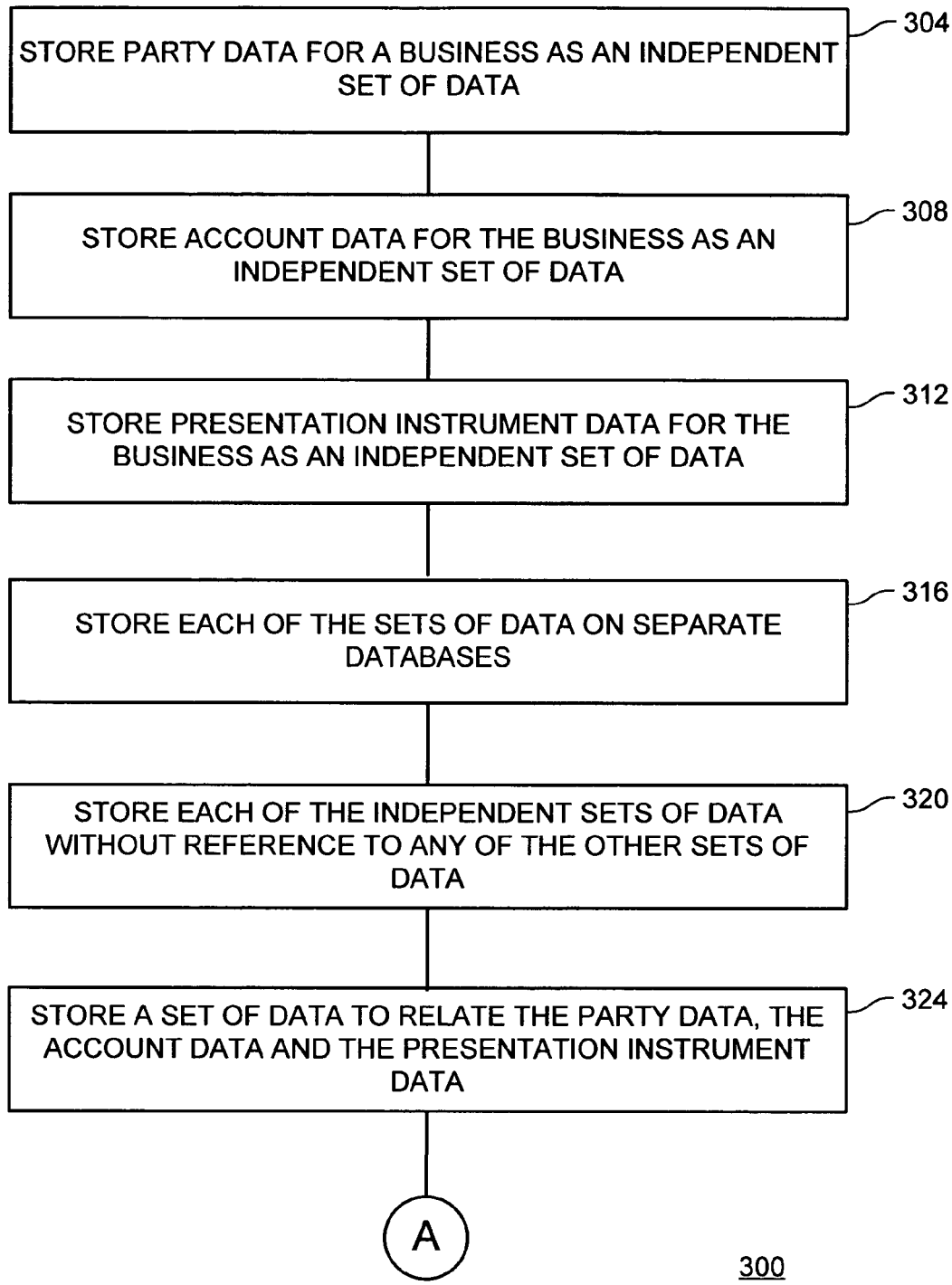
FIGS. 3A and 3B illustrate a flowchart for implementing a method of processing data according to one embodiment of the invention.
Figure 3B:
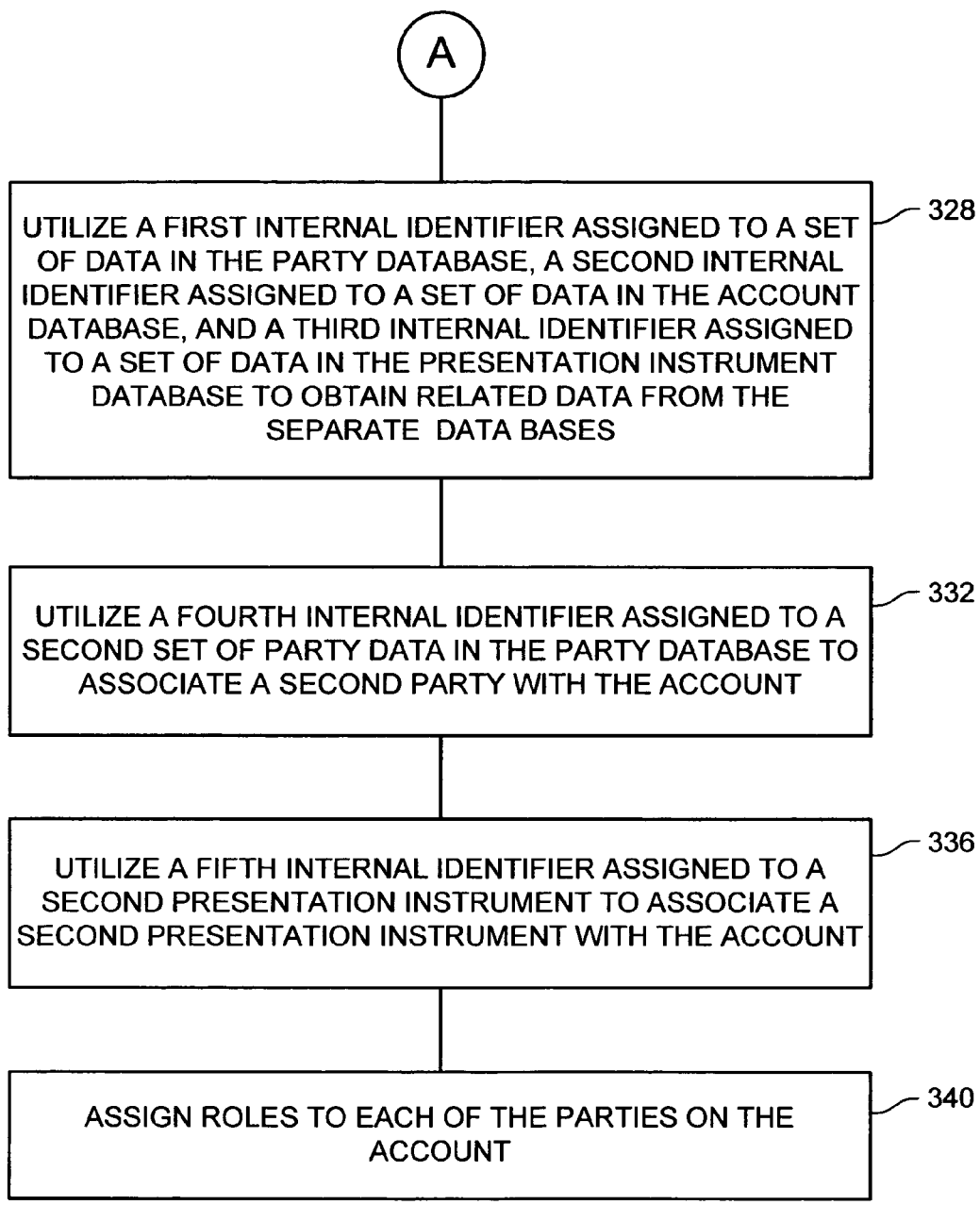

FIGS. 3A and 3B further illustrate another example of this principle. In block 304 of flowchart 300, one stores party data for a business as an independent set of data. In block 308, account data for the business is stored as an independent set of data. In block 312, presentation instrument data is stored for the business as an independent set of data. As illustrated by block 316, each of the sets of data is stored on a separate database. Storing the data on separate databases is a characteristic of this particular example and is not necessarily required if each of the sets of data can be maintained separately. In block 320, each of the independent sets of data is stored without reference to any of the other sets of data.

While party, account, and presentation instrument data sets can be stored independently, relationships between them can be established by managing associations defined by a specific service business. In block 324, a set of data to establish the relationship between party data, account data, and presentation instrument data is stored. To accomplish this, a first internal identifier is assigned to a set of data in the party database. Furthermore, a second internal identifier is assigned to a set of data in the account database, and a third internal identifier is assigned to a set of data in the presentation instrument database, as shown by block 328. These internal identifiers are grouped together, within a service business context, to form a set of internal identifiers which can be used to obtain data from each of the party, account, and presentation instrument databases for creating a specific instance of related information or set of data. A fourth internal identifier, which has been assigned to a party, can be utilized to associate a second party with the account as shown in block 332. Furthermore, a fifth internal identifier, which has been assigned to a specific presentation instrument, can be used to associate a second presentation instrument with the account as shown by block 336. Furthermore, each of the parties, i.e., the first and second parties, can be assigned a role as defined by a service provider for an account, as shown by block 340. It should be understood that a service provider can be a data processor or a client of a data processor. For example, First Data Resources of Omaha, Nebr. can act as a service provider or provide processing services for banks.

Account-Party Role

Referring to FIG. 1A, an example of a relationship between two subject areas can be seen. Namely, an association between the party subject area 101 and the account subject area 102 can be established to define the role that a party plays on an account in an account/party role database 120. This can be accomplished by associating party data with account data in the account party role database. An internal identifier generator can be utilized to generate internal IDs for each entry in each database. Thus, internal IDs can be generated for each instance of data stored in the party database as can internal IDs be generated for each set of data in the account database. The selected data elements from each database can be associated together by storing the internal IDs for each as a set of data in the account party role database along with the role which indicates the business reason for the association.

Figure 23:
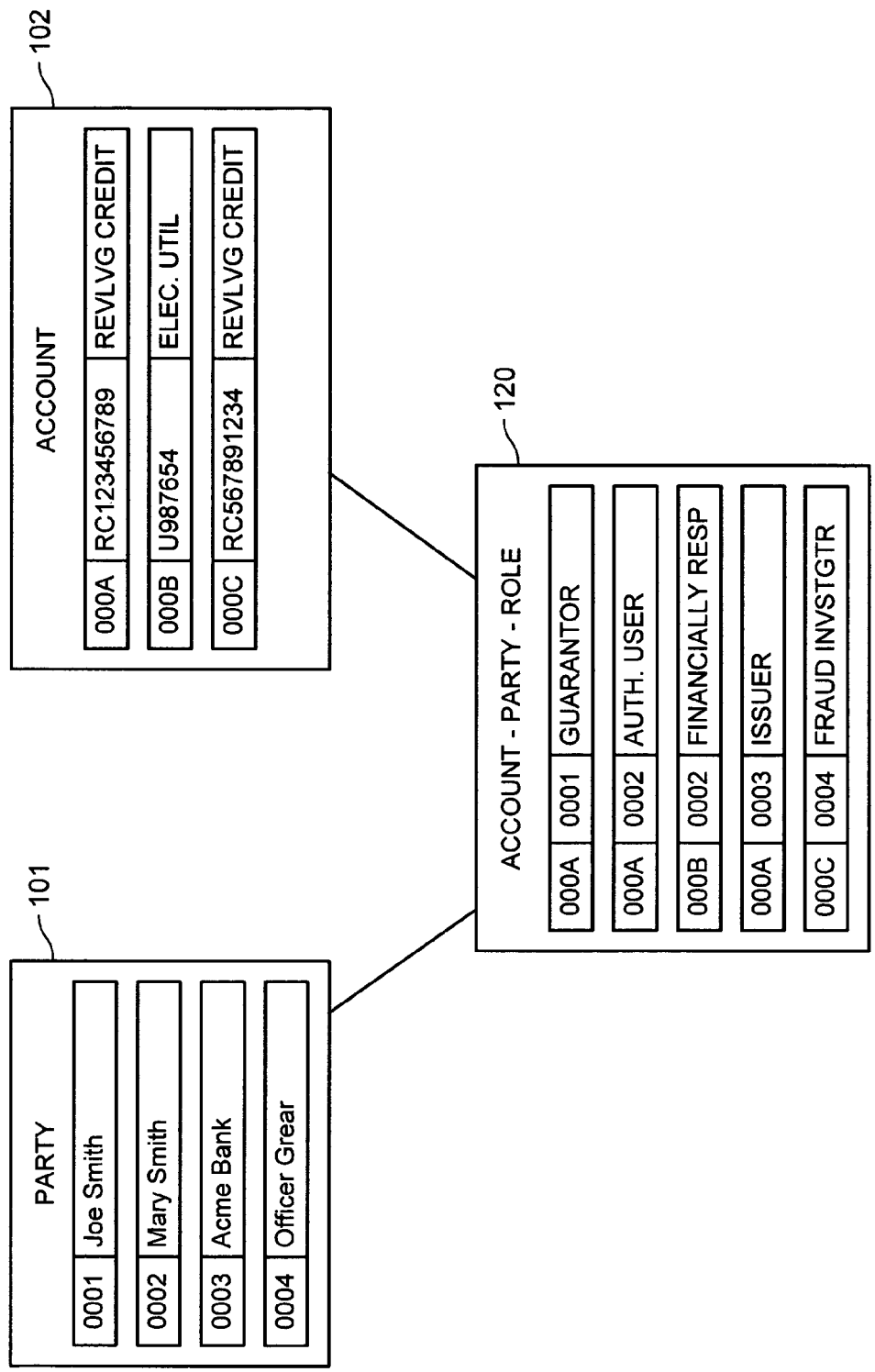
FIG. 23 illustrates a block diagram of an exemplary way of relating entries in different databases for facilitating one embodiment of the invention.

FIG. 23 illustrates an example of how data from two databases can be associated with one another. For example, a specific account in the account database 102 can be related to a specific party in the party database 101. This can be accomplished by obtaining the internal identifiers that have been assigned to the party of interest and the account of interest and storing them together as a new instance of related information in the account party role database 120. In addition to storing the internal identifiers of the party and the account, an attribute of role is added that completes the association. Thus, for example, the first entry shown in block 120 of FIG. 23 illustrates that the internal identifier 000A from the account database 102 has been associated with the internal identifier 0001 from the party database 101. Furthermore, the role information of "guarantor" has been added to indicate that the party identified as 0001 in the party database plays the role of guarantor on the account identified by the 000A entry in the account database. This is but one example of how data can be associated together to specify more detailed entries.

that account as guarantor. Thus, this is an example of how the party information and account information can be stored as separate sets of data or information, yet be utilized by another database to establish an association between two sets of information.

Table A demonstrates that, within the account party role database, multiple roles can be established for multiple parties on a single account. Furthermore, the example of Table A illustrates that relationships can be stored on the same database for different products, e.g., a revolving credit account, an electric utility account, and a different revolving credit account.

Figure 4:
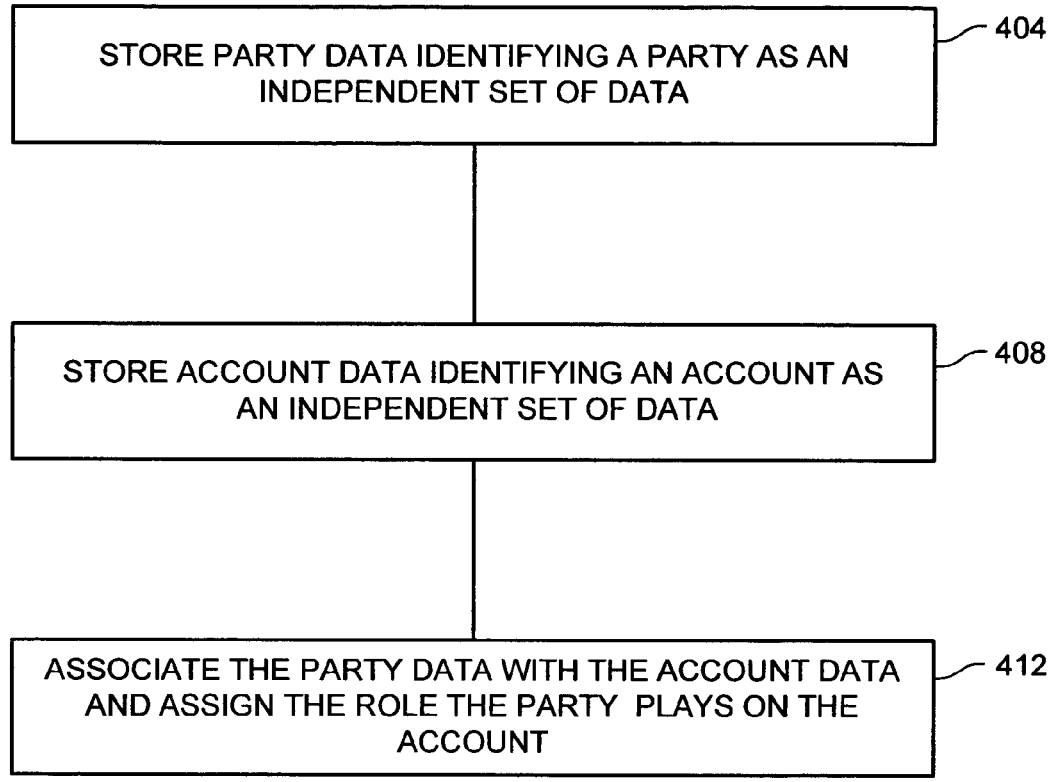
FIG. 4 illustrates a flowchart for processing data in a party-account relationship, according to one embodiment of the invention.

The account party role associative database is further illustrated in FIG. 4. In flowchart 400 of FIG. 4, block 404 shows that party data for a party is stored as an independent set of data. Furthermore, block 408 shows that account data for an account is stored as an independent set of data. Finally, block 412 shows that an entry in the party data is associated with an entry in the account data and assigned a role that the party plays on an account.

Table A further demonstrates the architecture shown in FIG. 1A. Essentially, a party, which is either an individual (Joe Smith, Mary Smith, Mike Grear) or an organization (Acme Accounting, Cross Department Store, Public Power District, Mega Telephone, First Data Corporation) contracts

TABLE A

| PARTY | INTERNAL PARTY ID | ROLE | ACCOUNT TYPE | ACCOUNT ID | INTERNAL ACCOUNT ID |
|---|---|---|---|---|---|
| Joe Smith | 0001 | Guarantor | Revolving Credit | RC123456789 | 000A |
| Mary Smith | 0002 | Authorized User | Revolving Credit | RC123456789 | 000A |
| Mary Smith | 0002 | Financially Responsible | Electric Utility | U987654 | 000B |
| Acme Accounting | 0003 | Accountant | Revolving Credit | RC123456789 | 000A |
| Officer Grear | 0004 | Fraud Investigator | Revolving Credit | RC567891234 | 000C |

Table A shows a grouping of information to define the role played by a party on a specific account. Thus, in the example of a revolving credit account, different parties can be assigned different roles for a single account. For example, Table A shows that Joe Smith has been established as the guarantor on a revolving credit account with the account ID of RC123456789. Similarly, Mary Smith has been established as the authorized user role on the same account. Finally, Acme Accounting has taken on the role of being the accountant for that revolving credit account. Thus, this example shows that party data can be coupled with account data and roles can be assigned to specific parties for a single account.

Table A also shows that the association can be accomplished by obtaining the internal party ID "0001" and the internal account ID "000A" and the data entry of "guarantor" as the role and storing that set of data in the account party role database. Thus, when that instance or set of information is retrieved from the account party role database, the data that has been assigned internal party ID 0001 can be retrieved from the party database to gain identifying information for Joe Smith while the data that has been assigned internal account ID 000A can be retrieved from the account database to show that account ID RC123456789, a revolving credit account, is the account referred to for that entry. Similarly, the account party role database will store the role to be played on with another party for a service and an account is created. The terms and conditions of the products contained within that service depend on the line of business the service provider is in. For each industry-defined type of account, there are specific roles to which a party can be assigned. The business model of the service provider defines the roles and rules around which those roles are assigned. Managing the roles on the account party role database allows a relationship between the party and account to change without affecting the party or account data and creates business value. For example, as a party's role to an account is removed or changed, business value can be created by retaining the history of the relationship role the party had with the account. The history of the role is kept by changing the status and date on the account party role instance that is no longer valid and by adding a new account party instance for the new role instead of updating the existing account party role instance with the new role.

Figure 5A:
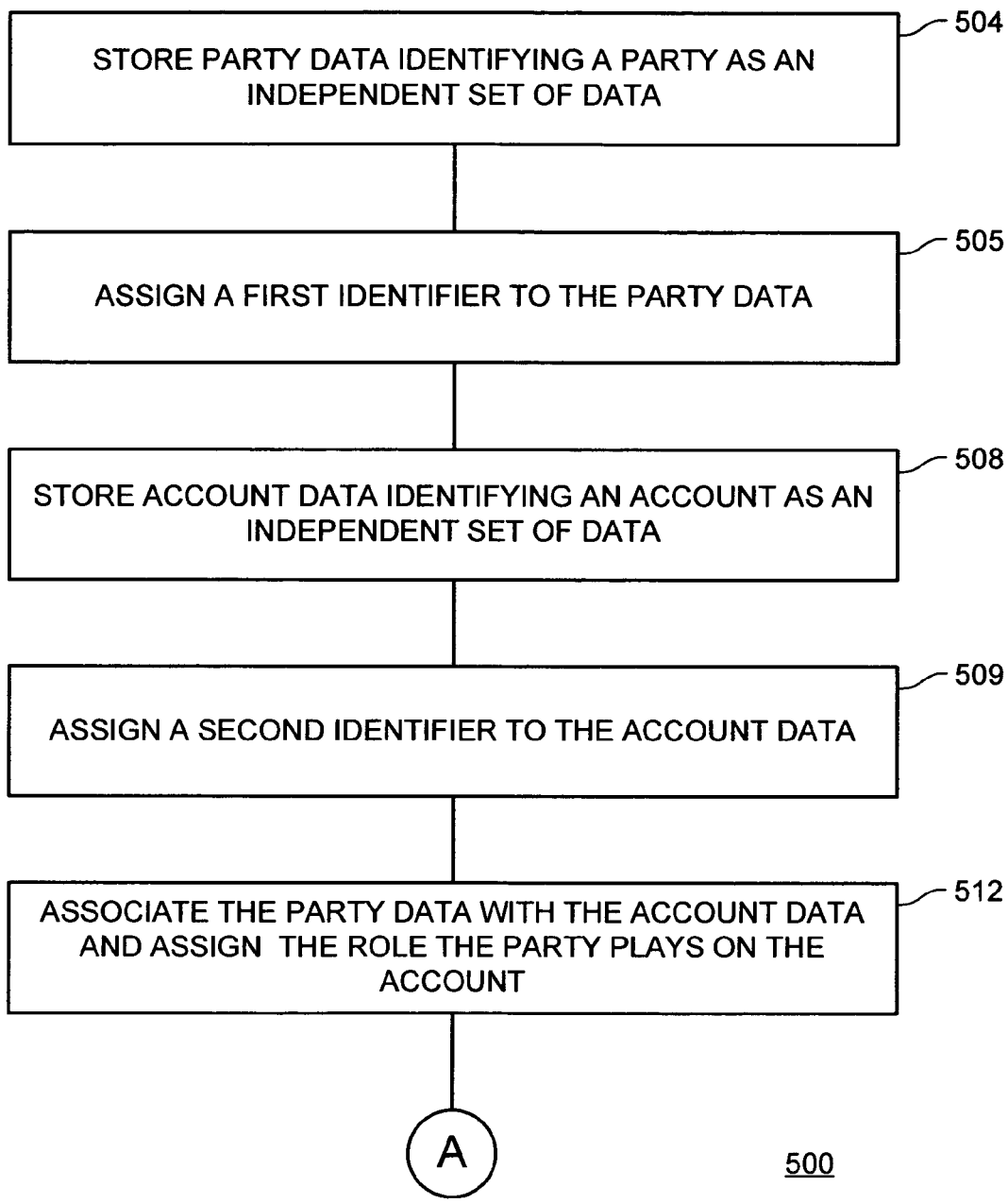
FIGS. 5A and 5B illustrate a flowchart demonstrating a method of processing data in a party-account relationship, according to one embodiment of the invention.
Figure 5B:
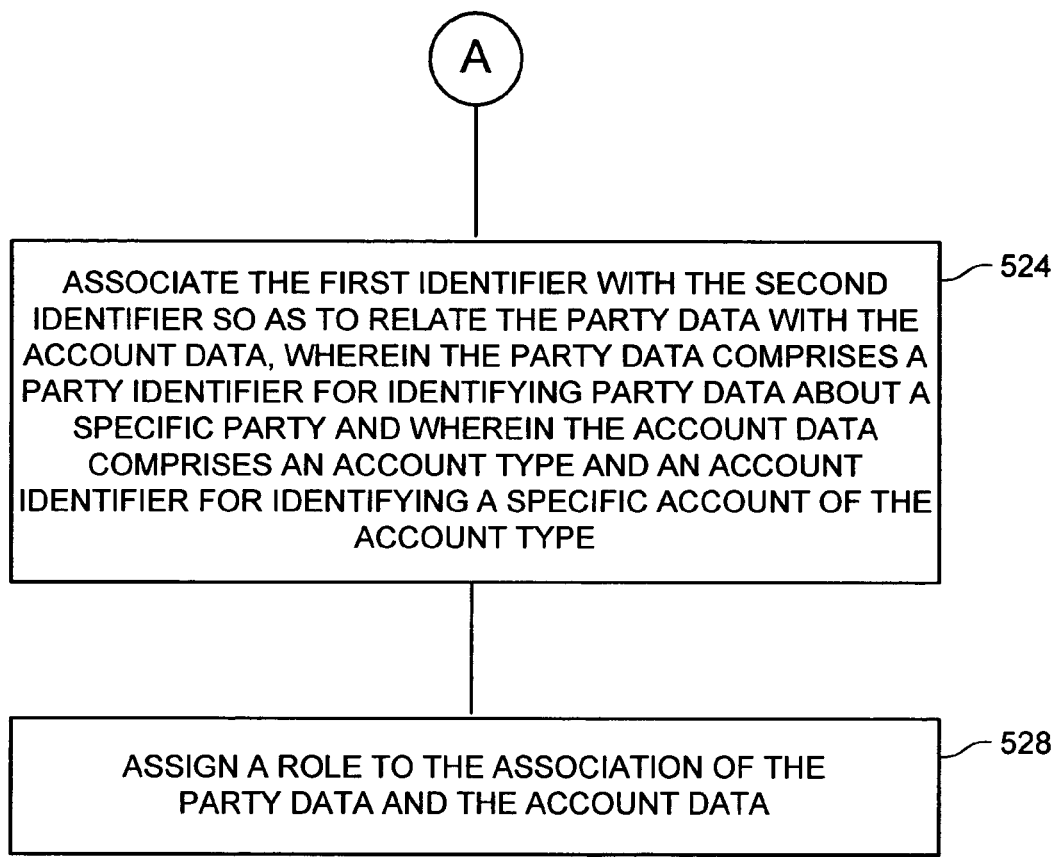

FIGS. 5A and 5B illustrate in more detail the method shown in FIG. 4. In block 504 of flowchart 500, party data identifying a party is stored as an independent set of data. In block 508, account data which identifies an account is stored as an independent set of data. In block 505, a first identifier is assigned to the party data, while in block 509, a second identifier is assigned to the account data. In block 512, the party data is associated with the account data and assigned a role so as to identify the party as playing a role on the account. This can be accomplished by entering in the account-party role database a particular role that is assigned to a party identifier and an account identifier. For example, in block 524, the first identifier can be associated with the second identifier so as to link or relate the party with the account, wherein the party data comprises a name of the party, and wherein the account data comprises an account type and an account identifier for identifying a specific account of the account type. In block 528, a specific role is assigned to the party and account association so as to establish the role played by the party on the account. This can be accomplished by storing the first identifier, second identifier, and role as a set of data stored on the account party role database. Thus, this allows the party information to be stored and managed independently from the account data while still establishing a relationship between the two.

PI-Account-Party Role

After a party has been assigned a role on an account, a presentation instrument may be assigned that will be used to generate transactions. This ternary association among the party, the account, and the presentation instrument is useful under the architecture shown in FIG. 1A.

Table B illustrates an example of how two parties can play different roles on different accounts with different presentation instruments. For example, for revolving credit account RC123456789, Joe Smith can play the role of guarantor while Mary Smith plays the role of authorized user. Joe Smith is entitled to use a presentation instrument of a transponder type with the presentation instrument identifier of PI987654321 while Mary Smith is entitled to use the presentation instrument of a plastic type having presentation instrument ID number PI123456788. In this same database, an electric utility service can be supported by indicating that Mary Smith plays the role of a responsible party on an electric utility account having ID number U987654 wherein the presentation instrument is the meter located at Mary Smith's residence having ID number M78542573.

Figure 6:
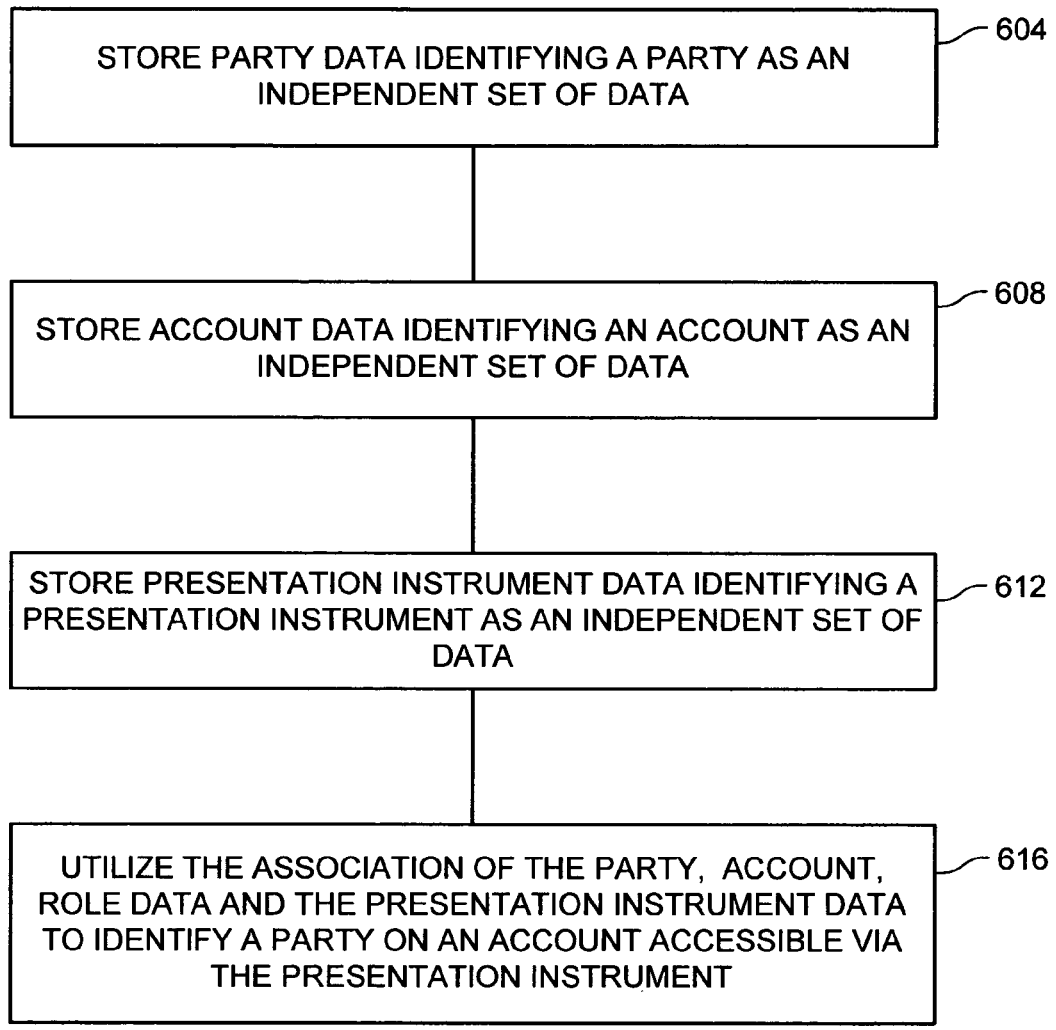
FIG. 6 illustrates a flowchart demonstrating a method of processing data for a party-account-presentation instrument relationship, according to one embodiment of the invention.

FIG. 6 illustrates an example of implementing Table B, for example. In flowchart 600, block 604 shows that one can store party data identifying a party as an independent set of data. In block 608, one can store account data identifying an account as an independent set of data. In block 612, one can store presentation instrument data identifying a presentation instrument as an independent set of data. In block 616, one can utilize the party/account/role data, and the presentation

TABLE B

| PARTY | INTERNAL PARTY ID | ROLE | ACCOUNT TYPE | ACCOUNT ID | INTERNAL ACCOUNT ID | PI TYPE | PI ID | INTERNAL PI ID |
|---|---|---|---|---|---|---|---|---|
| Joe Smith | 0001 | Guarantor | Revolving Credit | RC123456789 | 000A | Transponder | PI987654321 | Z001 |
| Mary Smith | 0002 | Authorized User | Revolving Credit | RC123456789 | 000A | Plastic | PI123456788 | Z002 |
| Mary Smith | 0002 | Financially Responsible | Electric Utility | U987654 | 000B | Meter | M78542573 | Z003 |

Table B illustrates an example of data relationships identified by the PI/account/party/role database 122 of FIG. 1A. Namely, Table B shows party information, role information, account information, and presentation instrument information. Also shown are internal identifiers. The internal identifiers correspond with entries in each of the three databases. By associating the internal identifiers in the PI/account/party/role databases, the entries of information listed in Table B could be obtained. Alternatively, the party role and account information could be obtained from the internal identifiers associated in an entry in the account party role database.

The management of access to an account is established or eliminated for individuals or organizations by applying the proper status or adding other presentation instrument types and identifiers for a specific party. The business model of the particular service provider can indicate which role on the account may receive a presentation instrument. The service provider can also decide which combination of P1/account/party/role makes sense for its business. For example, a single presentation instrument shared by multiple individuals for one account can be utilized or a single presentation instrument shared by multiple individuals for several accounts can be utilized. Similarly, multiple presentation instruments for a single individual can be utilized for a single account or multiple presentation instruments shared by multiple individuals can be utilized for one account. Thus, many associations between PI/account/party/role that make business sense for a service provider are allowed by the architecture shown in FIG. 1A.

instrument data to identify a party on an account accessible via a given presentation instrument.

Figure 7A:
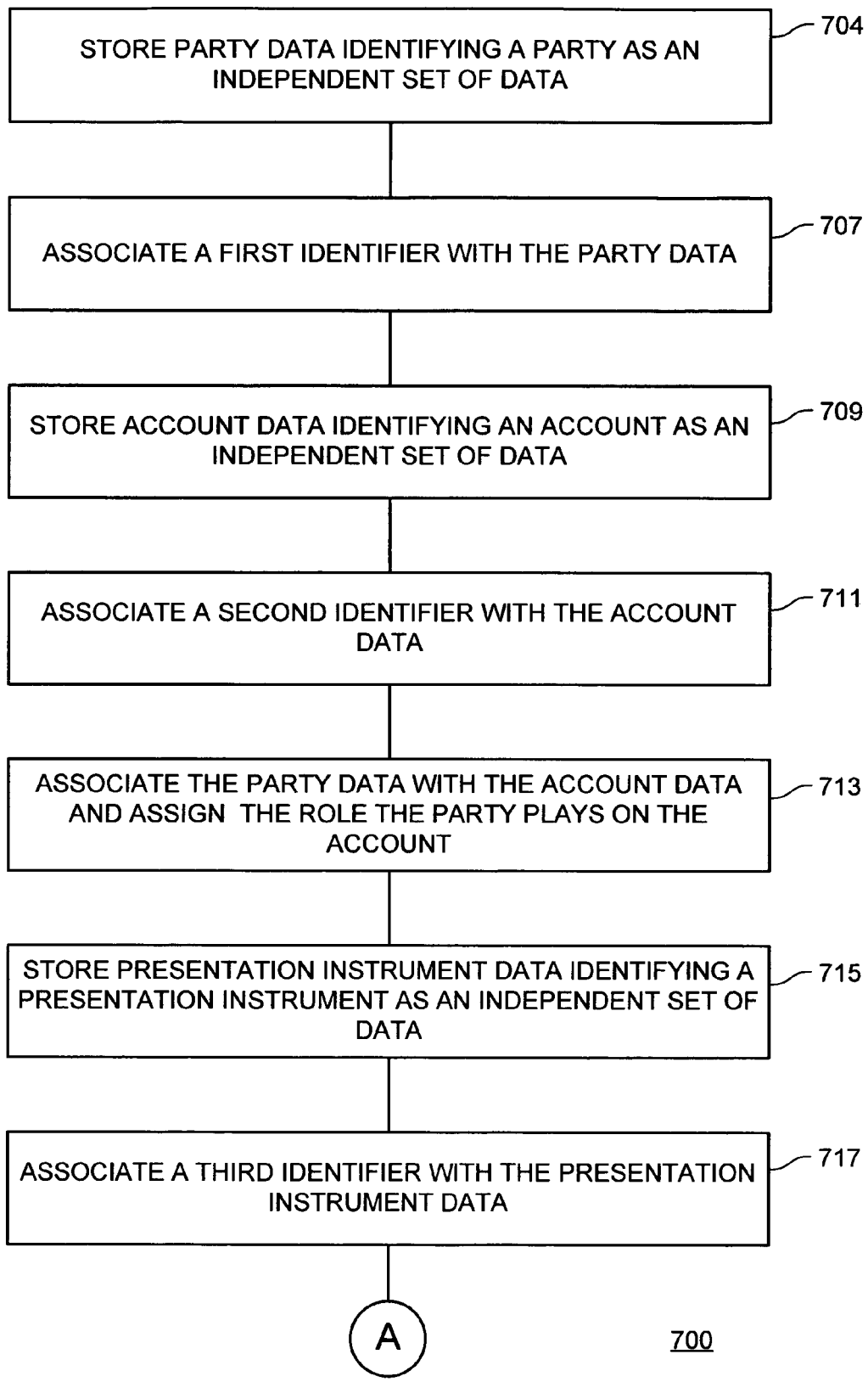
FIGS. 7A and 7B illustrate a flowchart for implementing a method of processing data for a party-account-presentation instrument relationship according to one embodiment of the invention.
Figure 7B:
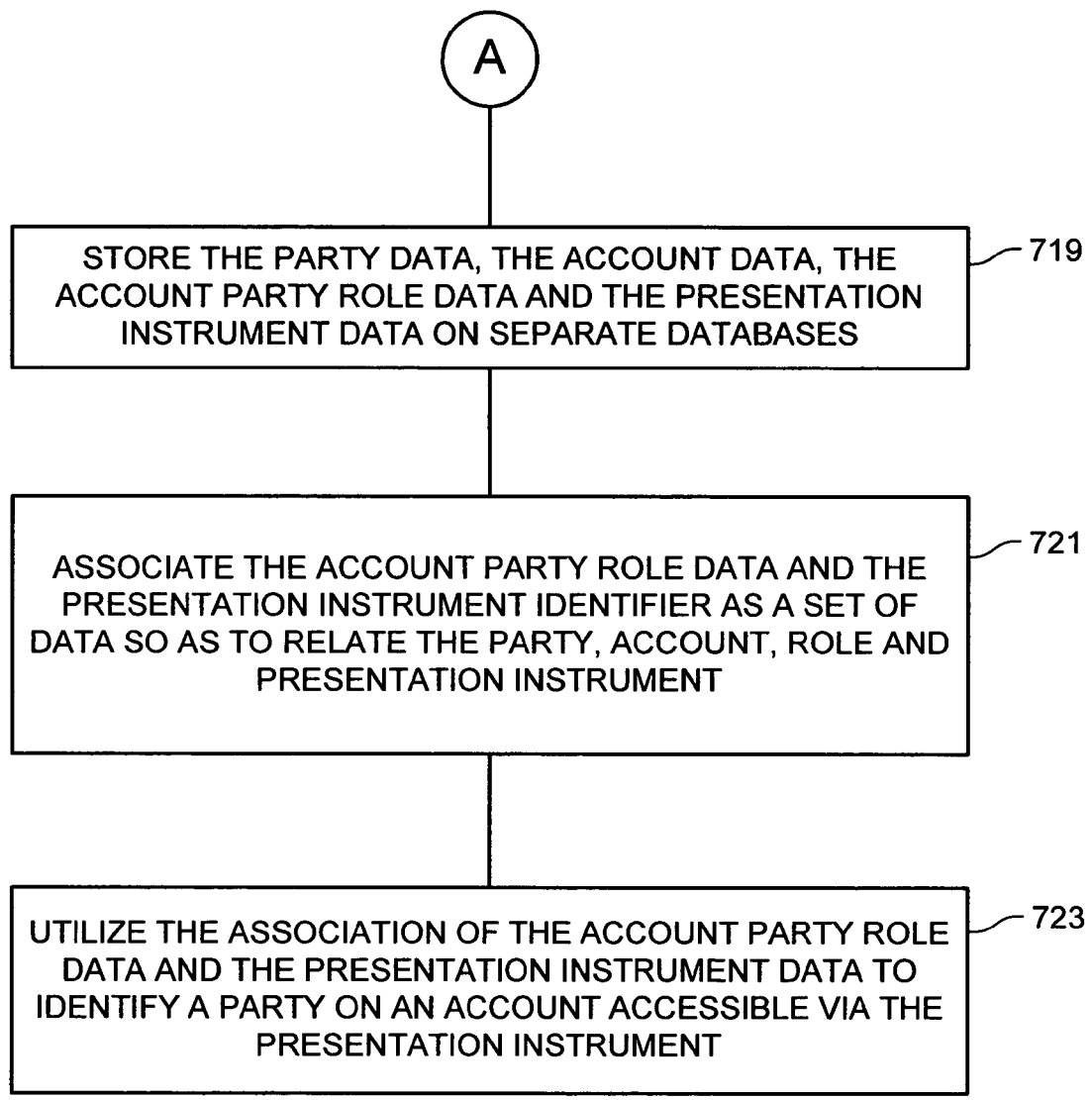

FIGS. 7A and 7B illustrate a more detailed example of the combination of presentation instrument, account, and party role data. In flowchart 700, party data is stored for identifying a party as an independent set of data in block 704. In block 707, a first identifier is associated with the party data. In block 709, account data for identifying an account is stored as an independent set of data, such as in database 102. In block 711, a second internal identifier is associated with the account data. In block 713, the party data is associated with the account data and assigned a role so as to identify the party as playing a role on the account. In Block 715, presentation instrument data for identifying a presentation instrument is stored as an independent set of data in block 715. In block 717, a third internal identifier is associated with the presentation instrument data. Each of these identifiers can be internal identifiers generated by the system architecture for management of the databases. Block 719 reflects that the party data, the account data, and the presentation instrument data can be stored on separate databases such as party database 101, account database 102, and PI database 103. In block 721, the first identifier, the second identifier, and the third identifier are associated as a set of data so as to relate the party, the account, and the presentation instrument with one another. In block 723, one can utilize the party data, the account data, and the presentation instrument data to identify a party on an account accessible via the presentation instrument. Thus, as shown in Table B, internal identifiers are associated with the party data, the account data, and the presentation instrument data.

Party-Communication Point

FIG. 1A illustrates another relationship between two subject areas, namely the relationship between the party subject area and the communication point subject area. A party-communication point database can be established to define the relationship that an individual, organization, or organization unit has with a type of communication point. Thus, this allows one to establish whether the type of association is a home, employer, temporary, return address, etc regardless of the communication point type (geographic, electronic, telephonic, etc.).

This database of the party-communication point information is useful in that it allows a service provider to understand how many of their service users have a relationship with the same communication point for marketing and cost-reduction purposes. For example, a credit card company can determine how many letters it is sending to the same communication point with advertisements. If a family of card holders resides at the same address, multiple mailings may be sent there inadvertently when one would suffice. Similarly, billing statements could be combined for the same party who has multiple accounts but is located at one communication point.

TABLE C

| PARTY | INTERNAL PARTY ID | RELATIONSHIP TYPE | COMM POINT ID | COMM TYPE | INTERNAL COMM PT. ID |
|---|---|---|---|---|---|
| Joe Smith | 0001 | Home | CP123456789 | Geographic | H0001 |
| Mary Smith | 0002 | Employer | CP787663524 | Geographic | H0002 |
| Mary Smith | 0002 | Home | CP123456789 | Geographic | H0001 |
| Acme Accounting | 0003 | Return Address | CP918273764 | Geographic | H0003 |
| Officer Grear | 0004 | Employer | CP567891234 | Geographic | H0004 |

Table C illustrates an example of a relationship of information that can be identified by a party communication point database. An entry is shown for the party Joe Smith and communication point ID CP123456789. This entry further indicates the association between the communication point and Joe Smith as home and that it is a geographic communication point. Table C further illustrates the fact that the communication point with identifier CP123456789 is used by both Joe and Mary Smith as their home address.

Figure 8:
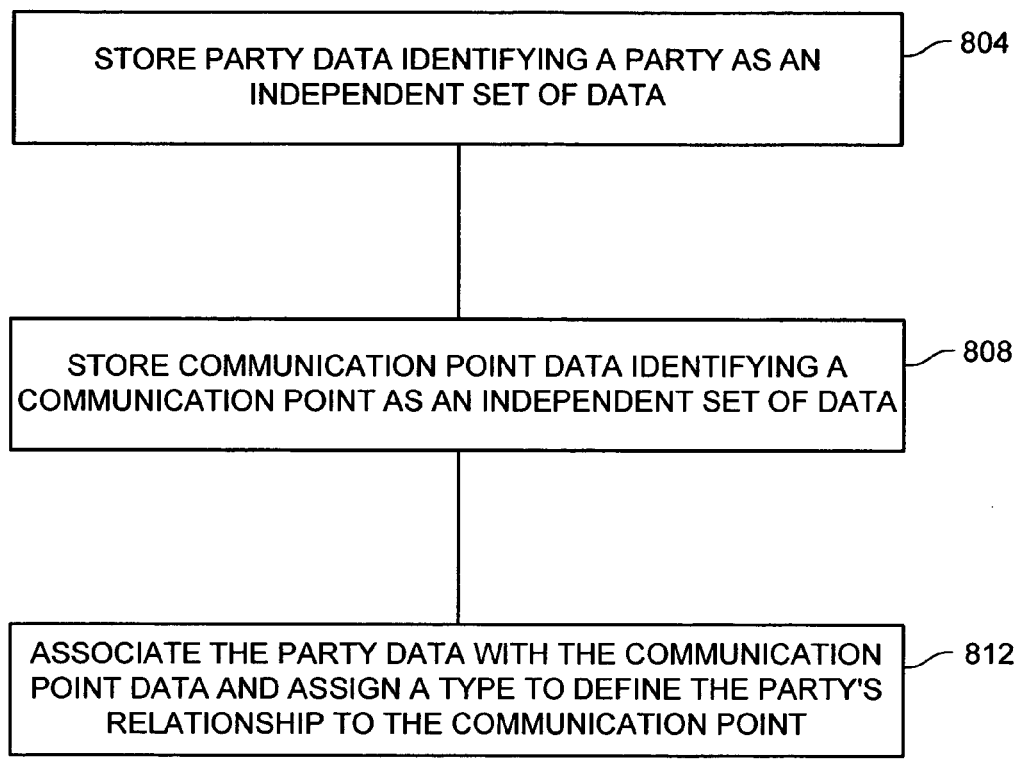
FIG. 8 illustrates a flowchart for implementing a method of processing data for a party-communication point relationship according to one embodiment of the invention.

Referring now to FIG. 8, flowchart 800 illustrates a method of implementing a party communication point database. In block 804, party data identifying a party is stored as an independent set of data, such as in party database 101. In block 808, communication point data identifying a communication point is stored as an independent set of data, such as in communication point database 104. In block 812, the party data is associated with the communication point data and the association is assigned a type.

Figure 9:
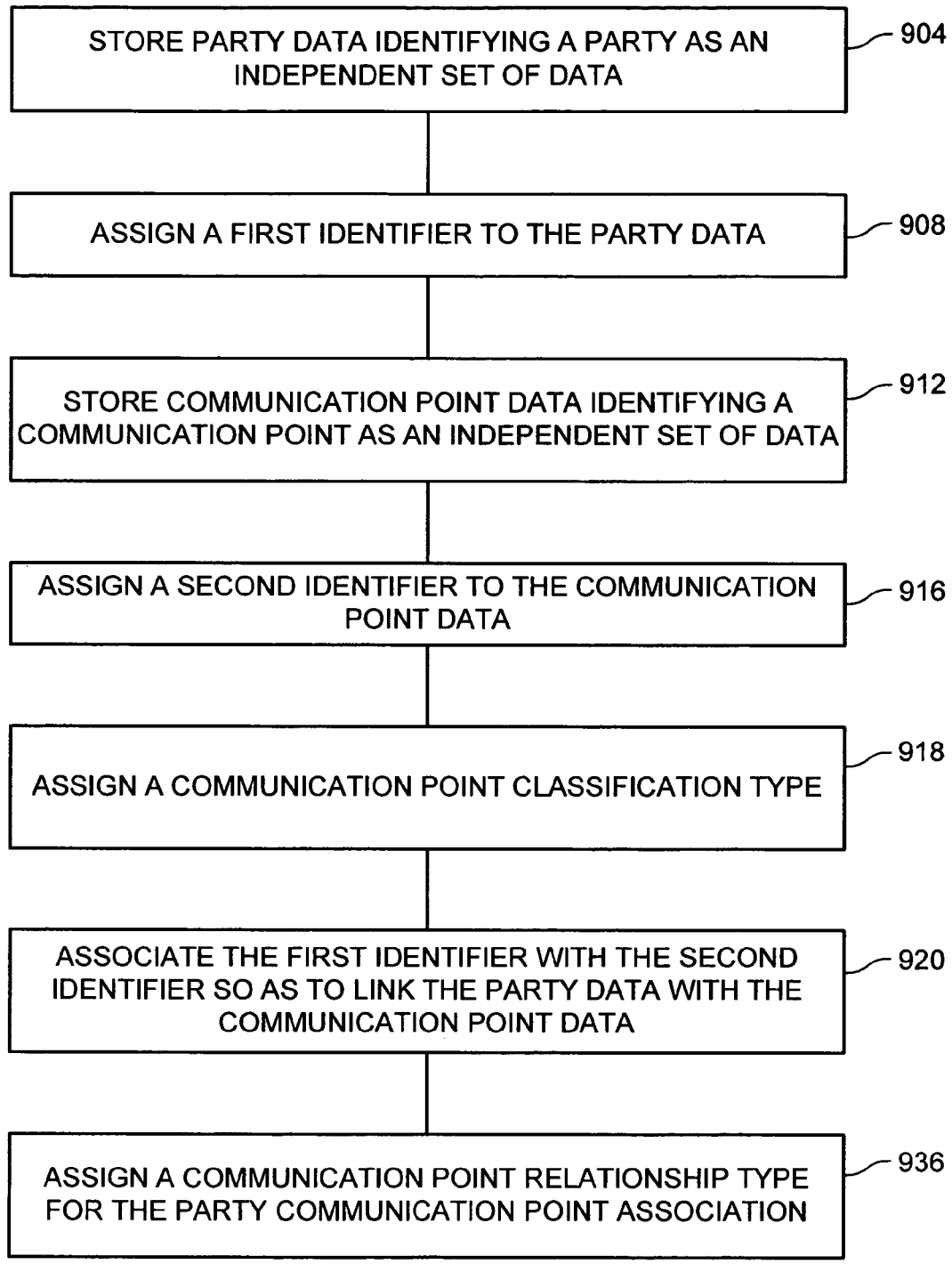
FIG. 9 illustrates a flowchart for implementing a method of processing data for a party-communication point relationship according to one embodiment of the invention.

A further example is shown in FIG. 9. In block 904 of flowchart 900, party data identifying a party is stored as an independent set of data. In block 908, a first identifier is associated with data for a specific party. In block 912, communication point data identifying a communication point is stored as an independent set of data. In block 916, a second identifier is associated with the data for the communication point. In block 918, a communication point classification type is assigned to the communication point data entry. In block 920, the first identifier is associated with the second identifier as a single data entry so as to relate the specific set of party data with the specific set of communication point data and so as to identify the communication point as being assigned to the party. In block 936, a communication point relationship type is assigned to the association for the specific set of party data and the specific set of communication point data. This can be accomplished by storing the first identifier, second identifier, and communication point relationship type as a set of data stored on the party communication point type database. Thus this allows the party information to be stored and managed independently from the communication point data while still establishing a relationship between the two data entries.

Communication Point Usage

Referring now to Table D, the relationship of communication point usage can be better understood.

TABLE D

| PARTY | ROLE | ACCOUNT TYPE | ACCOUNT ID |
|---|---|---|---|
| Joe Smith | Guarantor | Revolving Credit | RC123456789 |
| Joe Smith | Guarantor | Revolving Credit | RC123456789 |
| Mary Smith | Authorized User | Revolving Credit | RC123456789 |
| Mary Smith | Payor | Electric Utility | U987654 |
| Acme Accounting | Accountant | Revolving Credit | RC123456789 |

TABLE D-continued

| Officer Grear | Fraud Investigator | Revolving Credit | RC567891234 |
|---|---|---|---|

| USES | | | |
|---|---|---|---|
| PARTY | RELATIONSHIP TYPE | COMM POINT ID | COMM TYPE |
| Joe Smith | Home | CP123456789 | Geographic |
| Joe Smith | Home | CP123456789 | Geographic |
| Joe Smith | Home | CP123456789 | Geographic |
| Mary Smith | Employer | CP787663524 | Geographic |
| Acme Bank | Return Address | CP918273764 | Geographic |
| Officer Grear | Employer | CP567891234 | Geographic |

Usage Type

Plastics
Statements
Letters
All Communications
Statement
Fraud Contact

The communication point usage relationship allows a party communication point to be associated with an account party role. The account party role entries indicate the role that a specific party will play on an account. The party communication point indicates a communication point for a particular party. By linking entries for the party communication point and the account party role, a specific usage can be added as well. Thus, a type of communication can be indicated. Table D illustrates three sets of data, the party/communication point data, and the party/account role set of data, and usage types for these cross-referenced entries. For example, the first entry in the party/account role database is for Joe Smith as guarantor on an account. Furthermore, the first entry in the party/communication database is for Joe Smith's geographic home location. The first entry for the usage type is plastics. Thus, Table D illustrates that any communications relating to plastics, such as new credit cards, are sent to Joe Smith at his geographic home address. Similarly, the second entry in each of the three sets of data indicates that statements are sent to Joe Smith as guarantor to his home geographic address. The third entry indicates that any letters for Mary Smith in her role as authorized user on the revolving credit account RC123456789 are to be sent to Joe Smith's home geographic address. However, the fourth entry indicates that any communications to Mary Smith in her role as the payor for electric utility account U987654 are to be sent to Mary Smith's employer's geographic address. The fifth entry indicates that any statement communication for Acme Accounting as accountant on revolving credit account RC123456789 are to be sent to the geographic return address entry for Acme Accounting identified by communication point ID CP918273764. The sixth entry indicates that any fraud contacts for revolving credit account RC567891234 should be sent to Officer Grear in his role as fraud investigator at his employer's geographic address indicated by communication point ID CP567891234.

The example of Table D indicates that, once entries are established in different relationship databases, they may be combined for further relationships. Thus, an entry in the account party role database 120 can be associated to an entry in the party communication point database 130 to establish a communication point usage entry in communication point usage database 132. Again, internal identifiers can be associated with each entry in the account party role database and the party communication point database to associate instances (i.e., data) from each of those databases. Furthermore, each of those associations can include additional information such as the usage type (plastics, statements, letters, all communications, return address, fraud contacts, etc.) for that particular entry.

Account Product

Referring now to Table E, yet another relationship shown in FIG. 1A can be understood. The product database 107 and the account database 102 can establish an account product relationship database 160. The account product association allows several products to be attached to a single account. This allows, for example, a transaction to use the most advantageous set of product terms for which the party has contracted. Table E illustrates different product types such as revolving credit, loyalty program, checking, brokerage, electric utility, and level payment. Table E also illustrates that the same account's ID is included for the revolving credit, loyalty program, checking, and brokerage accounts, and that another ID is associated with the electric utility and level payment product types.

TABLE E

| PRODUCT TYPE | INTERNAL PRODUCT ID | ACCOUNT ID | INTERNAL ACCOUNT ID |
| --- | --- | --- | --- |
| Revolving Credit | P001 | RC123456789 | 000A |
| Loyalty Program | P002 | RC123456789 | 000A |
| Checking | P003 | RC123456789 | 000A |
| Brokerage | P004 | RC123456789 | 000A |
| Electric Utlity | P005 | U987654 | 000B |
| Level Payment | P006 | U987654 | 000B |

Thus, for example, when a customer wants to receive a billing statement, the common account ID number can be used to include all of the different product types in the same mailing. Thus, distinct products such as checking and revolving credit can be included in the same statement mailing since the same account ID applies to both of them.

Figure 10:
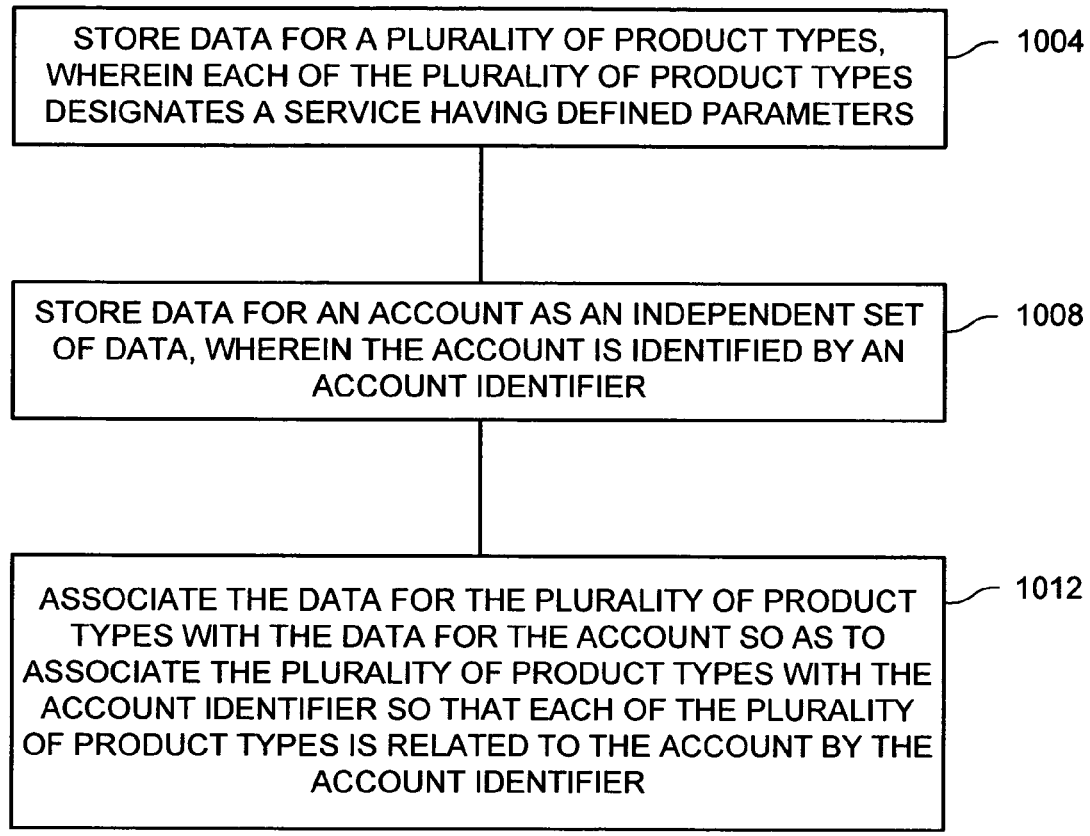
FIG. 10 illustrates a flowchart for implementing a method of processing data for a product-account relationship, according to one embodiment of the invention.

FIG. 10 illustrates a flowchart 1000 for implementing the account product relationship database. In block 1004, data for multiple product types is stored wherein each of the plurality of the product types designates a product having defined parameters. In block 1008, data for an account is stored as an independent set of data wherein the account is identified by an account identifier. In block 1012, the data for the plurality of product types is associated with the data for the account so as to associate the plurality of product types with the account identifier so that each of the plurality of product types is related to the account by the account identifier.

Figure 11:
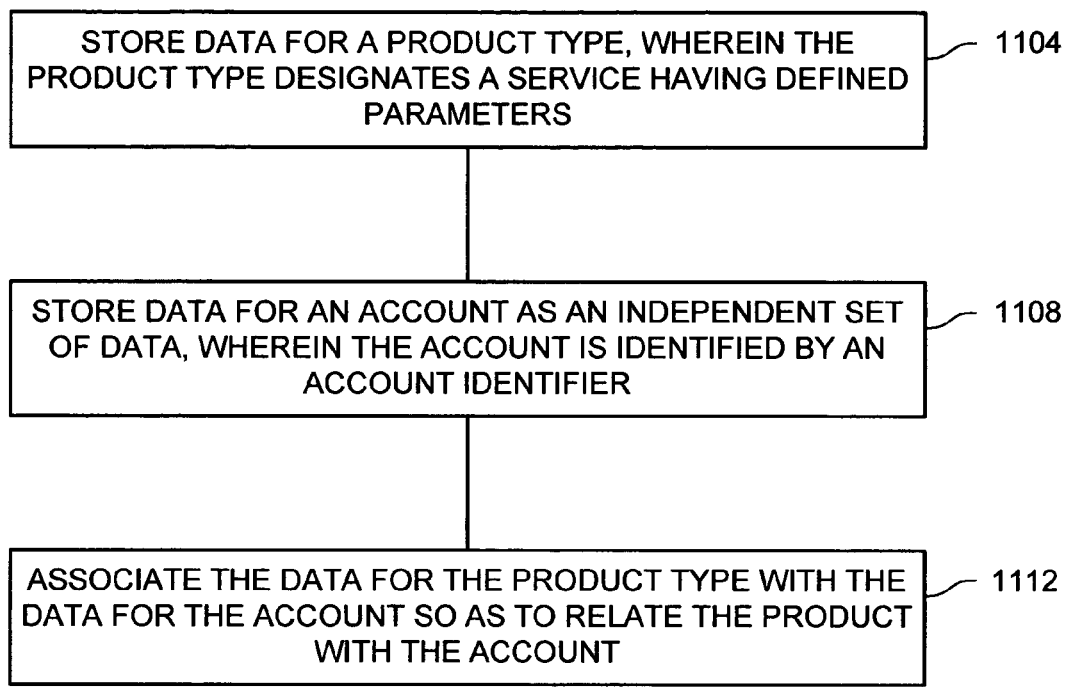
FIG. 11 illustrates a flowchart for implementing a method of processing data for a product-account relationship, according to one embodiment of the invention.

FIG. 11 illustrates another example of the account product relationship. In flowchart 1100, block 1104 indicates that the data is stored for a product type wherein the product type designates a product having defined parameters. In block 1108, data is stored for an account as an independent set of data, wherein the account is identified by an account identifier. In block 1112, the data for the product type is associated with the data for the account so as to relate the account with the product type.

Figure 12:
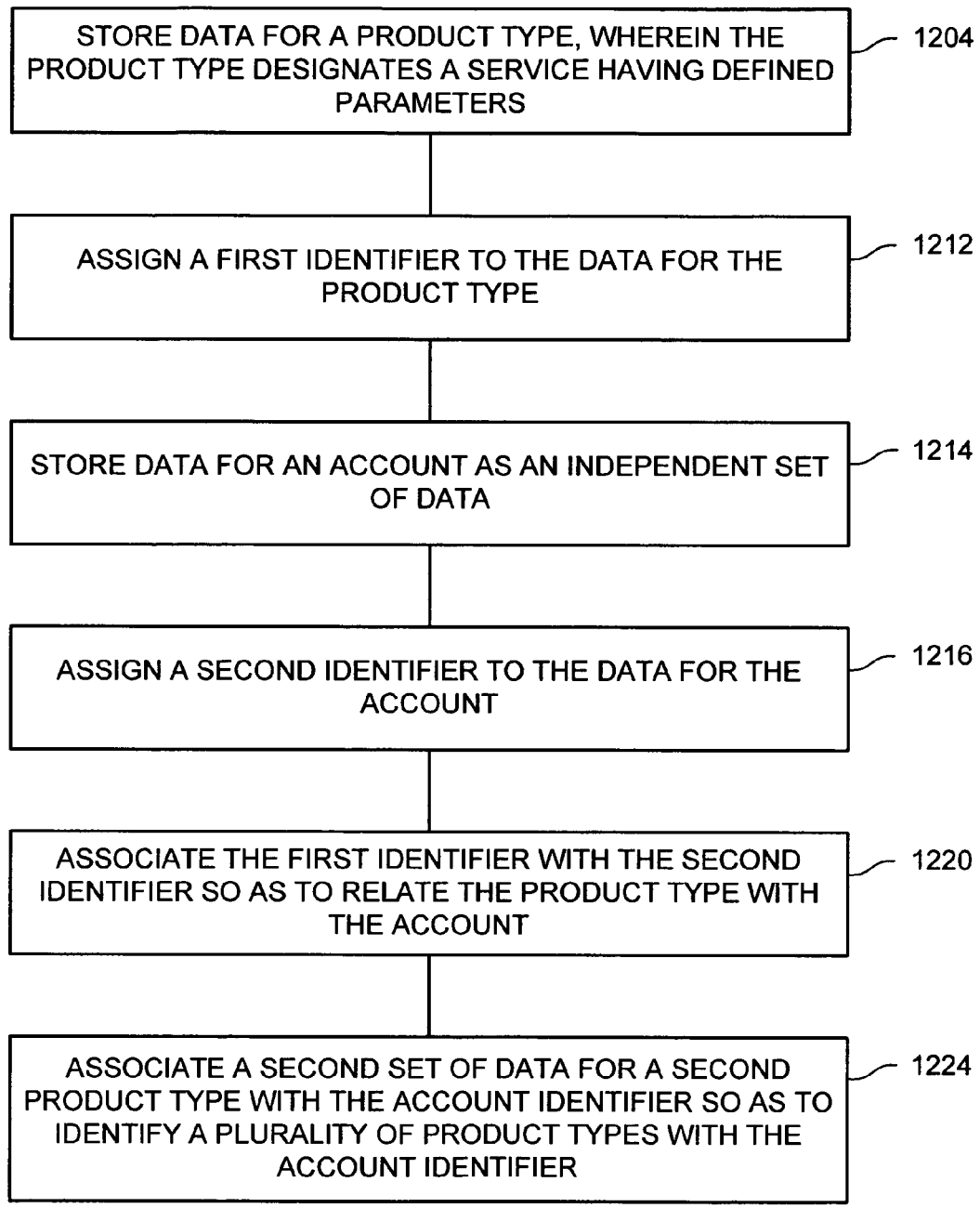
FIG. 12 illustrates a flowchart for implementing a method of processing data for a product-account relationship, according to one embodiment of the invention.

Referring to FIG. 12, a flowchart 1200 further illustrates the account product relationship. In block 1204, data is stored for a product type, wherein the product type designates a product having defined parameters. In block 1212, a first identifier is associated with the data for the product type. This can be seen in Table E by the internal product ID P0001 being associated with product type "revolving credit." In block 1214, data is stored for an account as a separate set of data, wherein the account is identified by an account identifier. In block 1216, a second identifier is associated with the data for the account information. Thus, internal account ID 000A is associated with account ID RC123456789. In block 1220, the first identifier is associated with the second identifier so as to associate the data for the product type with the data for the account. Furthermore, in block 1224, a second set of data for a second product type is associated with the account identifier so as to identify a plurality of product types with the account identifier. This is illustrated by Table E, in which the revolving credit, loyalty program, checking, and brokerage accounts are all associated with account ID RC123456789.

Account Balance

Once the account product database information is established, account balance relationships can be established as well. The account balance relationship associates the balances defined in the terms and conditions of a product to a specific account.

TABLE F

| PRODUCT TYPE | ACCOUNT ID | INTERNAL PRODUCT/ ACCOUNT ID | BALANCE TYPE | INTERNAL BALANCE ID |
|---|---|---|---|---|
| Revolving Credit | RC123456789 | PA0001 | Open To Buy | B0001 |
| Revolving Credit | RC123456789 | PA0001 | Cash | B0002 |
| Revolving Credit | RC123456789 | PA0001 | Credit | B0003 |
| Revolving Credit | RC123456789 | PA0001 | Interest | B0004 |
| Loyalty Program | RC123456789 | PA0002 | Points | B0005 |
| Checking | RC123456789 | PA0003 | Balance | B0006 |
| Brokerage | RC123456789 | PA0004 | Stock | B0007 |
| Electric Utility | U987654 | PA0005 | Mega Watts Used | B0008 |
| Level Payment | U987654 | PA0006 | Payment Balance to Date | B0009 |

Table F illustrates the account product information of Table E associated with specific balance types. For example, revolving credit accounts associated with account ID RC123456789 can be linked to four different balances. Namely, Table F shows that balance types of "open to buy", "cash", "credit", and "interest" can be established as individual balance types for account RC123456789. Similarly, the loyalty program product associated with account ID RC123456789 can be established with a points balance. The checking product associated with account ID RC123456789 can be associated with a checking balance and the brokerage product associated with account ID RC123456789 can be associated with a balance type of "stock". The electric utility product associated with account U987654 can be associated with a balance type of "megawatts used" while the level payment product associated with the account ID U987654 can be associated with the balance type of "payment balance to date".

To establish the relationship between the product and accounts and balance type, internal identifiers can once again be generated for each entry in the account database and each entry in the balance database. Then, the internal identifiers can be associated and stored in the account balance database. The association of the internal identifiers associates the information shown as entries in Table F.

Figure 14:
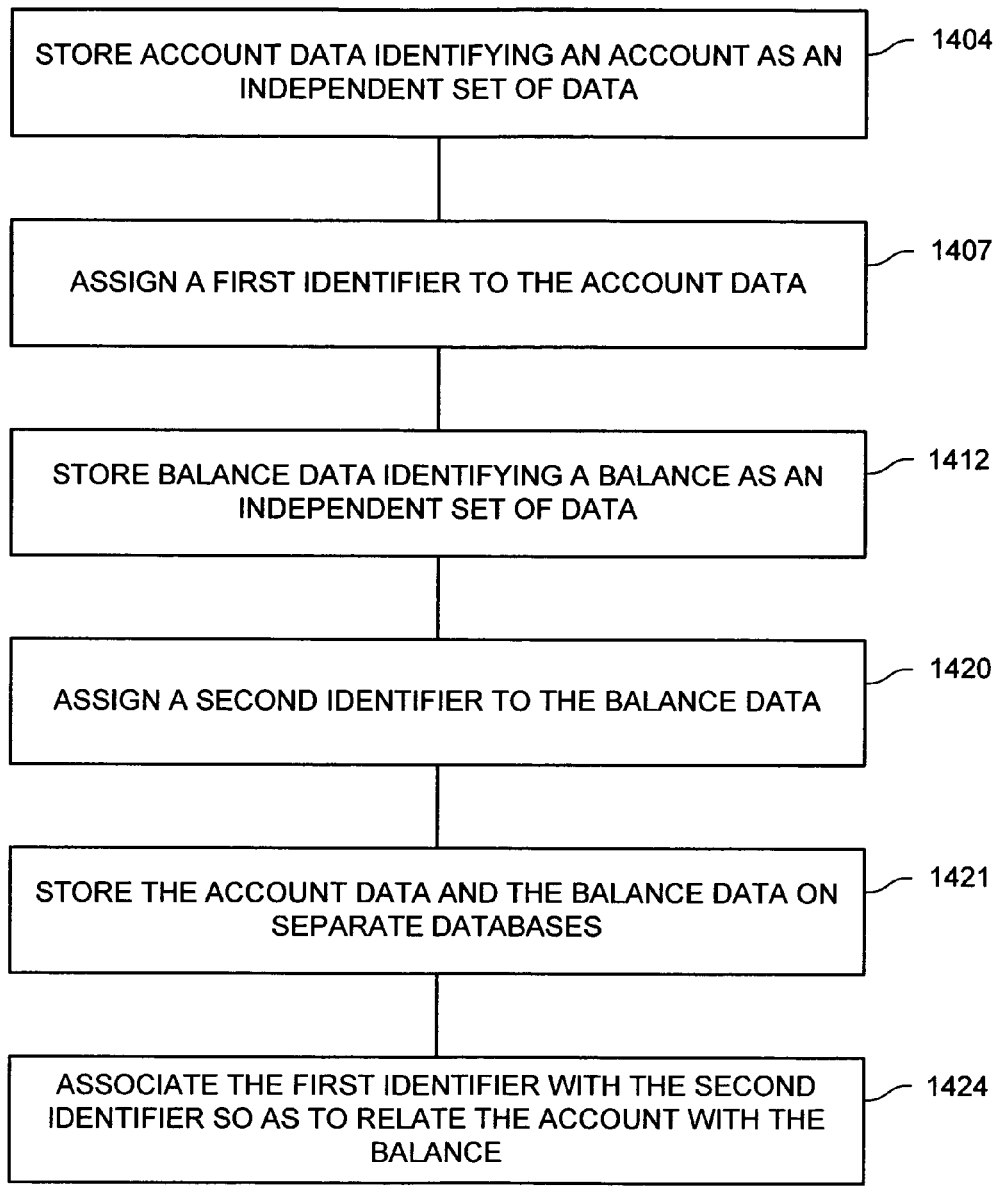
FIG. 14 illustrates a flowchart for implementing a method of processing data for an account-balance relationship, according to one embodiment of the invention.

Referring now to FIG. 14, a method of implementing the account balance relationship can be seen. FIG. 14 illustrates a flowchart 1400 for a method of relating an account with a balance. As can be seen in FIG. 14 in block 1404, account data for identifying a particular account is stored as an independent set of data. Similarly, in block 1412, balance data identifying a balance is stored as an independent set of data. In block 1421, the account data and balance data are stored on separate databases. Thus, the account data can be stored on the account database and the balance data can be stored on the balance database.

In block 1407, a first identifier is assigned to the account data. Similarly, in block 1420, a second identifier is assigned to the balance data. Since the account data is identified by the first identifier and the balance data is identified by the second identifier, the association of the first identifier with the second identifier establishes a relationship between the account and the balance. Thus, the first identifier and the second identifier can be stored as a set of data. Consequently, the account data and the balance data are associated so as to relate the account with the balance. Furthermore, this set of data can be stored on a separate database shown as the account-balance database for establishing the relationships between each account and each balance that is required by the business for that account.

Product Balance

Referring now to Table G, the relationship between product and balance can be seen for product balance associative database 150 in FIG. 1A. The product balance association establishes the balances for a given product as well as the terms and conditions for their accumulation. Table G illustrates that, for a revolving credit type product, four different balance types can be utilized. Namely, in the example shown in Table G, balance types of "open to buy", "cash", "credit", and "interest" are established. Similarly, the loyalty program product is linked to a "points" type balance and the "checking product" type is linked with a traditional checking balance. The "brokerage product" type is associated with a "stock" type balance and the electric utility product is linked with a "megawatts used" type balance. The level payment product is associated with a "payment balance to date" type.

TABLE G

| PRODUCT TYPE | INTERNAL PRODUCT ID | BALANCE TYPE | INTERNAL BALANCE ID |
|---|---|---|---|
| Revolving Credit | P0001 | Open to Buy | B0001 |
| Revolving Credit | P0001 | Cash | B0002 |
| Revolving Credit | P0001 | Credit | B0003 |
| Revolving Credit | P0001 | Interest | B0004 |
| Loyalty Program | P0002 | Points | B0005 |
| Checking | P0003 | Balance | B0006 |
| Brokerage | P0004 | Stock | B0007 |
| Electric Utility | P0005 | Mega Watts Used | B0008 |
| Level Payment | P0006 | Payment Balance to Date | B0009 |

Internal identifiers can be used with the product types and balance types to identify entries in the product and balance databases. Thus, Table G shows internal product IDs and internal balance IDs. These IDs can be coupled as data entries in the product-balance database. The entries shown in Table G reflect the data that is associated by grouping the respective internal product IDs with the internal balance IDs.

Figure 15:
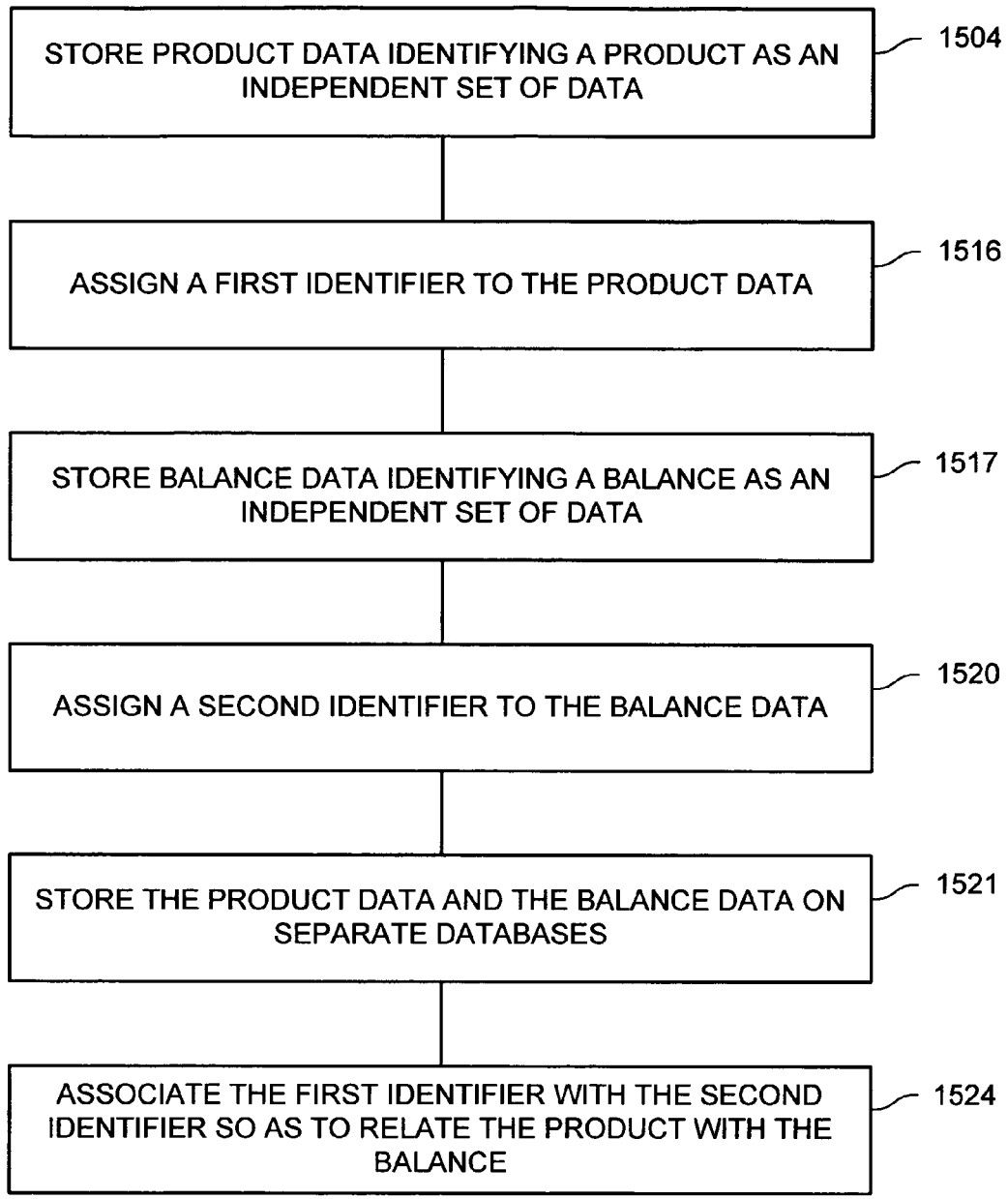
FIG. 15 illustrates a flowchart for implementing a method of processing data for a product-balance relationship, according to one embodiment of the invention.

Referring now to FIG. 15, a method of implementing the product-balance relationship can be seen. FIG. 15 illustrates a flowchart 1500 for implementing a method of establishing a relationship between a product and a balance. In block 1504 of FIG. 15, product data identifying a product is stored as an independent set of data. In block 1517, balance data identifying a balance is stored as an independent set of data. The product data and the balance data can be stored on separate databases, as shown by blocks 1521.

To associate the product data with the balance data, a first identifier can be assigned to the account data as shown in block 1516. For example, the identifier can be assigned to an entry in the account database after the identifier is generated by an internal system identifier generator. Similarly, a second identifier can be assigned to a balance type as shown in block 1520. Then, the product data can be associated with the balance data so as to relate the product with the balance. This can be accomplished by associating the first identifier with the second identifier as a set of data stored in an account-balance database, for example.

Party Subject Area

Figure 18:
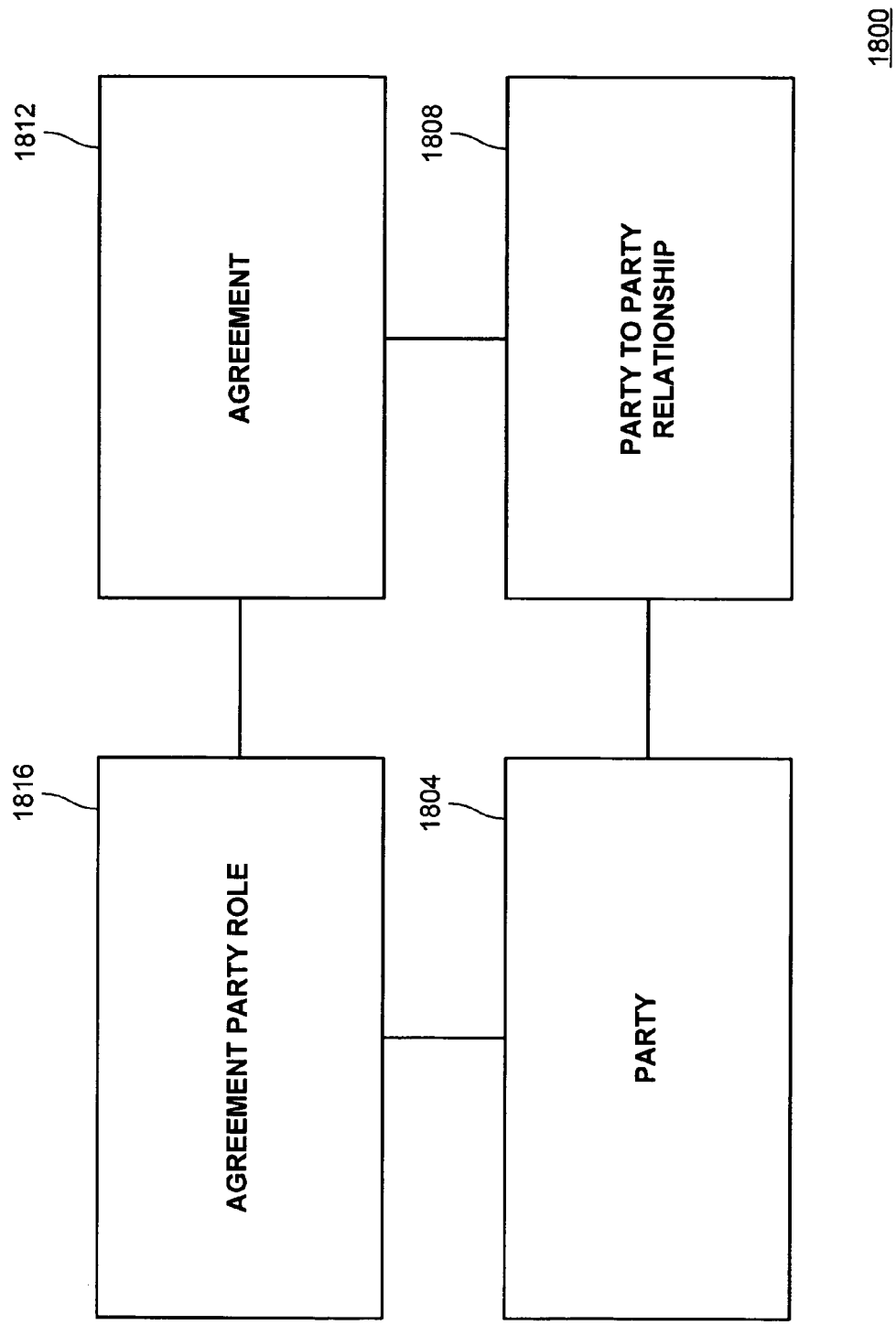
FIG. 18 illustrates a block diagram of an exemplary configuration for the party subject area, according to one embodiment of the invention.

The party subject area, which is a collection of data about individual(s), organization(s), or organization unit(s) needed by a service provider to carry out business operations on behalf of itself and/or its client(s) is illustrated in more detail in FIGS. 18, 19A, 19B, 19C, 19C1, 19D, 19D1, and 19D2. FIG. 18 illustrates a system 1800 having four databases: a party database 1804, an agreement database 1812, an agreement-party role database 1816, and a party to party relationship database 1808. In this embodiment, the party database 1804 is associated with the agreement database 1812 via the agreement party role association database 1816. Similarly, the party database 1804 is associated to itself via a party to party relationship database 1808 and the party to party relationship database is related to the agreement database 1812. FIGS. 19A, 19B, 19C, 19C1, 19D, 19D1, and 19D2 illustrate a more detailed embodiment of these databases as system 1900. In FIG. 18, the Party database 1804 and the Agreement database 1812 are coupled with an Agreement Party Role database 1816. Similarly, the Party database and the Agreement database are also coupled with the Party to Party Relationship database 1808.

A party is an individual, organization, or organization unit that a service provider needs to have information about in order to carry out business operations on behalf of itself and/or its clients. For example, First Data Resources (FDR), a data processing company in Omaha, Nebr. constitutes a party. Likewise, its parent company First Data Corporation and sister companies such as Western Union or Telecheck are also considered parties. Client organizations that contract with FDR for processing services are also parties. Furthermore, an individual or organization that is a customer of one of FDR's clients and one of FDR's clients and who has a role on an account processed by First Data Resources is also considered a party. Other examples include parties such as a contact person at a merchant organization, a credit bureau that receives account status information to be incorporated in a credit bureau report, and a vendor that provides plastics.

The party subject area database can store a collection of information needed to manage data about individuals and organizations who have a direct or indirect relationship with one another or with a service provider. The party subject area can include information such as: identification data (names, identifiers, biometric information), demographic information, relationships to other individuals, roles on agreements or accounts, and language preferences of the parties.

Organization of the party information can help service providers to accomplish different tasks, such as: keeping track of their customers, making changes to the party data quickly and easily, managing customer relationships, and complying with regulations such as recent privacy regulations. Furthermore, from the perspective of a third party data processing provider, such as First Data Resources of Omaha, Nebr. and First Data Corporation the organization of the party information can help in: responding to changing client needs, providing structures to facilitate new types of businesses, supporting client defined products with new types of parties, and supporting new types of party relationships, agreements, and roles.

A party is defined within the business context of the entity that establishes it. For example, third party processors are capable of processing transactions on accounts for many different banks that offer credit cards. In some cases, a person may have one credit card with Bank A and a second credit card with Bank B. In such an instance, that person is recognized by the third party processor as a first entity for Bank A and a different entity for Bank B. Alternatively, a person may have more than one credit card issued by the same bank. In that instance, the person is a single entity used by the processing system to process the different credit card accounts issued by that bank. Thus, for a third party processor that processes transactions for multiple banks, a person can be represented as different entities—e.g., a different entity for each bank. Furthermore, for the person who has more than one account at a single bank, a single entity can be used for the party data to process the transactions—i.e., one entity for multiple accounts.

Figure 19A:
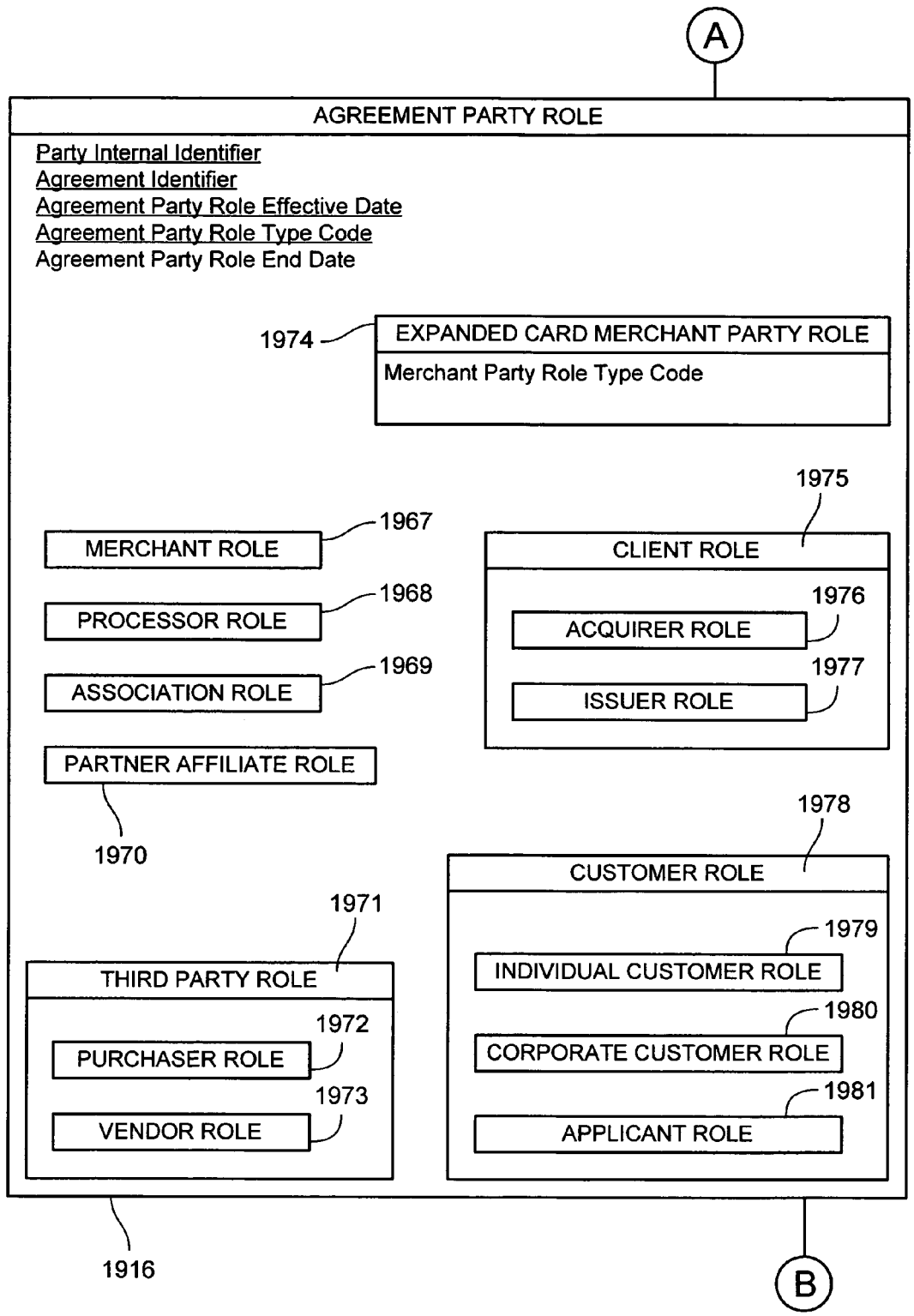
Figure 19B:
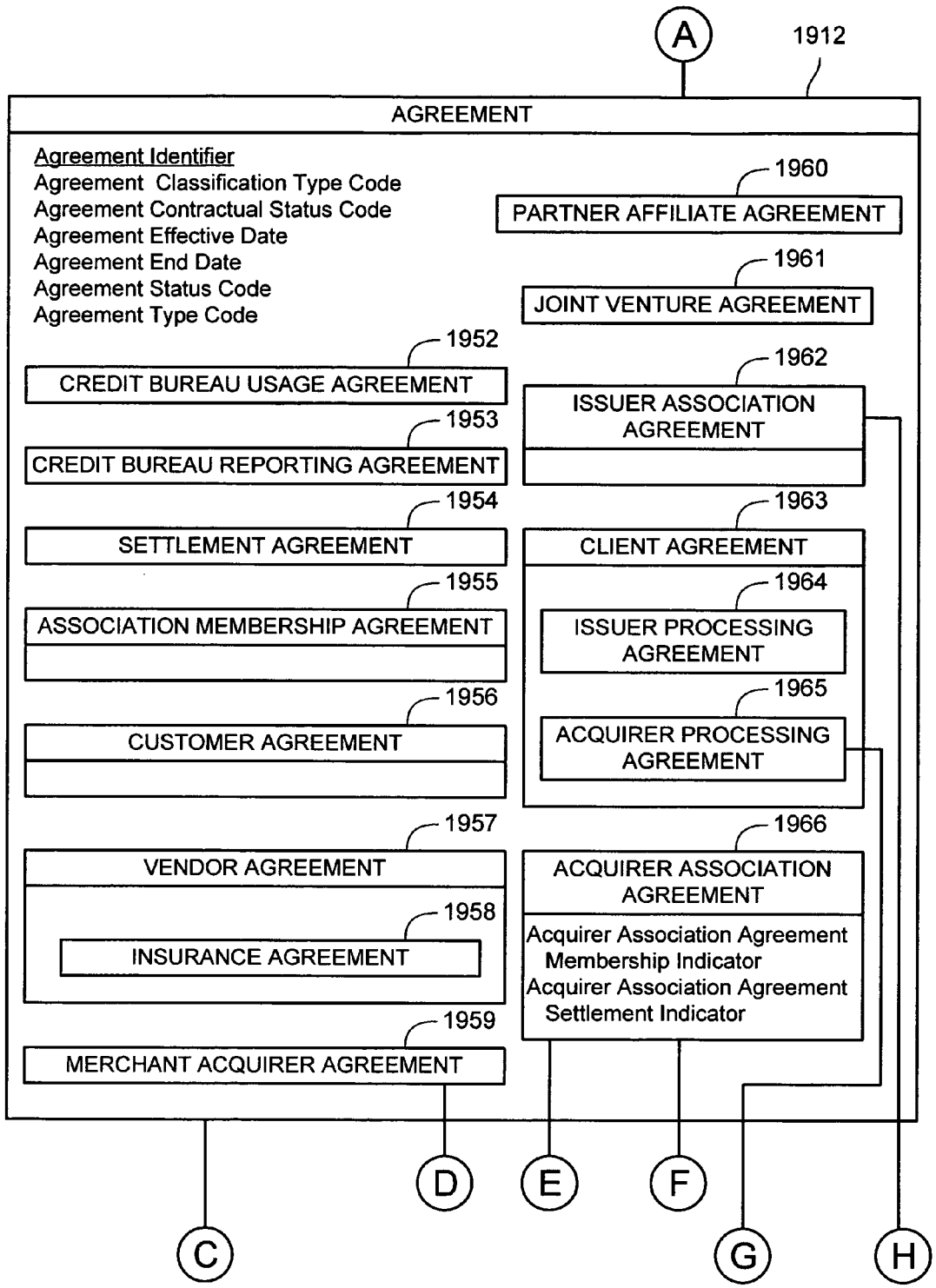
Figure 19C:
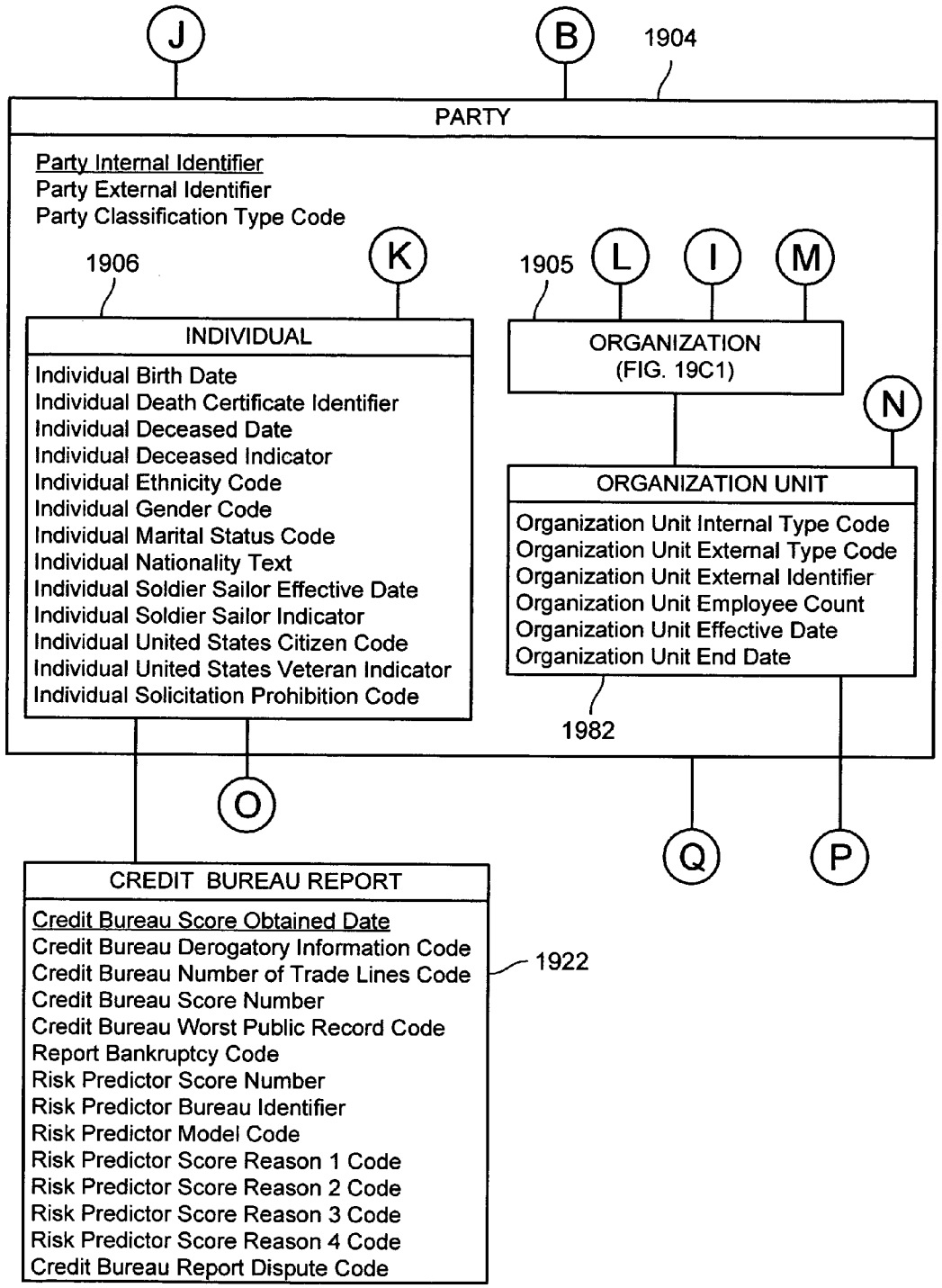

FIGS. 19A, 19B, 19C, 19C1, 19D, 19D1, and 19D2 illustrate a more detailed view of the party subject area according to system 1900. First, block 1904 in FIG. 19C illustrates the type of information that can be maintained about a particular party. For example, a "Party Internal Identifier" can be generated to identify the entry storing party information for a specific party. Within a data processing system operated by a third party processor, for example, the internal identifier can uniquely identify the party within the context of the data processor's business operations whereas the "Party External Identifier" can be assigned by the client to identify the party within the context of the client's business operations. In other words, the "Party External Identifier" can be an identifier within the client organization as opposed to the internal identifier which is used to internally track the party entry within the data processing system. Block 1904 also shows that a "Party Classification Type Code" can be assigned to represent the highest level of categorization of the Party. Examples are codes to identify the Party as: an individual, an organization, or an organizational unit. Further information for an individual, an organization, and an organization unit can be maintained as indicated by blocks 1906, 1905, and 1932, respectively.

Block 1906 indicates the type of information or attributes that can be maintained for an individual. An individual is a person that the system needs to have information about in order to carry out business operations. For example, the individual's birth date, death certificate identifier (i.e., an externally defined identifier of the death certificate issued by a geopolitical organization to certify the death of the individual), and date the individual died can be maintained. In cases where the death certificate has not yet been received,an indicator designating whether the individual is dead can be recorded. In addition, a code representing the ethnic classification used by an individual can be recorded, as can an individual gender code representing the sex of the individual (e.g., "male", "female", or "Gender not provided"). A code representing the marital status of the individual can be recorded as part of the entry, as well, such as common law marriage, divorced, separated, head of household, married, domestic partner, single, widowed, or unknown. In addition, a field can be used to record the national heritage of an individual, such as German, Italian, Scandinavian, etc. This can be a useful field for applying the requirements of increased government scrutiny of financial accounts, such as the heightened scrutiny applied by the Patriot Act. The effective date that the individual becomes eligible for Soldier and Sailor Act benefits can be recorded as can an indicator indicating whether the individual is currently eligible for benefits under the Soldier Sailor Act. In addition, a code representing a general categorization of an individual's citizenship can be recorded, such as the individual is a US citizen, the individual is not a US citizen, the individual is a citizen of another country as well as a citizen of the US, or the individual citizenship is not provided. Also, an indicator can be used to designate whether the individual is a veteran of one of the military branches. Also, an "Individual Solicitation Prohibition Code" can be used to indicate whether an individual can be contacted about purchasing new or additional products. The values for this code may indicate: 1) Yes, you may solicit and telemarket the customer; 2) Do not solicit this customer; 3) Do not telemarket this customer.

In FIG. 19C1 block 1905 shows the type of information, in the form of attributes, that can be maintained for an organization. An organization is created within the context of the business requirements of the Party that defines it. For example, in the context of a third party processor such as First Data Corporation, an organization could include any First Data company, such as First Data Merchant Services, Telecheck, and Western Union; a client organization, such as an issuer bank ABC or an acquirer bank XYZ; a merchant organization (e.g., Mom and Pop's Diner or Large Retail Conglomerate); a regulatory organization (e.g., Visa, MasterCard, State of Nebraska, or Securities Exchange Commission); a third party organization (e.g., vendor organization, network provider, or credit bureau); or an organizational unit (e.g., a division of an organization that is not a legal entity in and of itself, such as a division, department, or branch).

Block 1905 shows examples of attributes that can be stored as part of an entry for an organization. For example, "Organization Business Description Text" can be maintained for use as party-defined text describing the nature of the business. Furthermore, an "Organization Classification Type Code" can be used to classify the organization as belonging to a particular class, such as an internal division or subsidiary of the third party processor (e.g., in the case of First Data Corporation: First Data Corporation, First Data Resources, TeleCheck, and Western Union), a financial institution (e.g., a bank or credit union), a merchant organization (e.g., a department store, a Mom and Pop store, a mail order company), a regulatory organization (e.g., VISA, MasterCard, IRS, or Federal Reserve), a third party organization (e.g., a vendor, credit bureau, or law firm), a client organization (e.g., an organization that can take on the role of Issuer or Acquirer), an independent sales organization, or a customer organization (e.g., a commercial card customer). Another attribute that can be stored as part of the entry is an "Organization Employee Count" which is a count of the persons employed in an organization as specified by the Party that defined the organization. This field can be used, for example, to provide a discount rate to employees when the employer has a certain number of employees. Other attributes that can be stored as part of an organization entry include: a code representing the year the organization was formed; a code representing the month in which the organization's accounting cycle closes for determining profits or losses for the year; a code representing the state in which the organization was chartered; a code describing the tax status of the organization for filing state and federal taxes; a code representing whether the organization was formed or chartered in the United States; a code representing the legal structure of the organization, or an "Organization Cost Center Identifier" that indicates the accounting area where costs for the organization are to be allocated.

Block 1905 shows further sub-blocks which categorize additional information about different types of organizations. For example, block 1907 shows data that is specific to a financial institution. A financial institution is an organization that collects funds from the public to place in financial assets. For example, a bank, a savings and loan association, a credit union, and an insurance company are examples of financial institutions. Examples of information that can be stored for a financial institution include a "Federal Reserve Transit Routing Number", a "Financial Institution Classification Type Code" (e.g., depository or non-depository institution), and a "Financial Institution FDIC Member Indicator" (i.e., designating whether the financial institution is a member bank of the FDIC).

Block 1988 shows data that can be maintained for a customer organization, such as any organization whose primary relationship with a third party processor is as a customer of a client of the third party processor. An example of this is an organization that has a commercial card agreement with an ABC Bank—where ABC Bank is a client of the third party processor. An example of a code that can be maintained as part of the entry for a customer organization is a customer organization classification type code that describes the customer as being a commercial card customer, or a fleet customer, etc.

Block 1909 illustrates data can be maintained for a third party organization. A third party organization is typically a supplier or service provider such as a material vendor, an insurance vendor, a rewards fulfillment vendor, a software vendor, a hardware vendor, a co-brand partner, an information vendor, a data entry vendor, a marketing vendor, a collection vendor, and a voice response unit support vendor. As examples of third party organizations, blocks 1910 group service provider, block 1911 insurance provider, and block 1913 credit bureau show that data specific to each classification of third party organizations can be maintained.

Block 1914 shows that data can be maintained that is specific to a party that is a client. For example, a "Client Organization Classification Type Code" can be used to identify the client as an acquirer, an issuer, or both an acquirer and an issuer.

Block 1915 shows that data can be maintained for the data processing company's own organizations. In this example, data can be maintained that is specific to organizations that are part of First Data Corporation (FDC) entity.

Block 1917 shows that data that is specific to an independent sales organization can be maintained.

Block 1918 shows that data that is specific to a merchant organization can be maintained. A merchant organization can be an organization that accepts presentation instruments as payment in exchange for goods or services provided. An example of an attribute that could be maintained about a merchant organization is the "Merchant Category Code" that designates the line of business or the type of service that the merchant organization provides.

Block 1905 also shows that data can be maintained for regulatory organizations in block 1919. A regulatory classification type code attribute is provided to categorize the regulatory organizations. The two example classifications shown in block 1919 are governmental organizations and industry associations. In block 1920, shows that a "Governmental Classification Type Code" can be used to classify a governmental organization, for example, as an international organization, a national organization, a state organization, etc. Likewise a governmental sub-classification code can also be used to further categorize the governmental organization. Examples of the sub-classification includes such things as an agency, a bureau, a military organization, etc. Similarly, block 1921, association, provides examples of attributes that can be maintained specifically about an association. Examples include such things as an "Association Identifier", an "Association Name", and an "Association Classification Structure Type Code".

Block 1982 illustrates how data can be maintained for an organization unit according to one example. The organization unit is a subset or division of an organization as specified by the party that defined it. A significant characteristic of an organization unit is that it is not chartered or recognized by any governmental organization as a legal entity and therefore cannot enter into legal contracts. For example, an organization unit may be a division or department of a legal entity. Another example might be a subset of a merchant organization, such as a store. Attributes can be used to characterize an organization unit. An "Organization Unit Internal Type Code" is a code defined by the data processor that represents the categorization of the organization unit (e.g., business unit, operating division, operations group, division, department, office, client defined). An "Organization Unit External Type Code" is a code representing the categorization of the organization unit as specified by a party external to the data processor (e.g., a client defined code for a business unit, operating division, operations group, division, department, office or branch). An "Organization Unit External Identifier" is an identifier for the organization unit as specified by a party external to the data processor (e.g., DIV-01 or DEPT-HR). An "Organization Unit Employee Count" is a count of the persons employed in an organization unit as specified by the party that defined the organization unit. For example, this field can be used to determine whether employees of an organization are entitled to get a certain discount rate with a partner organization if a minimum number of employees are required for the discount to apply. An "Organization Unit Effective Date" can be used to define the date an organization unit is valid for use within the context of the business of the party that defined it (e.g., the date the human resources department is valid in a growing company that adds a human resources department). Similarly, an "Organization Unit End Date" can be defined to indicate the last date that the organization unit is valid for use within the context of the business of the party that defined it.

A credit bureau report can be generated for a specific party. For example, block 1906 which maintains information for an individual can be related to credit bureau report Block 1922. The credit bureau report block shows that information about the credit history of an individual can be stored in a database by the system. The credit history is obtained from a credit bureau service provider that gathers the information from a variety of sources, such as credit card issuers, home loan issuers, private label issuers, etc. and produces the report. The credit bureau report can detail which lines of credit the Party has applied for and received and whether the Party pays their bills in a timely fashion. Attributes can be stored to define the credit information. A "Credit Bureau Score Obtained Date" can be used to identify the date the credit bureau score was obtained from the credit bureau. The "Credit Bureau Derogatory Information Code" can be used to indicate the rating of the derogatory information on file at the credit bureau (e.g., "0" for best rating and "9" for worst rating). A "Credit Bureau Number of Trade Lines Code" can be used to indicate the number of trade lines on file at the credit bureau. A "Credit Bureau Score Number" can be used as a rating derived from the credit information obtained from the Credit Bureau. A "Credit Bureau Worst Public Record Code" can be used as the rating of the public record on file at the credit bureau. A "Report Bankruptcy Code" can be used to report bankruptcy (e.g., "-"=chapter 11 bankruptcy; "1"=chapter 7 or 11 bankruptcy; "2"=chapter 13 bankruptcy; and "3"=account is seriously delinquent, e.g., seven cycles delinquent). A "Risk predictor Score Number" can be used to assign a client defined risk score. A "Risk Predictor Bureau Identifier" can be used to identify various risk predictor bureaus (e.g., Equifax; Transunion; and =TRW). A "Risk Predictor Model Code" can be used to indicate the credit bureau scoring algorithm used in evaluating a customer's risk level. "Risk Predictor Score Reason Codes 1-4" can be used to maintain the reason given by the credit bureau for the reported score. Also, a "Credit Bureau Report Dispute Code" could be used to identify the dispute reason on a credit bureau report (e.g., customer request or inconsistency).

In FIG. 19B, block 1912 shows the information that can be maintained for an agreement entered into between parties. An agreement is a legal or contractual arrangement that governs the relationship between two or more parties. For example, an agreement could be a processing agreement between the data processor and one of its clients. Another example of an agreement is a contract between a merchant and its acquirer. Another example is a contract between a Group Service Provider and one of its clients. Yet another example is a joint venture agreement between two or more companies. Still another example is a contract between a bankcard issuer and one of its customers. An agreement can be characterized by different attributes. For example, an "Agreement Identifier" can be assigned to an entry in an agreement database in order to identify the characteristics of that particular agreement. This can be an internal identifier defined by the data processor responsible for tracking the agreement information. An "Agreement Classification Type Code" can be used to represent a high level categorization of the agreement (e.g., partnership agreement, client processing agreement, 3rd party agreement, vendor agreement, employment agreement). An "Agreement Contractual Status Code" can be used to represent the contractual status of an agreement (e.g., unknown, negotiation in progress, negotiated—but pending signature, signed, expired, terminated, or archived). An "Agreement Effective Date" attribute can be used for the date that an agreement becomes available for use within the context of the business of the Party who established it. This provides the capability for the Party defining the Agreement to enter information about the Agreement before it is finalized. The "Agreement End Date" attribute can be used to identify the last date that an agreement is available for use within the context of the business of the Party who established it. The "Agreement Status Code" attribute is a code representing the status of the Agreement at a point in time (e.g., pending, in effect, terminated, or archived). The "Agreement Type Code" attribute is the code representing the specific kind of Agreement (e.g., joint venture agreement, partner affiliate agreement, issuer processing agreement, rewards fulfillment services agreement, office supplies vendor agreement, or contract employee agreement).

Block 1912 also illustrates how agreements can be further classified by different types. For example, block 1952 shows that credit bureau usage agreement data can be maintained. This is a type of agreement in which a client of a data processor agrees to use the credit bureau reporting services provided by a specific credit bureau (e.g., an agreement in which an issuing bank agrees to use the credit bureau services of the credit bureau Equifax). Similarly, block 1953 shows that data for a credit bureau reporting agreement can be used to store data about an agreement between a client of the data processor and a credit bureau in which the client has agreed to provide account status information to the credit bureau. The credit bureau can use this information to build credit bureau reports on consumers. For example, this might be an agreement in which the issuing bank agrees to provide account status information to Equifax, the credit bureau. This information is provided to the credit bureau by the data processor of the issuing bank.

Block 1954 shows that the data processor can store settlement agreement data. A settlement agreement can take the form of a type of agreement that establishes the terms and conditions under which an organization acting in the role of processor is able to set up its system infrastructure to process settlements for monetary transactions generated using the brand of a specific association. For example, it might be the agreement by which First Data Resources is able to set up its systems to process MasterCard transactions.

Block 1955 shows that the data processor can store association membership agreement data. This is a type of agreement in which a financial institution becomes a "member bank" of an association. Membership in the association licenses the "member bank" to issue and/or acquire presentation instruments with the network brand of the association. The term "member bank" is used in this instance to refer to any financial institution that is a member of the association even if it is not truly a bank, for example a credit union.

Block 1956 shows that data can be stored for a customer agreement. A customer agreement is a type of agreement governing the relationship between a client of the data processor and a party that is a customer of that client. For example, a credit card agreement establishing an individual as the primary account holder of a credit card issued by ABC Bank which in turn is a client of First Data Resources.

Another type of agreement for which data can be stored is a vendor agreement as shown in block 1957. This is a type of agreement in which one party (the vendor) supplies a vendor product or service to another party (the purchaser). It may be established directly between a vendor and an organization of the data processor or it may be established between a vendor and another type of organization, e.g., a client organization. For example, it might entail an agreement between an insurance provider and a client organization to provide life insurance benefits on a customer agreement. Thus, block 1958 reflects that data for an insurance agreement can be stored. One example of an insurance agreement is a type of agreement between two or more parties formed with the intent to offer insurance products. It is used to define fees, charges, and revenue sharing arrangements.

Block 1959 reflects that data can be stored for a merchant acquirer agreement. This is a type of agreement in which an acquiring client organization agrees to acquire transactions for a merchant organization. Roles identified for this type of agreement include acquirer, merchant, and association. For example, this could be an agreement in which Financial Institution XYZ (the acquirer) agrees to acquire merchant Visa (the association) transactions for Good Food Grocery Store (the merchant).

Another type of agreement is that shown in block 1960 for a partner affiliate agreement. An example of a partner affiliate agreement might be an agreement between an issuer and another organization in which the organization (i.e., the partner affiliate) gives the customer reward(s) for using the issuer's card when making purchases from the partner affiliate. For example, this could be an agreement between an issuer and an airline company to provide bonus mileage points when the issuer's card is used to purchase an airline ticket.

Block 1961 reflects that data for a joint venture agreement can be stored on this type of system. Thus, the system can store data for an agreement by two or more parties to work on a project together. A joint venture may be formed when companies with complementary services wish to create product or service.

Block 1962 shows that data can be maintained for an issuer association agreement. This is a type of agreement in which a financial institution is licensed as a member bank of an association to issue presentation instruments with the network brand of the association. For example, this could entail an agreement between ABC Bank and Visa USA in which ABC Bank as a member bank is licensed to issue Visa credit cards. Or, it could entail an agreement between XYZ Bank and MasterCard International in which XYZ Bank is licensed to issue MasterCard credit cards.

Block 1963 shows that data can be maintained for a client agreement. A client agreement is a type of agreement in which the data processor or one of its subsidiaries contracts with another organization to provide the organization (the client) products or services of the data processor. For example, it might be a contractual agreement between First Data Resources (a data processor) and Financial Institution ABC to process credit cards issued by Financial Institution ABC. Or, it might be a contractual agreement between First Data Merchant Services, for example, and an acquiring bank to process merchant transactions generated by merchant organizations affiliated with the acquiring bank. One type of client agreement is an issuer processing agreement as shown in block 1964. This is a type of agreement in which one organization operating in the role of a processor agrees to provide account balance administration and/or other processing services for another organization that is functioning in the role of an issuer. For example it might be an agreement in which a processor provides account balance administration for credit cards issued by ABC financial institution. Or, it might be an agreement in which the processor provides statements for credit cards issued by XYZ Credit Union (the issuer). Block 1965 indicates data can be stored for an acquirer processing agreement. This is a type of agreement in which one organization operating in the role of processor agrees to process transactions for another organization that is functioning in the role of an acquirer. Thus, it could be an agreement in which First Data Resources (the processor) processes merchant transactions acquired by XYZ Financial Institution (the Acquirer).

Block 1966 shows that data can be maintained for an acquirer association agreement. This can be a type of agreement in which a financial institution is licensed as a member bank of an association to acquire presentation instrument transactions with the network brand of the association. For example, this might include an agreement in which Financial Institution ABC is established as an Acquirer for VISA transactions. Or, it might be an agreement in which Financial Institution XYZ is established as an acquirer for MasterCard transactions. Additional attributes for defining acquirer association agreements can include attributes such as an "Acquirer Association Agreement Membership Indicator" and "Acquirer Association Agreement Settlement Indicator". The "Acquirer Association Agreement Membership Indicator" designates whether the acquirer has a direct relationship with the association. A direct relationship occurs when the acquirer has signed a legal contract with the association to do business as a member of the association. An indirect relationship occurs where the acquirer has signed a legal contract with another institution to present the transactions to the association on behalf of the acquirer. The other institution will normally have the direct relationship/membership with the association and the acquirer will have an indirect relationship to the association. The other attribute shown, the "Acquirer Association Agreement Settlement Indicator", designates whether the acquirer has contracted with the processor to perform the settlement function for monetary transactions tied to a specific association.

In FIG. 19A, block 1916 illustrates how data can be stored for an agreement party role relationship. It provides a means for identifying the various parties to an agreement and the role that each party plays on the agreement. An agreement party role may vary based on the type of agreement, type of party, or other party-defined or agreement-defined criteria. It represents information about the party in relation to the agreement itself. Block 1916 can pull data from the agreement block 1912 and the party block 1904 to create an entry with further information about the role played by that party on that agreement. For example, in a processing agreement between First Data Resources and ABC Bank, ABC Bank acts in the role of Client (issuer); FDR acts in the role of processor; VISA acts in the association role; Specialty Toys acts as the affiliate partner; Gift Fulfillment Center acts as the rewards fulfillment party; J. J. Doe acts as the account manager; M. J. Bums acts in the role of signature party at FDR; and Mary Jane Moore acts as the signature party at ABC Bank. Attributes for the agreement party role include "Agreement Party Role Effective Date"; "Agreement Party Role Type Code"; and "Agreement Party Role End Date." The "Agreement Party Role Effective Date" is the date the party begins to function in the agreement party role (e.g., the date an organization is added as the rewards fulfillment party). The "Agreement Party Role Type Code" represents the role that a party plays in an agreement (e.g., client, partner, processor, association, etc.). The "Agreement Party Role End Date" attribute indicates the last date that the party functions in the agreement party role.

Block 1967 shows that data specific to a merchant role can be maintained in a database entry. This is the role an organization assumes when accepting presentation instruments as payment in exchange for goods or services provided relative to a specific agreement.

Block 1968 shows that data specific to a processor role can be maintained in a database entry. This is the role a party assumes when processing information or transactions for another party based on the terms and conditions of an agreement.

Block 1969 shows that data specific to an association can be maintained in a database entry. This is the role an organization assumes as the regulatory organization governing the use of presentation instruments relative to a specific agreement. For example, this might be information specific to an association's role on a specific issuer processing agreement.

Block 1970 shows that data specific to a partner affiliate role can be maintained in a database entry. This is the role an organization assumes when collaborating with another organization for the purpose of offering multiple products or services in one medium.

Block 1971 shows that specific to a third party role can be maintained in a database entry. This is the role a party external to the processor or its clients assumes in providing product(s) and/or service(s) to the processor and/or its client(s) relative to a specific client agreement or customer agreement. For example, it might include information about a vendor's role in supplying rewards accumulated by a customer on a credit card account processed by the First Data Resources. Block 1972 further reflects data for a purchaser role. Block 1972 purchaser role and block 1973 vendor role show examples of the type of third party roles that can be defined. The purchaser role is the role a party assumes when purchasing goods or services from another party via a vendor agreement. Block 1973 reflects data for a vendor role. This is the role a party assumes on an agreement in supplying or providing a service that is critical to the fulfillment of a specific agreement. For example, this could be the role of an insurance provider for the life insurance on a customer agreement.

Block 1974 shows that data can be maintained for an expanded card merchant party role. This is the role an organization assumes as related to a merchant agreement. One attribute that can be used to further define this role is the Merchant Party Role Type Code. This represents the role assumed by the organization on a merchant agreement (e.g., merchant, acquirer (client), system bank, principal bank, agent bank, merchant headquarters, issuer (client)).

Block 1975 shows that data can be maintained for a client role. This is the role an organization assumes when contracting with a processor like First Data Corporation, for products and/or services via a client agreement.

Block 1976 shows that data can be maintained for an acquirer role. This is the role the client organization assumes by entering into an agreement with a merchant organization to acquire presentation instrument transactions generated by the merchant organization. This could be information about the role of ABC Bank as the acquirer of merchant VISA transactions for XYZ Grocery Store via an acquirer merchant agreement.

Block 1977 shows that data can be maintained for an issuer role. This is the role a client organization assumes by entering into an agreement with a party to assume the monetary risk associated with providing the party a presentation instrument or other financial instrument via a customer agreement. For example, this could be the information about the role of a bank as issuer of a commercial product on a corporate customer agreement.

Block 1978 shows that data can be maintained for a customer role. This is the role an individual or organization assumes on a customer agreement for a product and/or service provided by a client of the processor. For example, this could be information about the role of an individual who has a credit card with an issuer that is a First Data Resources client.

Block 1979 shows that data can be maintained for an individual customer role. This is the role an individual assumes on a customer agreement for an individual product or service provided by a client of the processor. For example, it could be information about the role of an individual who has a customer agreement for a credit card with an issuer that is a First Data Resources client.

Block 1980 shows that data can be stored for a corporate customer role. This is the role an organization assumes in relation to the purchase of a commercial product or service provided by a third party processor's client via a customer agreement. For example, this could be information about the role of an organization that purchases a commercial card product offered by an issuer that is an FDR client.

Block 1981 shows that data can be maintained for an applicant role. This is the role an individual or organization assumes when applying for a product and/or service offered by a client of the third party processor. For example, this could be information about the role of an individual who applies for a credit card with an issuer that is an FDR client.

Figure 19D:
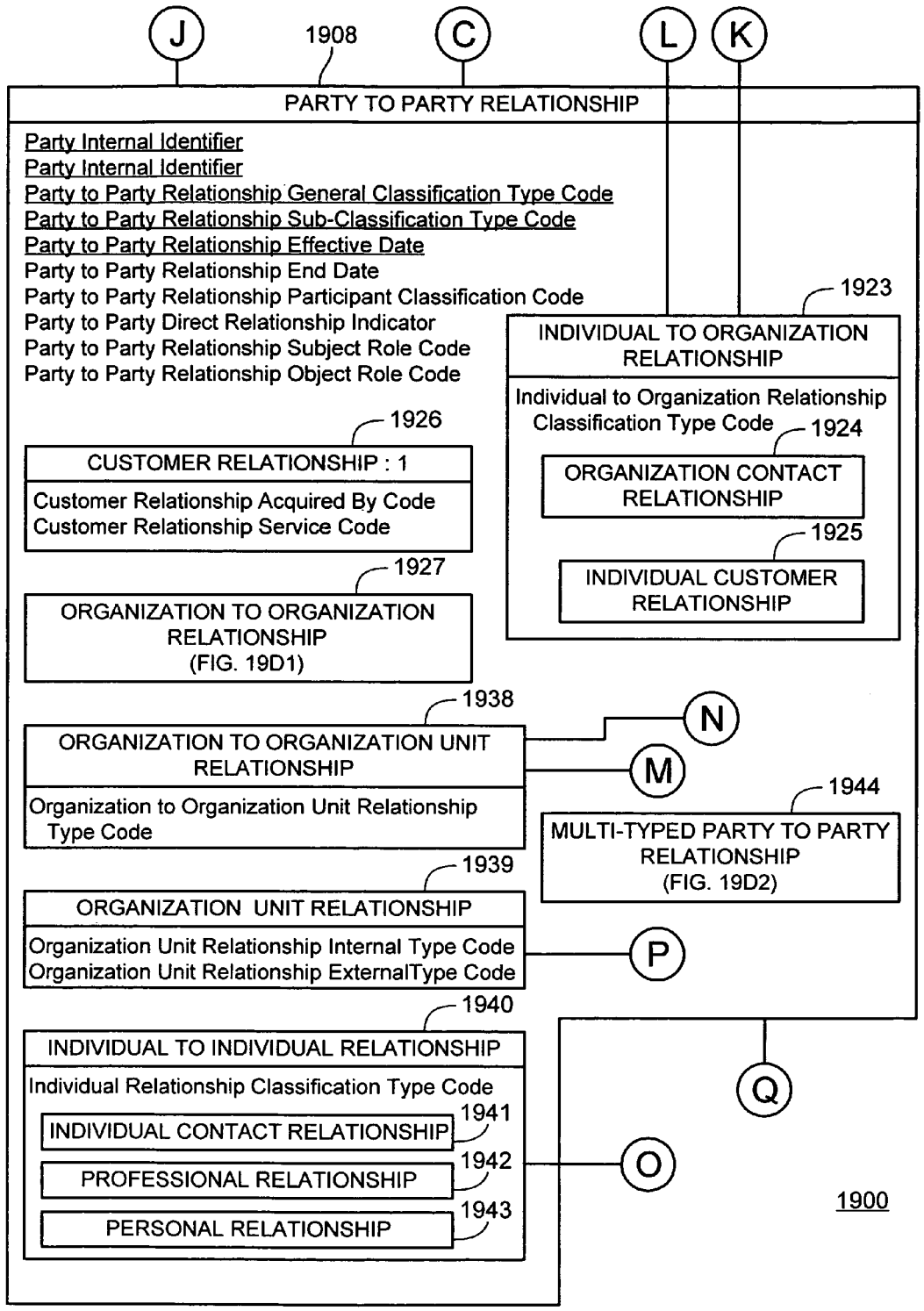

In FIG. 19D, block 1908 shows how data can be maintained for a party to party relationship. A party to party relationship is a direct or an indirect relationship, association, or affiliation between two parties. A direct relationship occurs when the association exists directly between the processor and a specific party (e.g., First Data's relationship with a bank whose credit cards First Data processes). An indirect relationship occurs when the processor has an association to a party via that party's association to another party who has a direct relationship with the processor (e.g., First Data's relationship to the customer of a bank who is a client of First Data). Other examples of party to party relationships are:
1) a client relationship between the data processor (e.g., First Data) and XYZ Credit Union;
2) a customer relationship between XYZ Credit Union and ABC Company;
3) a customer relationship between ABC Company and individual J. Doe;
4) an employment relationship between XYZ Credit Union and J. Doe;
5) a third party relationship between the data processor (e.g., First Data) and vendor DEF Company;
6) a partnership relationship between XYZ Credit Union and a national book store;
7) a family relationship (e.g., parent to an individual, brother, or sister to an individual).

At a high level, a party to party relationship can be classified by the type of parties that participate in the relationship. Some party to party relationships can only exist between two parties that are individuals; for example, family or spouse relationships. These are referred to as individual to individual relationships. They are further described in block 1940. Other party to party relationships can only exist between two parties that are organizations; for example, subsidiary or holding company relationships. These are referred to as organization to organization relationships. Sometimes they are also referred to as business to business relationships or B2B relationships. These are depicted in block 1927. Still other party to party relationships can only exist when one party is an individual and the other party is an organization. These are classified as individual to organization relationships and are depicted in block 1923. Examples include relationships such as organization contacts and individual customer relationships. Party to party relationships that do not have restrictions or one or both types of parties are referred to as multi-typed party to party relationships. Examples include employment relationships, customer relationships, and vendor relationships. They are depicted in block 1944. In block 1908, the party to party general classification type code is the attribute that provides the capability to specify this high level categorization of a party to party relationship. It also includes values to describe organization to organization unit relationships and organization unit to organization unit relationships. It can also be set up to include individual to organization unit relationships and/or other general relationships.

Block 1908 also shows that a Party to Party Relationship Sub-Classification Type Code can be used to sub-categorize the relationships represented in each of the general classifications. For example, an organization to organization relationship might be sub-classified as one of the following: an acquirer merchant relationship, an association member bank relationship, a client relationship, a corporate customer relationship, a merchant association relationship, an organization legal structure relationship, a partnership relationship, a processor association relationship, etc. Likewise, an individual to individual relationship might be sub-classified as an individual contact relationship, a professional relationship, a personal relationship, etc. It thus provides a way to represent the specific kind of relationship that exists between two parties. For example, this could entail:
Client Relationship (e.g., ABC Bank is a client of FDR)
Customer Relationship (e.g., John Doe is a customer of ABC Bank)
Employment Relationship (e.g., John Doe is employed by Great Foods Grocery Store)
Partner Relationship (e.g., Toy Mart is an affiliate partner of ABC Bank)
Third Party Relationship (e.g., ABC Bank has third party relationship with XYZ Check Printer)
Organization Legal Structure (e.g., First Data Resources has an organizational legal structure relationship with First Data Corp.)
Internal Organization Structure
Individual/Family Relationship (e.g., Jane Doe has an individual or familial relationship with John Doe)
Organization Unit Relationship (e.g., Training is a department in the Human Resources Division).

The "Party to Party Relationship Effective Date" attribute shown in block 1908 can be used to identify the date the party to party relationship is valid for use within the context of the business operations of the party that defined it. Similarly, the "Party to Party Relationship End Date" can be used to identify the last date that the party to party relationship is valid for use within the context of the business operations of the party that defined it.

The "Party to Party Relationship Participant Classification Code" is the attribute that represents a categorization of the party to party relationship based on the type of parties participating in the relationship. Values for this attribute include the following as shown in a format illustrating subject to object:
Individual to Individual (e.g., for parent of child, or employee to manager)
Individual to Organization (e.g., employee to employer organization)
Individual to Organization Unit (e.g., John Doe to Sales Department)
Organization to Individual (e.g., Bank XYZ to John Doe)
Organization to Organization (e.g., First Data Resources to First Data Corp.)
Organization to Organization Unit (e.g., ABC Credit Bureau to ABC Credit Bureau Western Region)
Organization Unit to Individual (e.g., XYZ Law Firm to Jane Doe receptionist)
Organization Unit to Organization (e.g., Sales Dept. to Int'l. Trucking Co.)
Organization Unit to Organization Unit (e.g., Sales Dept. to Human Resources Dept.)
Party to Party.

The "Party to Party Direct Relationship Indicator" attribute designates whether the service provider views the party to party relationship as a direct relationship to itself. If the relationship is a "direct" relationship, the service provider processor is a party to the relationship and/or the agreement that established it. If the relationship is an "indirect" relationship, the processor is not a party to the relationship. In the case of an "indirect" relationship, the processor has knowledge of the relationship because it is needed to do processing on behalf of the service provider.

Block 1923 shows that data can be stored for an individual to organization relationship. This is a type of party to party relationship that represents a relationship between an individual and an organization. Knowledge of this relationship can be used by a service provider to carry out business operations for itself or on behalf of its clients. An "Individual to Organization Relationship Classification Type Code" can be used to represent a high level of categorization of the type of relationship that exists between an individual and an organization. Block 1924 shows that data can be maintained for an organization contact relationship. This is a type of party to party relationship in which an individual serves as a business contact for an organization. Block 1925 illustrates that data can also be maintained for an individual customer relationship. This is a type of party to party relationship that represents the business relationship established by an individual with a client of the data processor for products or services offered by the client organization.

Block 1926 shows that data can be maintained for a customer relationship. This is a type of party to party relationship that represents a business relationship established by an individual or organization with a client of the service provider, in the case of a third party processor, or the service provider themselves, for products or services.

Block 1927 shows that data can be maintained for an organization to organization relationship. This is a type of party to party relationship that represents a business to business relationship. For example it could be a partnership relationship between two organizations. This information can be used by the service provider to carry out business operations for itself or on behalf of its clients. As shown in block 1928, a corporate customer relationship is one type of organization to organization relationship. A corporate customer relationship is a type of party to party relationship that represents the business relationship established when an organization contracts with a service provider for commercial products or services offered by the service provider or a client of the service provider as in the case of a third party processor. Block 1929 shows an acquirer merchant relationship. This is a type of party to party relationship that identifies a merchant organization as a merchant acting in the role of the acquirer of credit card transactions. Block 1930 shows a merchant association relationship. This is a type of party to party relationship in which a merchant organization establishes a relationship with an association to accept presentation instruments that use the network brand of the association.

Block 1931 shows that data can be maintained for an organization's legal structure relationship. This is a type of party to party relationship that represents the legal relationship that exists between two organizations based on their organizational structure as chartered or filed with a governmental organization (e.g., a relationship between a parent company and a subsidiary company). Block 1932 illustrates that data is maintained for a client relationship. This is a type of party to party relationship that represents a direct business relationship established by an organization with the data processor (or one of its subsidiaries) via a contractual agreement for products or services of the data processor (e.g., the client relationship between FDR and ABC Bank (an issuer) for FDR to process credit line accounts issued by ABC Bank).

Block 1933 shows that data can be maintained for an association member bank relationship. This is a type of party to party relationship that represents a financial institution's participation as a member in an association. Furthermore, block 1934 shows that data can be maintained for an acquirer association relationship. This is a type of party to party relationship established between an acquirer and an association. Similarly, block 1935 shows that data can be maintained for an issuer association relationship. This is a type of party to party relationship established between an issuer and an association.

Another type of organization to organization relationship is a partnership relationship shown in block 1936. This is a type of party to party relationship that represents the business relationship established when one organization collaborates with another organization in business according to the terms and conditions of a partnership agreement.

Block 1938 shows that data can be maintained for an organization to organization unit relationship. This is a type of party to party relationship that represents relationships between an organization and an organization unit. Knowledge of this relationship can be utilized by the service provider to carry out business operations for itself or on behalf of its clients, as in the case of a third party processor.

Block 1939 shows that data can be maintained for an organization unit relationship. This is a relationship, association, or affiliation between two organization units within the same organization. Knowledge of this relationship is used by the data processor to carry out business operations for itself or on behalf of its clients. Although this relationship could be used to establish non-hierarchical relationships between the organizational units, it can be used to define hierarchical relationships between them, e.g., levels within the organization.

Block 1940 shows that data can be maintained for an individual to individual relationship. This is a type of party to party relationship that represents an individual, familial, or professional relationship between two individuals. Knowledge of this relationship is useful to the service provider to carry out business operations for itself or on behalf of its clients, as in the case of a third party processor. Block 1941 shows an individual contact relationship. This is a type of party to party relationship in which one individual functions as a contact person for another individual. For example, Don Jones is an emergency contact for Mary Smith. The professional relationship shown in block 1942 is a type of party to party relationship in which the two individuals have a business or professional relationship, e.g., doctor/patient or attorney/client. The personal relationship of block 1943 is a type of party to party relationship in which one individual has a personal or familial relationship with another individual, e.g., John Doe is married to Mary Doe.

Block 1944 shows that data can be maintained for multi-typed party to party relationships. This is a type of party to party relationship that is not restricted to two single participant types. For example, an employment relationship—the employer could be an individual or an organization. Types of multi-typed party to party relationships can include a third party relationship, a customer relationship, and an employment relationship.

Block 1945 shows that data can be maintained for a third party relationship. This is a type of party to party relationship that exists between the service provider and/or a client of the service provider, as in the case of a third party processor, and another party that is critical to the business operations of the service provider. One example of this is a vendor relationship as shown in block 1946. A vendor relationship is a type of party to party relationship established via a vendor agreement. It may be established directly between a vendor and an organization of the data processor or it may be established between a vendor and another type of organization (e.g., with a client organization). Block 1947 shows data for a customer relationship. This is a type of party to party relationship that represents a business relationship established by an individual or organization with a client of a data processor for products or services offered by the client organization.

Block 1948 shows that data can be maintained for an employment relationship. This is a type of party to party relationship in which an individual is employed by another individual, organization, or organizational unit, e.g., Jane Doe is an employee of Mary Jones. Types of employment relationships can include an individual employee relationship, a contract employee relationship, or a corporate employee relationship. The individual employee relationship is shown by block 1949. This is a type of party to party relationship in which one individual works for another individual for compensation. Block 1950 illustrates a contract employee relationship, which is a type of party to party relationship in which an individual is hired by an individual, organization, or organization unit as a consultant or contractor instead of as an employee. Finally, block 1951 illustrates a corporate employee relationship. This is a type of party to party relationship in which an individual is employed by an organization or organization unit.

Account Subject Area

Figure 20B:
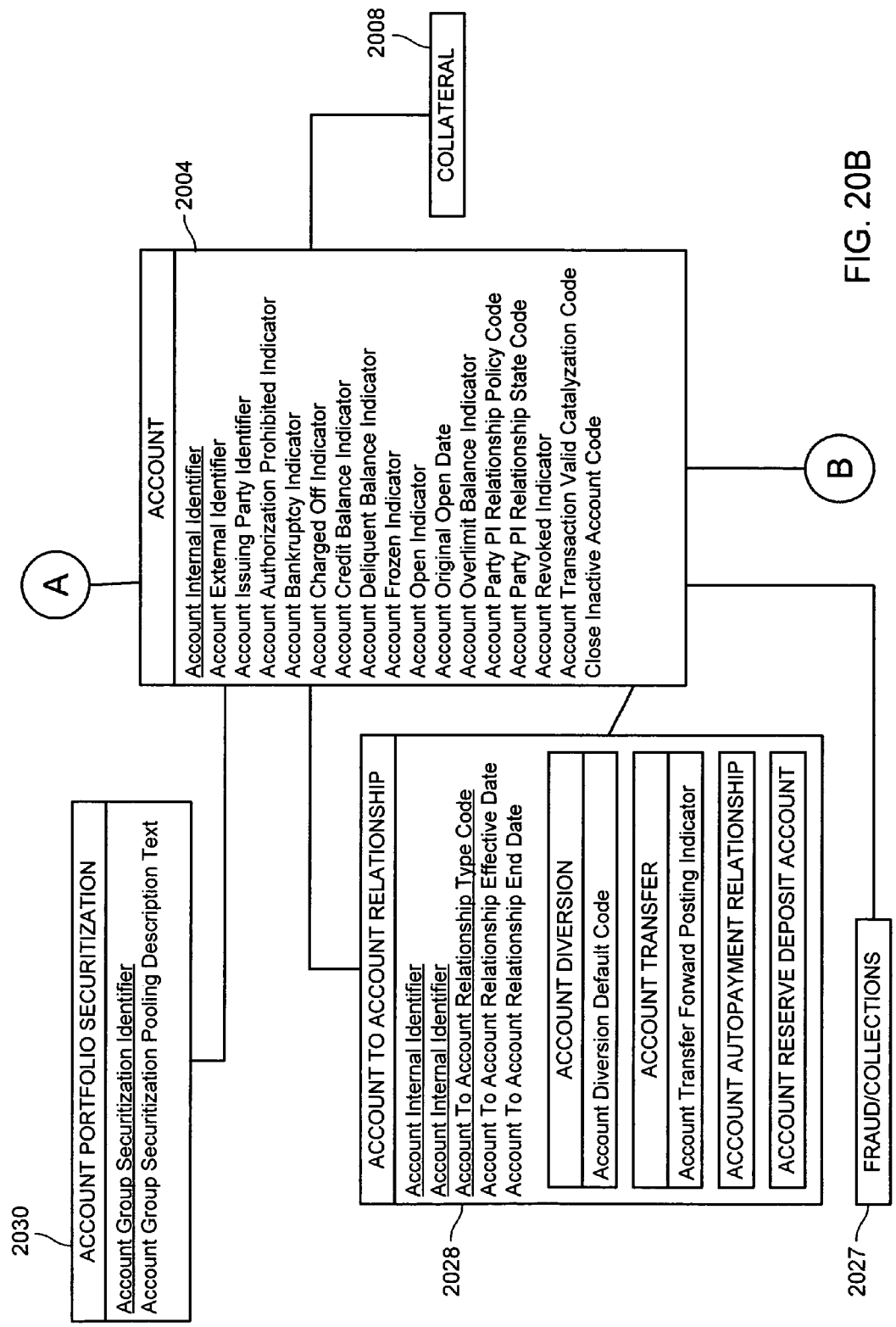
Figure 20C:
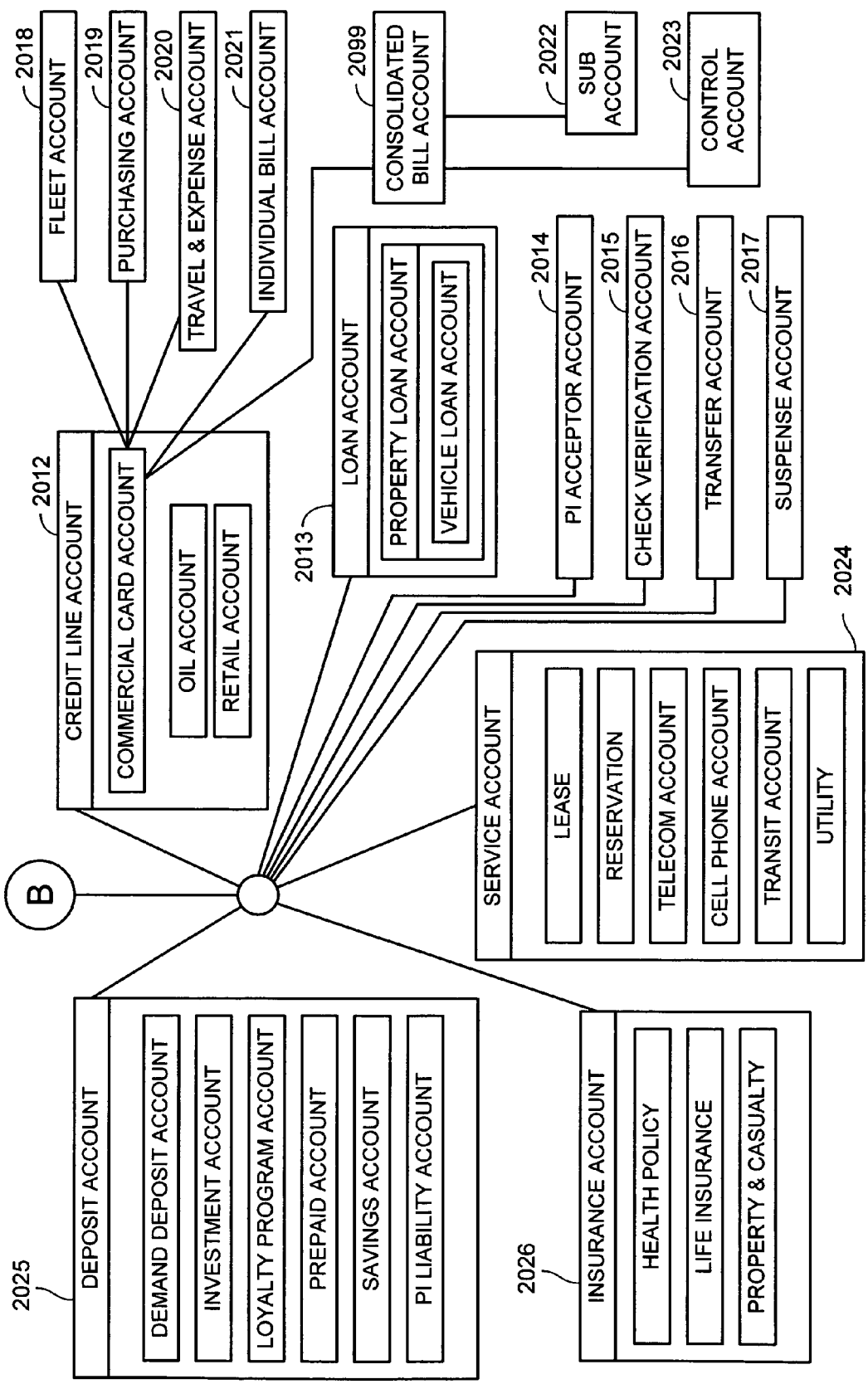

A more detailed view of the account subject area can be seen by reference to FIGS. 20A, 20B, and 20C which show an example of an account system 2000. In system 2000, an account database 2004 is used to store data for a plurality of different accounts managed by a service provider. An account can be understood to be a mechanism used to record, measure, and/or track financial and/or non-financial information related to a contractual agreement.

An entry can be established for each account managed by a service provider which is stored in the database 2004. For the service provider to keep track of each account that it deals with, an identifier can be generated to identify each particular account. In the case of an account managed by the service provider, an account internal identifier can be generated In addition to the "Account Internal Identifier" used to identify each account entry, additional information can be stored for each account managed by the service provider. For example, an "Account Client Identifier" can be stored as part of the entry. This attribute identifies which client of the service provider issued the account. For example, it could identify an account as a Bank One credit card account. Another data attribute that can be used as part of the account entry could be an "Account Client Controlled Identifier" which allows the client to assign their own identifier for the account which is unique within the context of that specific client's portfolio. Yet another data attribute that can be used as part of the entry is an "Account Authorization Prohibited Indicator", so as to indicate whether authorization is prohibited for the account. Similarly, an "Account Bankruptcy Indicator" code can be used as part of the entry to indicate whether the account is associated with a bankruptcy proceeding. Another code that can be used is an "Account Charged Off Indicator". This code can be used to indicate whether the account has been charged off.

An "Account Credit Balance Indicator" can be used as part of the data stored in an account database to indicate whether the account has a credit balance. Similarly, an "Account Delinquent Balance Indicator" can be used to indicate whether the party associated with the account is delinquent in some manner. Also, an "Account Frozen Indicator" can be associated as part of the entry to indicate whether the account has been frozen by the service provider, the client of the data processor, or a government authority. The "Account Open Indicator" can be used to indicate whether the account is open or closed. Furthermore, the "Account Original Open Date" can be used to indicate when the account was originally opened. The "Account Overlimit Balance Indicator" can be used to indicate whether the account balance is overlimit. This could be used for example in the case of a credit card account.

The "Account Revoked Indicator" can be used as part of the account entry to indicate whether the account has been revoked. Furthermore, the "Close Inactive Account Code" can be used to indicate whether an inactive account is closed or is to be closed. Other codes can be used as well to characterize the account. However, it is not necessary that all of the above attributes be used for any particular account. Rather, some attributes may lend themselves to use by special subtypes of accounts.

Block diagram 2000 shows examples of a variety of accounts that can be used under the system. For example, block 2012 indicates that data for a credit line account can be managed. A credit line account is a type of account based on an agreement for a financial institution to provide a customer with an open-ended line of credit that may be used repeatedly (e.g., revolves) up to a certain limit. Examples of credit line accounts are a commercial card account, an oil account, and a retail account. Another type of account is a loan account 2013. A loan account is a type of account that is established for a loan or a closed-end credit sale agreement in which the amounts advanced, plus any finance charges, are expected to be repaid in full over a definite period of time. Examples of a loan account are a property loan account and a vehicle loan account. Another type of account is a PI acceptor account as shown in block 2014. This is a type of account is based on an agreement to provide acquiring services for a Merchant. Other types of account include a check verification account 2015, a transfer account 2016, and a suspense account 2017. A transfer account is a type of account that is established to record a request for and the completion of a transfer of an item of monetary value between two points. A suspense account is an account created to manage transactions that need to be evaluated for fraud before allocating to an account balance.

Also shown in system 2000 are types of commercial card accounts, such as fleet account 2018, purchasing account 2019, travel and expense account 2020, individual bill account, 2021, consolidated bill account 2099, control account 2022, and sub account 2023.

Yet another type of account shown in system 2000 is service account 2024. A service account can be a type of account that is based on an agreement for a non-financial product. Examples shown for the service account are lease account, reservation account, telecom account, cell phone account, transit account, and utility account.

Still another type of account is the insurance account 2026. An insurance account is a type of account based on an agreement between parties whereby in return for payment of premiums, one party will compensate the other party for (generally unexpected) losses. Examples of insurance accounts are a health policy account, a life insurance account, and a property and casualty account.

The final example of a type of account shown in system 2000 is a deposit account 2025. A deposit account is a type of account based on an agreement for a product that is funded by customer deposits. Examples of deposit accounts are a demand deposit account, an investment account, a loyalty program account, a prepaid account, a savings account, and a PI liability account (e.g., a PI liability account could be an account set up by an organization to track its liability for one or more presentation instruments whose values are not tied to a particular customer account or an account party relationship).

In FIG. 20B, blocks 2004 and 2028, illustrate how an account to account relationship can be established. The account block 2004 reflects that data can be stored as an entry for each specific account. The account entries defined by block 2004 are considered internal accounts in that they are accounts managed by a service provider for clients or in the case of a company acting as a service provider itself, the accounts are the company's own accounts. A relationship between two internal accounts or an internal account and an external account can be established by pulling an account identifier for a first account, pulling an account identifier for a second account, and assigning those two identifiers an "Account to Account Relationship Type Code" as a new association in block 2028. The "Account To Account Relationship Type Code" identifies the type of relationship that exists between the two accounts. It is generally preferable to designate one of the accounts, such as the first account, as being the primary participant in the relationship and designating the remaining account as the secondary participant. Thus, for example, in the case of an account diversion, the system will understand which account to divert the transactions from and which account to post the transactions to.

An account to account relationship can be further defined by an "Account to Account Relationship Effective Date" and an "Account to Account Relationship End Date". This allows the entry for the relationship to define when the relationship is in effect and when it is not in effect.

Examples of account to account relationships that can be identified by the account to account relationship type code are shown in block 2028 as account diversion, account transfer, and account reserve deposit account. These types of accounts can be further defined by additional attributes. For example, the account diversion relationship can be further described by an "Account Diversion Default Code". Similarly, the account transfer relationship can be further described by an "Account Transfer Forward Posting Indicator".

The account to account relationship entries can be operated on by a business rules database to execute the actions of each relationship. For example, at the appropriate time, the business rules can access the account diversion entries and identify the account to which the posting of individual transactions are posted. These business rules also indicate whether or not it is appropriate to post a given transaction to both accounts in the relationship.

Block 2030 illustrates how multiple accounts can be bundled together for purposes of account portfolio securitization. This allows formation of a group of accounts bundled or pooled together in the form of a bond. The "Account Internal Identifiers" are associated with an "Account Portfolio Securitization Identifier" so as to identify the bundle of accounts. Furthermore, an "Account Portfolio Securitization Pooling Description Text" can be used as an attribute for the entry that is created.

The account database can also be used to facilitate account groups as shown in the account group block 2034. An account group is a collection of accounts created so that they can be treated or processed as a group. System 2000 shows a financial institution, such as one of the service provider's clients as establishing the account group. An "Account Group Identifier" is generated by the service provider so that the service provider can identify the account group internally. Furthermore, additional attributes can be associated with each account group, such as an "Account Group Type Code" to identify a specific category of account groups. Another attribute that might be included is an "Account Group Description Text" attribute.

Examples of account groups shown in block 2034 are an account household group, an account management group, an account report group, an asset management account group, and a commercial card account group. An account household group can be, for example, an account group composed of some or all of the accounts belonging to individuals in a single household. An account management group can be a set of accounts that have selected properties maintained and/or general business processes invoked as a group. An account report group can be a type of account group created so that accounts can be attached and reported as a group. An asset management account group can be a type of account group created so that accounts of different account types belonging to one party can be reported as a group. A commercial card account group could be a grouping of accounts created to assist an organization in managing their spending.

Block 2040 illustrates one way in which accounts can be assigned to an account group. In block 2040, an "Account Internal Identifier" is retrieved from the account database represented by account block 2004 and associated with an "Account Group Identifier" from the account group database block 2034. In addition to the attributes, additional attributes can be assigned, such as a start date, an end date, an override indicator, and a role code.

Block 2048 illustrates how one can define accounts that qualify to be in one of the types of accounts shown in block 2034. Thus, qualification criteria represented by, for example, "Account Group Qualification Value Text", "Account Group Qualification Percent Rate", and "Account Group Qualification Maximum Number" can be used as qualification criteria to determine which accounts are to be added or removed from a particular account group. These criteria can be acted upon by business rules to determine the accounts that satisfy the criteria or that do not satisfy the criteria.

Block 2044 indicates that account groups themselves can be grouped as super groups of accounts. This is accomplished by building groups composed of established groups. Thus, for example, all the commercial card accounts in Omaha, Nebr. for Bank ABC can be grouped as one account group. Furthermore, all the commercial card accounts in Nebraska for Bank ABC can be grouped by grouping all the lower level groups, such as the previously established group of accounts in Omaha for Bank ABC. This grouping of other groups can be given an "Account Group Structure Level Name".

Also shown in system 2000 is a collateral block 2008. The system can be configured to associate a piece of collateral with an account. Thus codes can be assigned to identify the collateral and link it with an "Account Internal Identifier" for an account.

Similarly, block 2027 shows a block indicating Fraud/Collections. This block allows the system to perform fraud monitoring and collection services. A particular account can be linked by "Account Internal Identifier" with a case queue that allows the case to be operated on by a fraud investigator or collection agent.

Transaction Subject Area

Figure 21A:
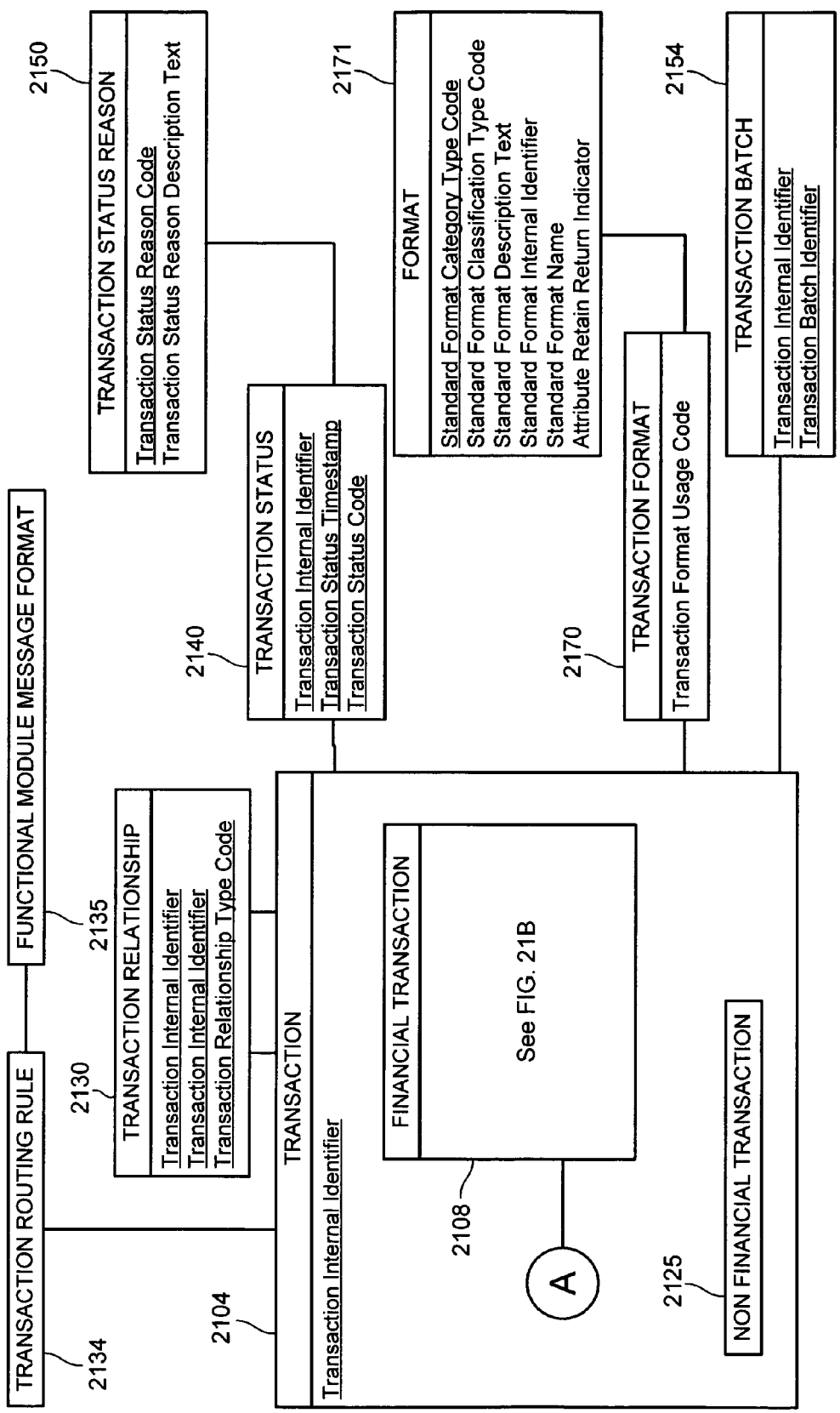
FIGS. 21A, 21B, and 21C illustrate a block diagram of an exemplary configuration for the transaction subject area, according to one embodiment of the invention.

A transaction is a collection of data about business actions or events that impact implied financial worth, cause movement of funds from one account to another, and/or impact non-financial properties (e.g., names, addresses, requests for new plastics). It can include data used for the management, administration, and tracking of these transactions from their point of origin through the final settlement, publication, or completion of the action or event. A more detailed view of the transaction subject area can be seen by referring to FIGS. 21A, 21B and 21C which illustrate a system 2100 for implementing the transaction system.

System 2100 shows transaction block 2104 for storing various types of transactions. Each transaction can be identified by a unique internal transaction identifier. This is an identifier that can be generated by the service provider's data processing system and assigned to the data for the transaction so as to form a transaction entry. The internal identifier allows the data processor to track and utilize the transaction entry. Thus, for example, the internal transaction identifier can be stored as part of each database entry.

Figure 21B:
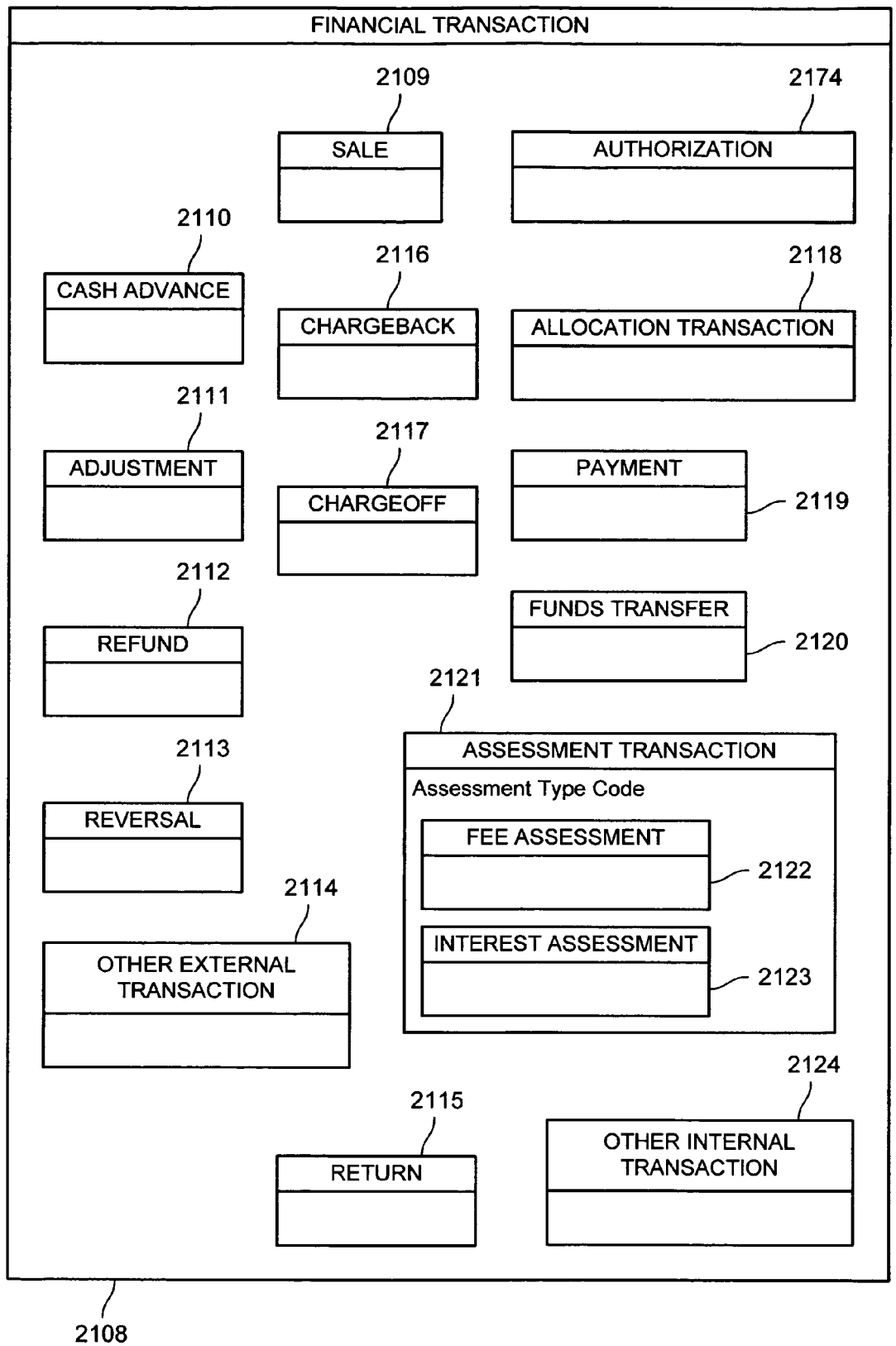
Figure 21C:
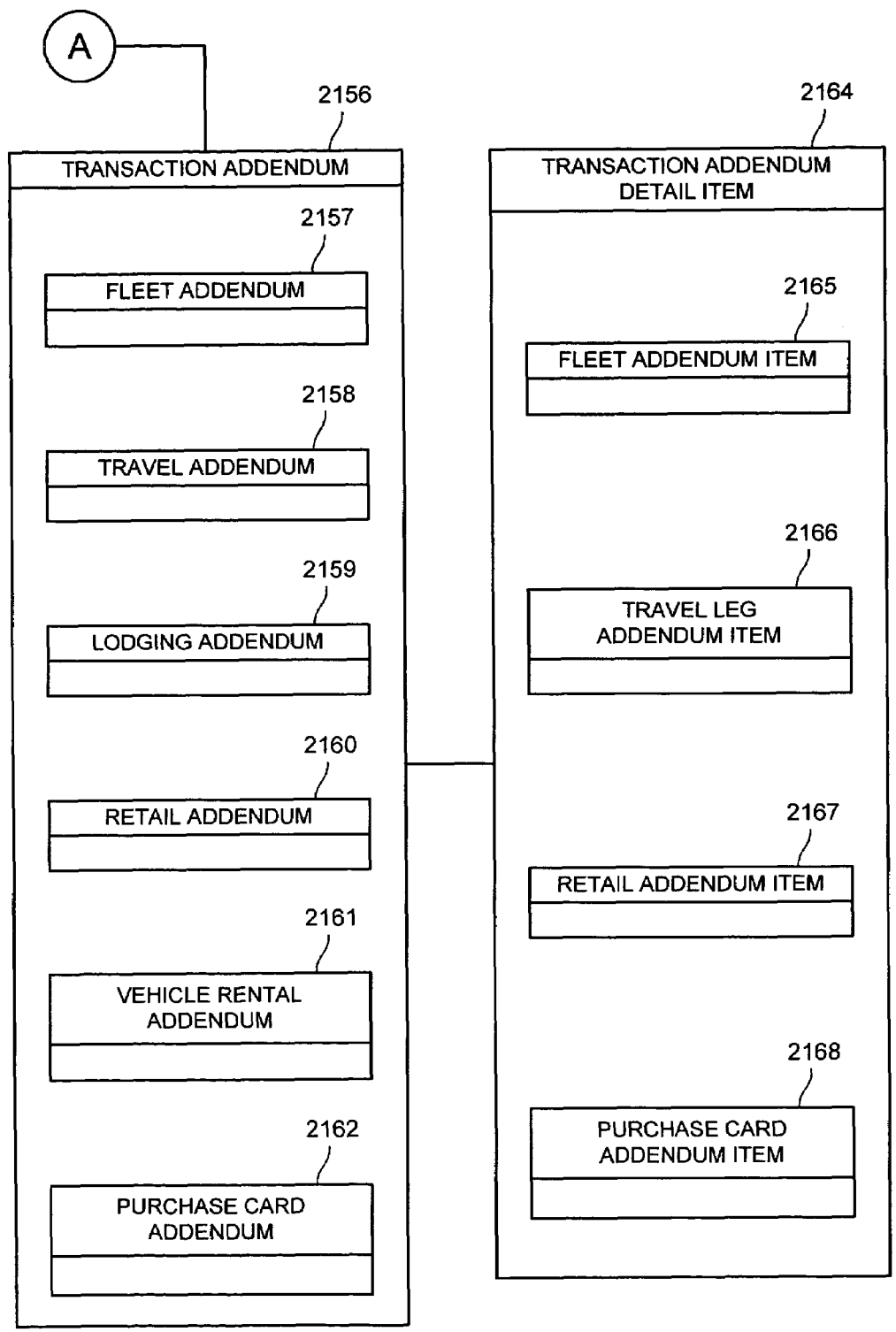

Different types of transactions can be stored by the transaction database. Each of the transaction sub-types will have attributes which are common (i.e., the Transaction Internal Identifier) and may have attributes which are unique to the transaction type. System 2100 (FIG. 21A) illustrates a few examples. For example, data for financial transactions can be stored, as illustrated by block 2108. A financial transaction is a business action or event that changes implied financial worth and/or results in the movement of funds from one account to another. Financial transactions can be further sub-typed, as shown in FIG. 21B. Block 2109 indicates that transaction information for a sale can be stored. Block 2174 indicates that transaction data for an authorization can be stored. Block 2110 indicates that transaction information for a cash advance can be stored. Block 2111 indicates that data for an adjustment can be stored. Block 2112 indicates that data for a refund can be stored. Similarly, block 2113 indicates that data for a reversal can be stored. Block 2116 indicates that transaction data for a chargeback can be stored. Similarly, block 2117 indicates that data for a chargeoff can be stored. Block 2115 indicates that transaction data for a return can be stored. Block 2114 shows that transaction data for other external transactions can be stored as well.

Furthermore, block 2118 indicates that data for an allocation transaction can be stored. Block 2119 indicates that data for a payment transaction can be stored and block 2120 indicates that data for a funds transfer can be stored. In addition, block 2121 indicates that data for an assessment transaction can be stored which may have two or more sub-types, such as a fee assessment in block 2122 or an interest assessment in block 2123. Furthermore, block 2124 indicates that data for other internal transactions can be stored.

Block 2125 (FIG. 21A) shows another possible sub-type of transaction as non-financial transactions which can be stored in the transaction database, as well. A non-financial transaction is the recording of a business action or event that changes properties that do not impact financial worth or movement of funds. For example, such non-financial transactions might include changes to names or addresses that are relevant to communication point information. Another example, is a transaction relating to the ordering of a plastic.

Block 2130 (FIG. 21A) shows how the transaction information can be related to one another. For example, if two transactions exist in which the first transaction is a sale and a second transaction is a return for the sale, the two transactions can be related by block 2130. This can be accomplished by retrieving the internal transaction identifier for the sale transaction and retrieving the internal transaction identifier for the return transaction and associating them as part of a new entry in the Transaction Relationship database. Furthermore, a "Transaction Relationship Type Code" can be assigned with the two identifiers, as well, in order to identify the type of relationship that exists between the two transactions. Thus, for example the internal transaction for the sale can be retrieved and the internal transaction identifier for the return can be retrieved so as to allow both identifiers to be stored as a new entry in block 2130 along with a type code identifying the relationship as a return on the sale.

By relating the various transactions in this way, a large amount of data storage can be saved as well as a significant amount of processing time. Instead of creating a master record that includes every possible type of relationship between two transactions, the transaction entries can be kept quite simple. Then, by virtue of the transaction relationship database, the history of the transaction can be tracked. Since not all sales will be reversed, it would be a waste of data storage to create an entry for every sale that provides the option of indicating whether the sale was reversed. Rather, the sale transaction can be associated to the reversal transaction via the transaction relationship database—instead of creating a larger master record with unused fields as in existing systems using static file structures.

By repeatedly querying the transaction relationship database, one can track the lineage of a transaction's relationships. For example, for a sale, the original sale can be associated to a chargeback transaction. Similarly, the chargeback can be queried from the transaction relationship database to show that the chargeback is related to the sale as well as a reversal transaction. Thus, a service provider can obtain the successive transactions that originate from the original transaction, or vice versa, by repeatedly querying the transaction relationship database to acquire the next step in the lineage.

Block 2156 (FIG. 21C) shows how data for a transaction addendum can be stored. A transaction addendum is additional data that supports a financial transaction. This might be additional information that a service provider or client of a service provider wants to have tracked or added on to their transactions. For example, this might include additional data that contains fleet information about the use of a vehicle. Thus, in addition to storing data relating to transactions for the purchase of gasoline, the information from transactions for the service or maintenance of vehicles can be stored, as well. Similarly, if one purchases gasoline at a convenience store, the information about food items purchased with the gasoline can be stored as an addendum entry. Transaction addendums can be recorded for a variety of transactions. For example, block 2156 shows that transaction addendum data can be stored for fleet addendums 2157, travel addendums 2158, lodging addendums 2159, retail addendums 2160, vehicle rental addendums 2161, and purchase card addendums 2162.

Yet another level of detail can be provided for each of these examples of transaction addendums by storing another level of detail for each transaction addendum, as shown in block 2164 labeled the transaction addendum detail item. For example, a greater level of detail can be recorded for a particular item bought at a convenience store as part of the fleet addendum item block 2165. As another example, for a travel addendum, transaction information can be stored for a particular leg of a trip as part of a travel leg addendum item in block 2166. Similarly, data can be stored for a retail addendum item in block 2167 or for a purchase card addendum item in block 2168.

Block 2140 illustrates how data for the status of a transaction can be maintained and tracked. A transaction status is the state or condition of a transaction at a particular point in time. For example, a general transaction can be presented, rejected, posted, outstanding, unmatched, settled, charged off, cancelled, suspended, or distributed. Similarly, an authorization transaction can be requested, received, approved, declined, transferred, matched, not matched, archived, or cancelled. Depending on the point in time, the transaction will have a different status. Thus, block 2140 provides a mechanism to assign the status of a transaction at different points in time. This can be accomplished by retrieving the internal transaction identifier assigned to a transaction entry from block 2104 and associating it with a transaction status code. The transaction status code will identify the status of the transaction. The internal transaction identifier and the transaction status code can be stored together in a transaction status database. Additional attributes can be stored as part of the transaction status entry, as well. For example, a "Transaction Status Timestamp" can be stored as part of the entry for the transaction to generally indicate the point in time that the transaction achieved the status represented by the transaction status code.

Block 2150 shows a mechanism for recording further information for a transaction status. Namely, a "Transaction Status Reason Code" can be maintained about a transaction status entry. The transaction status reason code can be used to indicate the reason why a transaction was placed in a certain state. Thus, a transaction status reason entry can be stored in the database represented by block 2150. In addition, an attribute on the transaction status reason database can be used to store transaction status reason description text. This descriptive text attribute can be used to store information describing in more detail the reason why the transaction was placed in a particular status.

Block 2170 shows how format specification data for a transaction entry can be stored. The format data describes the format of an incoming or outgoing transaction. It can do this using a "Transaction Format Type Code". Thus, an internal transaction identifier can be retrieved from the transaction database and assigned a transaction format type code. The transaction format type code can be assigned to any one of many different types of formats. For example, the format code could indicate that the transaction is stored in International Standards Organization (ISO) format. Or, the format code could indicate that the transaction is stored in MasterCard, VISA, or American Express format for those respective types of transactions. Similarly, the format code could indicate an internal format used by the service provider. In the case of First Data Resources, for example, this might be an internal First Data format. Alternatively, the format code might indicate a different private label format that can be specified by one of the service provider's clients, as in the case of a third party processor.

Block 2171 shows that the data for the different formats can be stored as individual entries. Thus, block 2171 can store the data defining different types of codes while block 2170 can be used to associate each code with a particular transaction entry. This also allows a single transaction to be manipulated so that it can be used in different formats. Thus, a service provider might choose to store a transaction in a format as required by one of the merchant organizations and then store the transaction that is more logical to the service provider's data processing system. This allows the service provider to maintain the transaction data in the format required by the merchant organization while also allowing the service provider to use the same transaction data in a format that is more readily accessible by the service provider's internal systems.

The transaction information stored in block 2104 will ultimately need to be routed to other locations within the system or to external systems. For example, a transaction for a retail sale can be routed to the balance administration site. Or, an address change transaction can be routed to the communication point site. Similarly, inbound retrieval request can be routed to chargeback/return site. This can be accomplished by associating a functional module message format as shown in block 2135 with a transaction internal identifier from block 2104. The coupling of the functional module message format and the transaction internal identifier can be stored in the transaction routing rule block 2134 as a transaction routing rule definition. Thus, this provides an association that describes for a transaction and a functional module message format the formats and attributes required for routing a message.

Block 2154 illustrates how batch information for performing batch processing of transactions can be implemented. This database stores information about a non-interactive process in which multiple transactions are bundled together and submitted for processing as a whole. The batch process can be defined through different attributes which are grouped with a "Transaction Batch Identifier". This transaction batch identifier can then be retrieved from block 2154 and assigned to each of the individual entries in block 2104. This allows the same batch process to be assigned to many different transactions in database 2104.

Product Subject Area

One of the disadvantages of prior data processing systems implemented by data processors on behalf of their clients has been the inability of the clients to use the data processing system to design products according to each client's own specifications. Rather, clients have been required to work with set terms and conditions in many instances that prevent the client from tailoring a product to the client's desired configuration. According to one embodiment of the invention, the product subject area of the data processing system described herein can be used to allow clients to design a new product with a great deal of flexibility. Furthermore, according to one embodiment of the invention, the same product system can be used to design products for different clients across a wide range of product lines.

Figure 22:
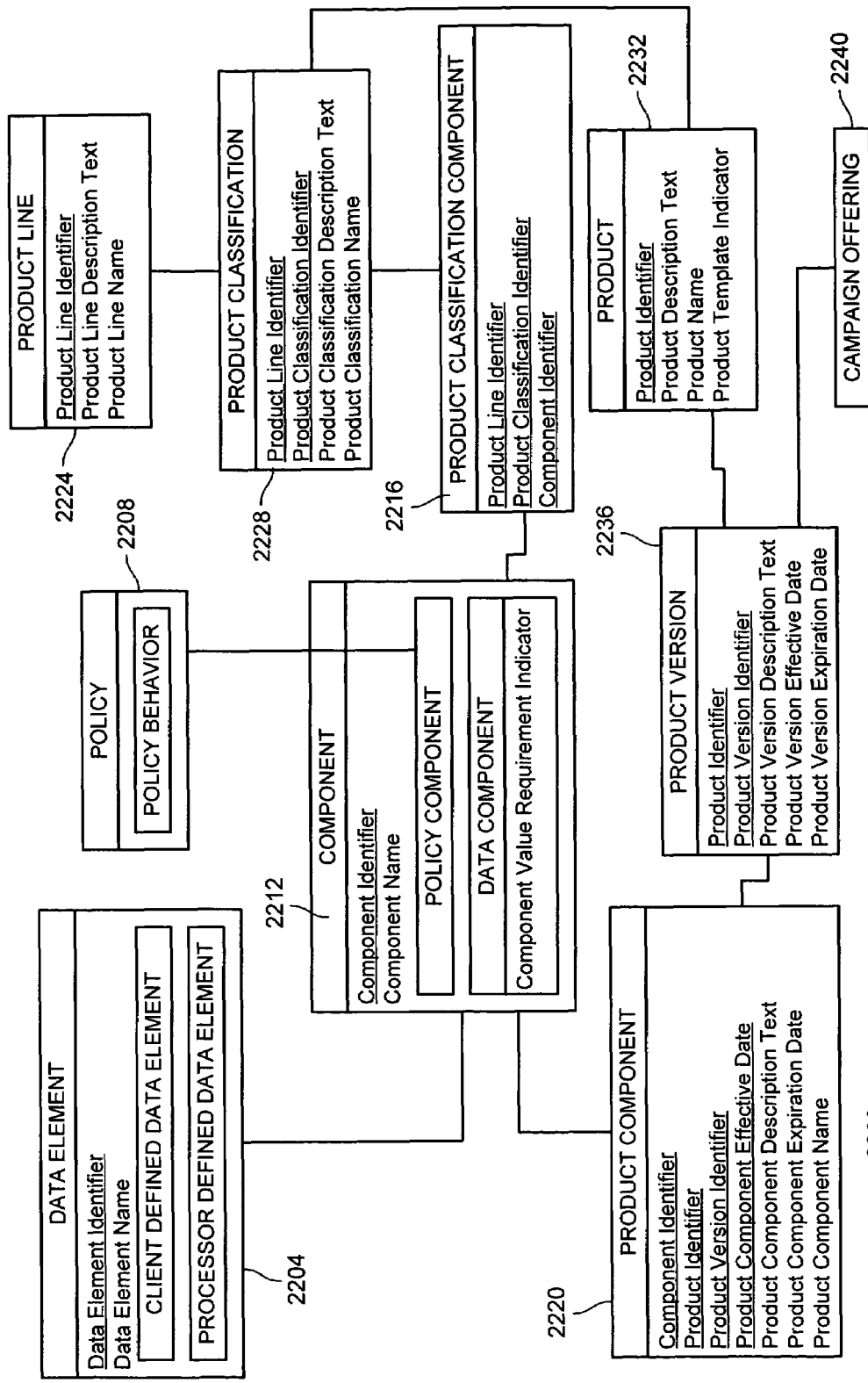
FIG. 22 illustrates a block diagram of an exemplary configuration for the product subject area, according to one embodiment of the invention.

FIG. 22 illustrates a system 2200 for implementing the product subject area. It should be understood that a product is a named specification for an item or service intended for sale by one party to another party for the purpose of generating revenue. System 2200 shows box 2224 as storing information for different product lines. A product line can be a category of products that are defined by the data processor according to a business function or business need that the product addresses. For example, services for providing lines of credit, such as credit card services, are considered a product line. Similarly, insurance is considered a product line. Healthcare is another example of a product line.

Data defining each product line can be stored in a database as a product line entry. Thus, an internal identifier can be generated by the service provider and assigned to data defining a particular product line. The internal identifier can be referred to as the product line identifier and assigned to a set of attributes so as to create the product line entry. For example, a product line description text attribute can be used to hold text that describes a particular product line. Similarly, a product line name attribute can be used to assign a name to each entry that serves as a shorthand reference for the product line Product lines can be categorized with more particularity through the use of product classifications. A product classification is a sub-classification of the product line and can be defined by the service provider. For example, if the product line is telecom, one product classification can be domestic cellular types of products, while another product classification can be broadband types of products. A third product classification can be long distance telecom products. Each are sub-classifications within the telecom product line. To create a product classification entry, an internal "Product Classification Identifier" is generated by the service provider. This can be a simple code recognizable by the data processor for conducting internal processing by the service provider. Also, a "Product Classification Description Text" attribute can be associated with the product classification identifier so as to describe in more particularity the product classification. Similarly, a "Product Classification Name" attribute can be assigned to the entry as a way of easily recognizing the product classification by the service provider. Furthermore, the "Product Line Identifier" to which the product classification applies can be included as part of the database entry. Multiple product classifications can likely be created for individual product lines.

System 2200 illustrates a block 2204 for storing information for a data element. A data element is an elementary type of information that can be used to define a parameter of a potential product being offered by a service provider (or by a third party data processor acting in the mode of a service provider). The data element can be defined by a third party data processor—in which case it would be a processor defined data element. It can also be defined by the service provider—in which case it would be considered a service provider defined data element. Examples of a data element are a VIP Indicator for a credit card account or an Annual Fee Amount for a service agreement. Typically, the data elements will be given generic names so that they can be used in a variety of different product lines. Thus, a data element for a Customer Name can apply to a customer of a restaurant, a client of a law firm, a patient of a doctor, a lessee of an apartment complex, and an insured of an insurance company, as well as others. Thus, the generic title Customer Name can be used to describe the data element without being specific to any one of those industries.

Policies can also be stored by the data processing system. A policy defines a rule or behavior for a product. For example, it can be used to define an annual fee policy for an account. Thus, it describes how the product's policies will be implemented. Block 2208 is where policies are stored. Each entry for a policy can be assigned an internal policy identifier and policy name. As was the case for data elements, policies can also be generic so that they apply to many different products without being limited to any specific industry.

While data elements and policies may be recognizable by the information technologists which works frequently in inputting and defining the data elements and policies, they may not be so readily understandable by a service provider using the data processing system. Since one embodiment of the invention will allow the service provider to create their own product specifications using the data processing system, the names of the data elements and policies need to be more readily understood by a specific service provider. Thus, block 2212 can be used to allow the service provider to assign more product line specific names to a particular data element or policy. This can be accomplished by generating an internal "Component Identifier" for each component entry. This allows a component entry to be accessed and identified by the data processing system. The "Data Element Identifier" can be retrieved from the data element database in 2204 and associated with the component identifier. Furthermore, a more user-friendly component name can be assigned as the component name attribute and associated with the component identifier as an entry in the component database 2212. This allows the service provider to assign names to individual data elements that can be understood more readily by their business users when working with the system. For example, in the case of the data element Customer Name, this data element can be assigned the title Patient Name so that a healthcare client designing a product can readily recognize the data element—since people in the healthcare industry tend to think in terms of patients as opposed to clients or customers.

Thus, a single data element can be associated with many different components. Again, in the case of the data element Customer Name, a first component entry could be stored with the component name of Patient Name, a second component entry could be stored with the component name of Lessee Name, and a third component entry could be stored with the component name of Insured Name. While each component entry would have the same underlying characteristics, it would be referred to by a name that the industry specific business users of the service provider could understand, when designing the product for a particular industry. This applies to policies, as well. Policies can be associated with many different entries in the component database so as to allow each policy to be renamed in a way which makes them more readily recognizable by someone who is familiar with a particular industry, product line, or product classification.

In addition to renaming data elements and policies by creating entries in the component database 2212, one embodiment of the system provides a further degree of definition. Namely, block 2216 illustrates that a component can be associated with a product classification. This is useful in that it allows the data processor to create a subset of components that are often used in developing a product for a certain product classification. For example, anytime a service provider desires to develop a MasterCard credit card product, a core set of components can be quickly identified by the technology staff that will be used by the business users of the service provider in developing that product. To implement this embodiment of the invention, the service provider can retrieve the "Product Classification Identifier" for a particular product classification and retrieve a "Component Identifier" from the component database. The service provider can then save these together as an entry in the database represented by block 2216 and assign a "Product Classification Component Identifier". The "Product Classification Component Identifier" is an internal identifier that can be generated by the service provider to allow the data processing system to process or identify the entries stored on the processing system. Block 2216 is thus useful in assisting the service provider to easily access those components that are relevant to a specific product line or classification.

The development of a product can begin by the service provider that uses the data processing system, identifying a product that they would like to develop. This information can then be stored in block 2232. Block 2232 shows that a product can be comprised of different attributes. For example, a "Product Identifier" can be generated by the data processing system or so as to allow the product entry to be easily identified by the processing system. This internal "Product Identifier" can be associated with attributes like a product name, such as "Bank ABC Visa Gold Card Credit Line." Furthermore, "Product Description Text" can be used to further define the product with text.

In some instances, one might choose to further define the product with a product version. This would allow the service provider to design several similar products and market them on a trial basis. The various terms and conditions or characteristics of the product would vary—typically, they would vary only slightly—and the service provider could thus offer the product versions on a test basis before settling on the desired version. Block 2236 shows how this could be implemented. For example, the "product Identifier" from database 2232 could be associated with a "Product Version Identifier". This association could be stored on the database represented by block 2236. The "Product Version Identifier" would be an internal identifier generated by the data processing system for use in retrieving a specific version of a product. Additional attributes that could be stored on the product version database include: "Product Version Description Text", "Product Version Effective Date", and "Product Version Expiration Date". The "Product Version Description Text" allows one to further describe the version by storing a textual description. The "Product Version Effective Date" and "Product Version Expiration Date" allow the client to define when the version will be in effect.

To develop a product, the service provider is allowed to select the components (i.e., data elements and policies) that are needed to define the product. This can be done in a variety of ways. For example, the data processing system could present all of the possible components for viewing by the service provider. This would likely be an overwhelming amount of data. Therefore, the service provider might make use of the product classification system and retrieve only those components that have been associated with a particular product classification as shown in block 2216. This would allow the data processing system to retrieve only those components that are typically used for a particular product classification—such as a MasterCard credit card, for example.

After the various components are displayed by component name, the user can select the components that are desired. These components can then be stored as product components for a specific product or product version. To accomplish this, the "Component Identifier" can be associated with either the "Product Identifier" or "Product Version Identifier". This association establishes a relationship indicating that the component is a component used in the product associated with the product identifier, for example, or with the product version associated with the "Product Version Identifier". This process can be repeated so that the product component database represented by block 2220 accumulates all the components selected by the service provider for a product. To print out the specification for the product, one would merely reference the product component database and retrieve the entries associated with that product identifier.

The system also allows the service provider to rename a component at this stage. While the component database was intended to provide a more user friendly name for data elements and policies, service providers will likely want to refine the names of components even further. The "Product Component Name" attribute allows them to do this. This attribute can be defined by the client and saved as part of the product component entry. Furthermore, "Product Component Description Text" can be stored as an attribute for each entry. Also, a "Product Component Expiration Date" can be maintained for the entry.

Block 2240 illustrates that a campaign offering can be related to the product system. Normally in a campaign offering, not all of the product components will be publicized. For example, in a credit card offering, consumers normally care most about interest rate and annual fees. Not all of the details of the product are spelled out in the advertising of the product. To determine which product components are publicized, those components can be associated with the campaign database so that generation of mailers can automatically determine which features of the product to put in the campaign materials.

Thus, one embodiment of the product system allows the service provider to develop new products across many different industries. Service providers can readily choose all the elements of a product that they want to offer rather than being constrained by predetermined elements that are forced on them by the data processing system. Furthermore, the data processing system can be implemented to service many different industries rather than being tied to specific industries. This provides a great deal of flexibility in servicing a wide range of service providers within various industries.

Communication Point Subject Area

Figure 16A:
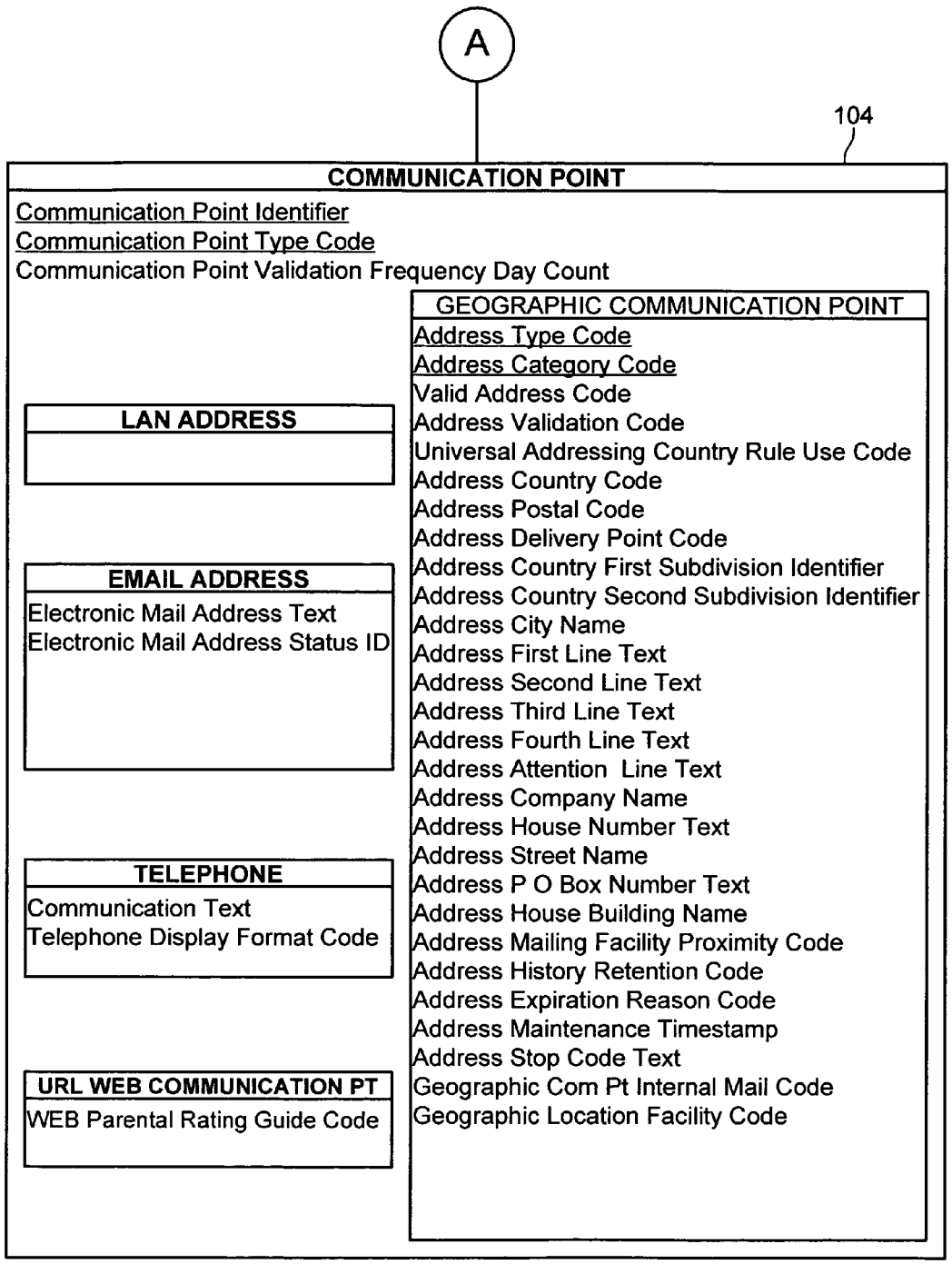
FIGS. 16A and 16B illustrates a block diagram of an exemplary configuration for the Communication Point subject area, according to one embodiment of the invention.

Referring to FIG. 16A, block 104 shows the Communication Point database components. A communication point is a way in which a party can be contacted. For example, a communication point can be a geographic address, a LAN address, an email address, a telephone number, a fax number, or a URL web communication point depending on the type code associated with it. The communication point data defines the communication point. An internal identifier generator can be utilized to generate internal ID's for each entry in the communication point database. It is then related to other subject areas such as party information using that internal ID. In this way, the communication point data can be kept separate from the party and the same communication point may be associated with many parties. Furthermore, it can be updated without affecting the other subject areas.

A geographic communication point can be specifically defined by a data entry which can include: an "Address Type Code", an "Address Category Code", a "Valid Address Code", an "Address Validation Code", a "Universal Addressing Country Rule Use Code", an "Address Country Code", an "Address Postal Code", an "Address Delivery Point Code", an "Address Country First Subdivision Identifier", an "Address City Name", an "Address First Line Text", an "Address Second Line of Text", an "Address Third Line of Text", an "Address Fourth Line of Text", an "Address Attention Line Text", an "Address Company Name", an "Address House Number Text", an "Address Street Name", an "Address PO Box Number Text", an "Address House Building Name", an "Address Mailing Facility Proximity Code", an "Address History Retention Code", an "Address Expiration Reason Code", an "Address Maintenance Timestamp", an "Address Stop Code Text", a "Geographic Communication Point Internal Mail Code", and a "Geographic Location Facility Code". Not all of these fields need to be defined in order to define a geographic communication point.

Similarly, a LAN address entry can be defined by appropriate data such as for IPv4 or IPv6. Furthermore, an email address can be defined with "Electronic Mail Address Text" and "Electronic Mail Address Status Indicator". A telephone number can be defined with "Communication Text" and a "Telephone Display Format Code", as yet another example.

Figure 16B:
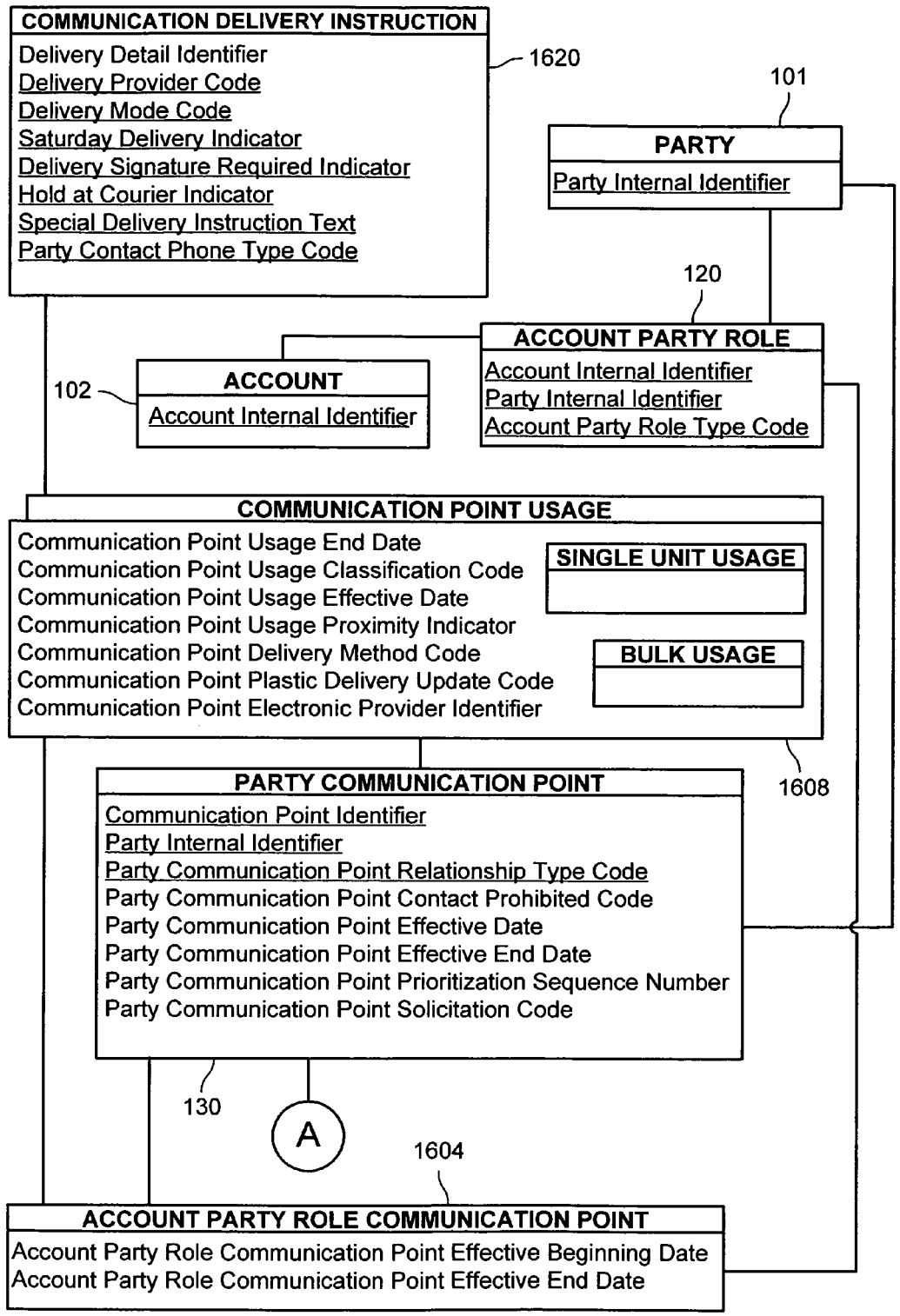

A more detailed view of the interaction between the account, party, and communication subject areas can be seen by referring to FIGS. 16A and 16B. FIGS. 16A and 16B illustrate a system 1600 for implementing these interactions. In FIGS. 16A and 16B, the Party information database 101 is shown associated with data from the Account database 102 to establish the Account-Party Role relationship database 120. Similarly, the Party database 101 is shown associated with the Communication Point database 104 to establish the Party Communication Point relationship database 130.

The Party Communication Point relationship database 130 receives internal identifiers from both the Party database and the Communication Point database to establish an associative relationship between the entries associated with those internal identifiers. Thus, a communication point for a particular party is established. Associating Party and Communication Point in this manner allows a great deal flexibility and simplified communication point management. For example a single communication point can be related to many parties and a single party can inform the service provider of many different communication points, of varying types, that can be used to communicate with it. All communication points are typically created and regulated by some issuing body (Geographic—Local Governmental Agencies, Electronic—Internet Service Provider, Telephone—Telephone Service Provider, etc.) which periodically dictates maintenance changes (i.e. zip code changes, street name changes, area code changes, etc.). The implementation of mandated changes is easily accomplished due to the fact that each communication point occurs only once in the system. Additional information can also be added to this associative relationship. For example, FIGS. 16A and 16B illustrate that data for the Party Communication Point can include:
1) A "Party Communication Point Contact Prohibited Code" to indicate whether that communication point may be used to contact a party;
2) an "Party Communication Point Effective Date" to indicate the date upon which the communication point becomes active for that party and therefore can be used by the service provider to communicate with it;
3) an "Party Communication Point Effective End Date" to indicate the date upon which the communication point is no longer valid for that party and therefore cannot be used by the service provider to communicate with it;
4) a "Party Communication Point Prioritization Sequence Number" used to prioritize the possible means of communicating with a customer;
5) a "Party Communication Point Relationship Type Code" which is a code that represents the Party's view of their relationship to a specific communication point at a specific point in time, e.g., "HOME" for a home address, "EMPL" for an employer's address, "TMVA" for a temporary vacation address, and "BUSN" for a business;
6) a "Party Communication Point Solicitation Sode" which can be used to determine privacy preferences for a party communication point.

These data fields allow a great deal of functionality to be accomplished with the architecture beyond that which can be accomplished with traditional systems. For example, with the "Party Communication Point Contact Prohibited" field, one can completely bar contact with the party at that communication point—for example, don't email me at my home email address.

Similarly, by providing effective dates for a communication point, a great deal of flexibility can be established in regard to where and when communications may be sent to a party during the year. For example, billing statements can be sent to a'party at a vacation home communication point in Arizona during the winter months and sent to a home address in Nebraska during the remainder of the year. The "Party Communication Point Effective Date" and "Party Communication Point Effective End Date" would be used to determine when the billing statements, for example, can be sent to the Arizona address. A second entry in the Party Communication Point relationship database would be used to determine when the communication can be sent to the Nebraska address.

The "Party Communication Point Solicitation Code" can be used to indicate whether the party can be solicited at that communication point. With the enactment of new privacy legislation, it is beneficial for service providers to be able to track whether the party can be solicited at a particular communication point. This "solicitation code" field in the Party Communication Point relationship database can thus be used to determine whether the party has opted in for solicitation; or alternatively, it can be used to determine whether the party has opted out of being solicited under a different configuration. Under either configuration, the party's preferences can be tracked. For example, under an opt-in configuration, the field might initially be set to "no solicitation" as a default until the party affirmatively opts in and the field is changed to reflect that fact.

While the Party Communication Point relationship database 130 associates a particular party with a particular communication point, instruction is still required as to what data or tasks are to be directed to that party at that communication point. This function can be accomplished by the interrelationship between the communication point usage database 1608, account party role database 120, and the party communication point database 130.

The communication point usage database can be used to define the types of correspondence that are produced that can be sent to a communication point. For example, it can include a "Business Process Output Type Code" to represent the type of correspondence sent to a party. Examples of this type code include "BLL1" for billing correspondence, "PLST" for correspondence relating to plastics (e.g., plastic credit cards), "MALR" for plastic mailer, and "LTTR" for letters, "STMT" for statements.

Another example of a field accessible through Communication Point Usage database 1608 is a "Paper Stop Effective Date". This field stores the date that the customer indicated it was acceptable to stop generating correspondence in the form of paper. Thus, this helps to satisfy laws that require that paper statements be sent unless the customer indicates that such paper statements do not need to be sent—in lieu of on-line access or electronic mailings, for example.

Another field that is accessible through the Communication Point Usage database 1608 is the "Business Process Output Generation Media Code". This code determines how output related to a business function will be generated. For example, the following codes could be used, where "Y" is the default code:
"Y"=electronic and paper will be produced;
"N"=paper will not be produced;
"L"=electronic and paper will be produced, paper should be turned off.

The Communication Point Usage database 1608 itself helps to define delivery instructions for correspondence that could be communicated to a Party that has a role on an Account. For example, the following fields can be used: "Communication Point Usage End Date", "Communication Point Usage Classification Code", "Communication Point Usage Effective Date", "Communication Point Usage Proximity Indicator", "Communication Point Delivery Method Code", "Communication Point Plastic Delivery Update Code", and "Communication Point Electronic Provider Identifier".

The "Communication Point Usage end Date" is the date that a communication point is no longer effective for an account party role and business process. The communication point usage classification code is the period of time that the communication point will be used. This field is used in conjunction with the "Correspondence Type Code" to determine which address within a specific correspondence type code will be used to deliver correspondence. For example, the following values can be used: "P" for permanent, "R" for repeating, indicating that the address applies for a recurring and specific time period, "T" for temporary, indicating that the address is effective for a short time period, usually in the context of sending a replacement plastic to a vacation address.

The "Communication Point Usage Effective Date" is the date that a communication point is effective for an account party role and business process. The "Communication Point Usage Proximity Indicator" is the value used to determine if the communication point and the mailing facility are in the same country when used for an account party role and business process. The "Communication Point delivery Method Code" determines how the plastic will be mailed to the customer (e.g., first class mail, Airborne, FedEx, registered mail, or certified mail). The "Communication Point Plastic Delivery Update Code" is a code that determines the process available to the issuer for changing the mail code. Finally, the "Communication Point Electronic Provider Identifier" can be an identifier for an electronic correspondence provider (e.g., "5001"="Billpay.com").

Also shown in block 1608 are sub-unit blocks labeled "Bulk Usage" and "Single Unit Usage". Coupled with the "Bulk Usage" block is an external Bulk Mail block 1616. This block helps to further define bulk mailing functions, such as when plastics for a group of people are first sent to an intermediary. The intermediary can perform a check of the individual envelopes in which the individual plastics are enclosed before depositing the individual envelopes in the mail. Another example of bulk mail delivery is where a group of envelopes are sent to an intermediary when the local postal service is unreliable (for example, in third world countries). The Bulk Mail block 1616 includes fields for a "Bulk Mail Identifier", a "Bulk Mail Descriptive Text", a "Bulk Mail Sealed Envelope Indicator", and a "Bulk Mail Metered Mail Indicator".

Communication Delivery Instructions block 1620 helps define further delivery instructions that can be assigned to a specific business process output type of communication for a specific party playing a role on an account by providing fields for a "Delivery Detail Identifier", a "Delivery Provider Code", a "Delivery Mode Code", a "Saturday Delivery Indicator", a "Delivery Signature Required Indicator", a "Hold At Courier Indicator", a "Special Delivery Instruction Text", and a "Party Contact Phone Type Code".

Also shown in FIGS. 16A and 16B is the Account Party Role Communication Pont relationship database 1604. This relationship database establishes an associative relationship between entries in the Account Party role database 120, the Communication Point Usage database 1608, and the Party Communication Point database 130. The association with the Communication Point Usage block 1608 allows the service provider to establish the information needed to send a specific piece of communication to a specific party playing a role on an account at a communication point with which a relationship has been established to any party playing a role on that account. In addition to storing internal identifiers from the account party role database and the party communication point database, the account party role communication point database also stores the fields of "Account Party Role Communication Point Effective Beginning Date" and "Account Party Role Communication Point Effective End Date". These fields allow the beginning and ending dates to be defined for communicating with a particular party playing a particular role on a particular account.

Presentation Instrument Subject Area

A presentation instrument is a catalyst to initiate financial or non-financial transactions. It is customarily envisioned as a number such as a credit card number for example. However, it is not required to be a number. A presentation instrument device is a physical or virtual container used to store information of one or more presentation instruments. The PI device allows the owner convenient and secure use of one or more PI's and may be issued for single-use or multiple use. For example, multi-application smart cards can store multiple credit card numbers (PI's). Furthermore, such smart cards can be issued to both a husband and a wife on the same account to provide for multiple users. As another example, the smart card could be loaded with loyalty account data that can be redeemed only once (single use) or multiple times (multiple use). Under traditional systems, the presentation instrument and the presentation instrument device were considered the same thing. The present architecture allows the data for the presentation instrument and the presentation instrument device to be separated.

Figure 17A:
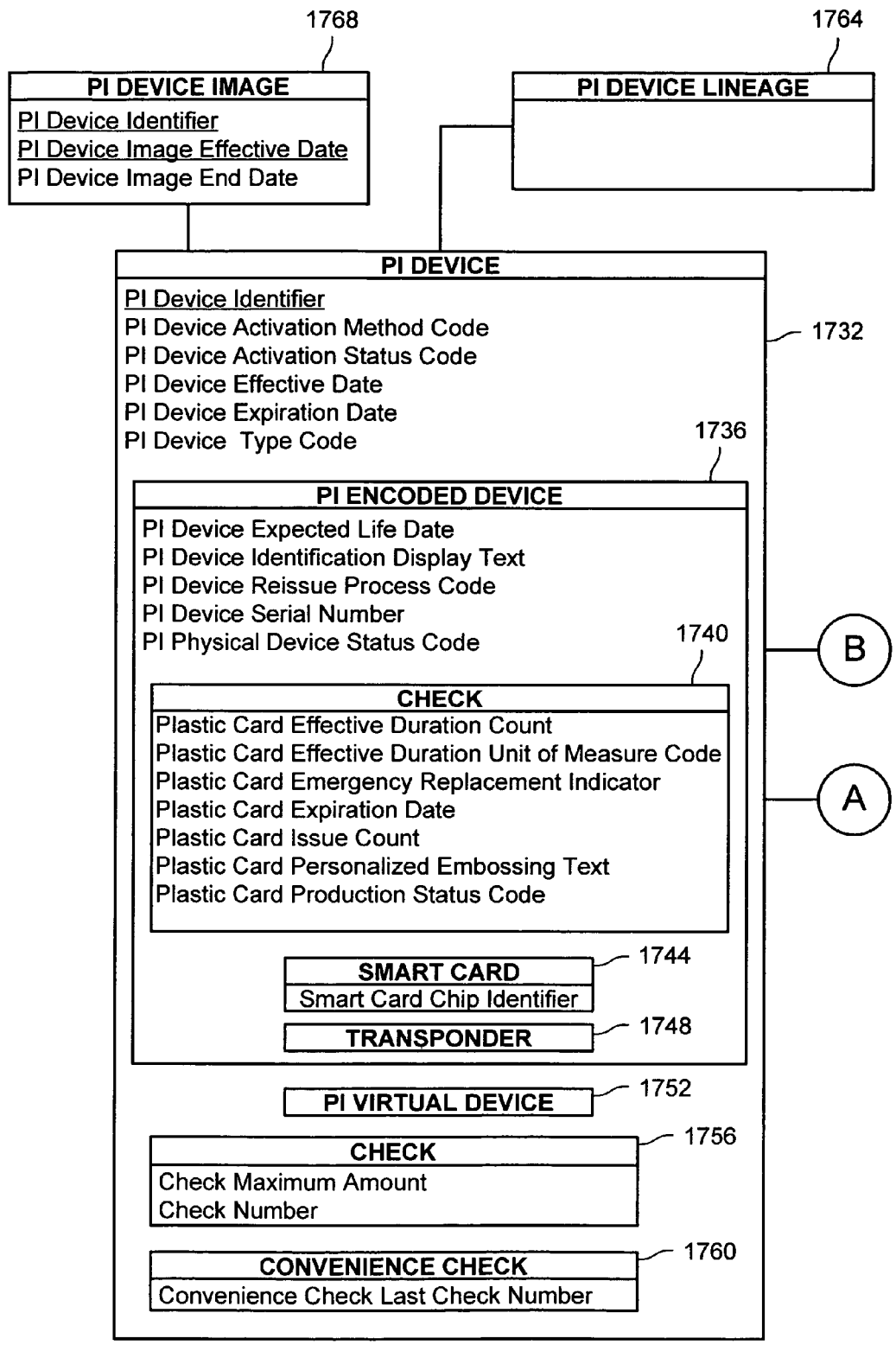
FIGS. 17A and 17B illustrate a block diagram of an exemplary configuration for the presentation instrument subject area, according to one embodiment of the invention.
Figure 17B:
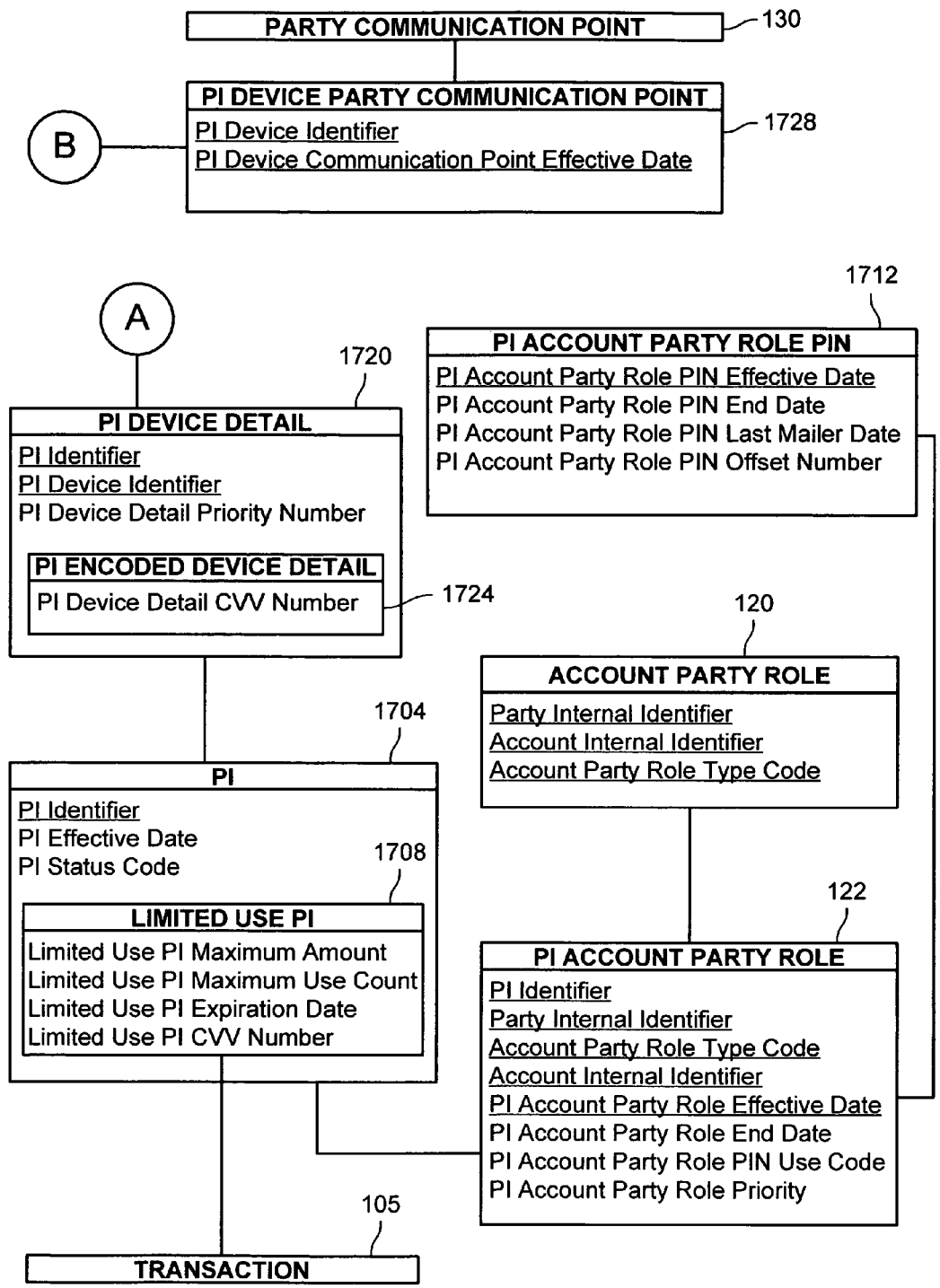

FIGS. 17A and 17B illustrate a more detailed view of the presentation instrument subject area. As in FIG. 1, the PI Account Party Role database 122 is shown associated with both the Account Party Role database 120 and the Presentation Instrument (PI) database 1704. Internal identifiers from both database 120 and database 1704 are used to create an associative relationship between entries stored on each database. Furthermore, this associative relationship can be further defined by the attributes stored on each PI Account Party Role entry, such as: "PI Account Party Role Effective Date" data, "PI Account Party Role End Date" data, "PI Account Party Role PIN Use Code" data, "PI Account Party Role Priority" data.

A PI Account Party Role PIN database 1712 is shown related to the PI Account Party Role database 122 in FIGS. 17A and 17B. The PI account party role PIN database contains the "PI Account Party Role PIN Offset number" which is used to calculate the personal identification number (or the actual personal identification number) that authenticates a Party's access to an account when using a specific presentation instrument. This database allows every customer playing a role on a specific account to have a unique PIN for access authentication for each PI that can access that account even if several customers, on the account, share the same PI identifier. In addition one can also store data for: "PI Account Party Role PIN Effective Date", "PI Account Party Role PIN End Date", and "PI Account Party Role PIN Last Mailer Date". These attributes allow the service provider to track PIN changes over time and even allow future dated PIN changes.

FIGS. 17A and 17B show a PI database 1704. The PI database stores entries for individual PI's, such as card numbers as an example of a PI assigned to a plastic card. The content of the PI identifier is specified by a governing organization, like VISA or Mastercard, and the identifier is generated and stored in database 1704. Also, additional data can be stored as part of each entry for an individual PI, such as PI Effective date which indicates the effective date of the PI and PI Status Code which indicates whether the PI is currently valid. A subtype of PI is depicted by the addition of database 1708 which can store information to reflect the characteristics of a limited use PI. A limited use PI is a type of PI whose use is restricted. Generally, the restriction is to the number of times the PI may be used to catalyze a transaction. However, other limits could apply. In FIGS. 17A and 17B, the entry for the limited use PI is shown as having the option to store: "Limited Use PI Maximum Amount" data, "Limited Use PI Maximum Use Count" data, "Limited Use PI Expiration Date" data, and "Limited Use PI CVV Number" data.

FIGS. 17A and 17B also show the PI Device database 1732. As previously noted, this database stores the information for the presentation instrument device. For each entry stored in the PI Device database 1732, a "PI Device Identifier" is generated and stored. This is an internally generated number that is assigned to each PI Device entry. In FIGS. 17A and 17B, the entry for the PI Device generally is shown as having the option to store: "PI Device Activation Method Code" data, "PI Device Activation Status Code" data, "PI Device Effective Date" data, "PI Device Expiration Date" data, and "PI Device Type Code" data. These codes are self explanatory. The activation method code identifies how the device is activated. The activation status code indicates whether the PI Device is activated, the effective date indicates when the PI Device became effective, the expiration date indicates when the PI device will expire, and type code indicates what type of PI Device it is, e.g., plastic card, smart card, transponder, to name but a few.

In addition, FIGS. 17A and 17B show how the individual entries for the PI devices can be enhanced for specific PI types. For example, some PI devices take the form of encoded devices. These are the PI devices that we are perhaps the most familiar with, such as credit cards and smart cards that have the account number (PI) affixed to the device through printing or embossing or storage on a magnetic stripe, for example. Thus, such PI encoded devices can include data fields in an entry for: "PI Device Expected Life Date", "PI Device Identification Display Text", "PI Device Reissue Process Code, PI Device Serial Number", "PI Physical Device Status Code".

Block 1740 in FIGS. 17A and 17B shows fields of data that can be stored for plastic cards to further define their characteristics. The fields shown in FIGS. 17A and 17B are: "Plastic Card Effective Duration Count", "Plastic Card Effective Duration Unit of Measure Code", "Plastic Card Emergency Replacement Indicator", "Plastic Card Expiration Date", "Plastic Card Issue Count", "Plastic Card Personalized Embossing Text", and "Plastic Card Production Status Code".

FIGS. 17A and 17B also show that data for smart cards (block 1744) and transponders (block 1748) can be stored as further refined data sets, as well. A transponder is a type of physical PI Device that uses wireless technology to initiate a transaction, for example a radio frequency transceiver that can attach to one's key chain or to the inside windshield on one's car.

FIGS. 17A and 17B also show that the PI Device data can be stored for checks acting as PI Devices in block 1756 and convenience checks in block 1760. Furthermore, FIGS. 17A and 17B show that data can be stored for PI Virtual Devices in block 1752. One example of a PI Virtual Device is when presentation instrument data is stored on a computer that can create transactions over the internet. In this example, the PI Device is essentially the computer code that produces the PI when the transaction is performed—rather than a physical device that is used.

As noted earlier, the Presentation Instrument data (such as a card number) and the presentation instrument device data (such as data defining a particular smart card configuration or a particular plastic card configuration) are held separate from one another by databases 1704 and 1732. However, the data can be combined by establishing an associative relationship between entries on each database and associating the internal identifiers generated for each entry. Thus, database 1720 allows the internal identifiers for each database to be related in this associative relationship by storing the internal identifiers from each entry from the two databases as a set of data on database 1720. Additional information can also be stored to further define this set of data on database 1720, such as a "PI Device Detail Priority Number" and a "PI Device Detail CVV Number" as shown in block 1724.

The PI Device data stored on database 1732 can also be associated with PI Device Image database 1768. This data defines the appearance of the presentation instrument device to be stored separately. Thus, it provides a great deal of flexibility in defining the image or artwork to be affixed to a credit card, for example: "PI Device Image Effective Date", "PI Device Image End Date" are fields that can be used to manage this information.

Also shown is a PI Device Lineage block 1764. This block allows one to establish entries to track the changes to a PI Device. Thus PI Device Identifiers can be stored as sets of data to reflect the history of which PI Device replaced or was replaced by another PI Device.

It should be understood that use of the term "associate" in this specification is intended to mean that two or more data elements are grouped as an associative set of data. For example, two internal identifiers grouped as a unique data entry form an associative set. Furthermore, the two data entries that those two internal identifiers reference are also consequently formed as an associative set of data.

Similarly, it should be understood that the use of the term "relate" in this specification is intended to mean that two or more entities are established in a relationship with one another. Thus, when a particular party is related to a particular account, for example, a relationship is established between the particular party and the particular account. This is often implemented by associating the internal identifier for the particular party with the internal identifier for the particular account as a data set so as to identify the entities as being related to one another.

While various embodiments of the invention have been described as methods or apparatus for implementing the invention, it should be understood that the invention can be implemented through code coupled to a computer, e.g., code resident on a computer or accessible by the computer. For example, software and databases could be utilized to implement many of the methods discussed above. Thus, in addition to embodiments where the invention is accomplished by hardware, it is also noted that these embodiments can be accomplished through the use of an article of manufacture comprised of a computer usable medium having a computer readable program code embodied therein, which causes the enablement of the functions disclosed in this description. Therefore, it is desired that embodiments of the invention also be considered protected by this patent in their program code means as well.

It is also envisioned that embodiments of the invention could be accomplished as computer signals embodied in a carrier wave, as well as signals (e.g., electrical and optical) propagated through a transmission medium. Thus, the various information discussed above could be formatted in a structure, such as a data structure, and transmitted as an electrical signal through a transmission medium or stored on a computer readable medium.

It is also noted that many of the structures, materials, and acts recited herein can be recited as means for performing a function or steps for performing a function. Therefore, it should be understood that such language is entitled to cover all such structures, materials, or acts disclosed within this specification and their equivalents.

While many different definitions have been used for purposes of this patent so as to clarify the meaning of the claim terms. It should be understood that these definitions are intended solely for that purpose. Such definitions are not necessarily adopted by any assignee for other legal matters.

What is claimed is:

1. A method of associating transaction entries for use by a data processor, said method comprising:
providing a transaction database for storing transaction information;
generating a first transaction internal identifier;
assigning said first transaction internal identifier to data for a first transaction as a first transaction data entry;
storing said first transaction data entry in said transaction database;
generating a second transaction internal identifier;
assigning said second transaction internal identifier to data for a second transaction as a second transaction data entry;

storing said second transaction data entry in said transaction database;

providing a transaction relationship type code for describing the relationship between two transaction entries;

associating said transaction relationship type code with said first transaction internal identifier and with said second transaction internal identifier so as to describe the relationship between said first transaction data entry and said second transaction data entry;

responding to a transaction query by utilizing said association of said transaction relationship type code with said first transaction internal identifier and with said second transaction internal identifier.

2. The method as described in claim 1 and further comprising:

storing said transaction relationship type code and said first transaction internal identifier and said second transaction internal identifier in a transaction relationship database.

3. The method as described in claim 1 and further comprising:

retrieving said first transaction internal identifier from said transaction database.

4. The method as described in claim 3 and further comprising:

retrieving said second transaction internal identifier from said transaction database.

5. The method as described in claim 1 and further comprising:

associating said first transaction internal identifier as identifying the subject of said relationship; and associating said second transaction internal identifier as identifying the object of said relationship.

6. The method as described in claim 1 wherein said first transaction internal identifier identifies an authorization transaction for a sale.

7. The method as described in claim 1 wherein said first transaction internal identifier identifies a sales transaction.

8. The method as described in claim 1 wherein said first transaction internal identifier identifies a chargeback transaction.

9. The method as described in claim 1 wherein said first transaction internal identifier identifies a chargeoff transaction.

10. The method as described in claim 1 wherein said first transaction internal identifier identifies retrieval request transaction.

11. The method as described in claim 1 wherein said first transaction internal identifier identifies a reversal transaction.

12. The method as described in claim 1 wherein said first transaction internal identifier identifies an adjustment transaction.

13. The method as described in claim 1 wherein said first transaction internal identifier identifies a return transaction.

14. The method as described in claim 1 wherein said first transaction internal identifier identifies a cash advance transaction.

15. The method as described in claim 1 wherein said first transaction internal identifier identifies a name change transaction for a party.

16. The method as described in claim 1 wherein said first transaction internal identifier identifies an address change transaction for a party.

17. The method as described in claim 1 wherein said first transaction internal identifier identifies a fee assessment transaction.

18. The method as described in claim 1 wherein said first transaction internal identifier identifies an interest assessment transaction.

19. The method as described in claim 1 wherein said first transaction internal identifier identifies bonus points earned transaction.

20. The method as described in claim 1 wherein said first transaction internal identifier identifies an allocation transaction.

21. The method as described in claim 1 wherein said first transaction internal identifier identifies a payment transaction.

22. The method as described in claim 1 wherein said first transaction internal identifier identifies a funds transfer transaction.

23. The method as described in claim 1 wherein said associating said transaction relationship type code with said first transaction internal identifier and with said second transaction internal identifier comprises: grouping said first transaction internal identifier with said second transaction internal identifier and with said transaction relationship type code.

24. The method as described in claim 1 and further comprising:

determining successive transactions that originated from an original transaction.

* * * * *